(12) United States Patent
Borrero et al.

(10) Patent No.: US 12,378,056 B2
(45) Date of Patent: Aug. 5, 2025

(54) SHAPED FLEXIBLE SHIPPING PACKAGE AND METHOD OF MAKING

(71) Applicant: The Procter & Gamble Company, Cincinnati, OH (US)

(72) Inventors: Susana E Borrero, Mason, OH (US); Norman Scott Broyles, Hamilton, OH (US); Benjamin G Hesford, Hamilton, OH (US); Anthony Frederick Cappel, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 117 days.

(21) Appl. No.: 17/943,237

(22) Filed: Sep. 13, 2022

(65) Prior Publication Data
US 2023/0114889 A1    Apr. 13, 2023

Related U.S. Application Data

(60) Provisional application No. 63/254,184, filed on Oct. 11, 2021.

(51) Int. Cl.
| | |
|---|---|
| *B65D 81/05* | (2006.01) |
| *B31B 70/60* | (2017.01) |
| *B31B 70/84* | (2017.01) |
| *B32B 1/00* | (2006.01) |
| *B32B 27/08* | (2006.01) |
| *B32B 27/32* | (2006.01) |

(Continued)

(52) U.S. Cl.
CPC ............ *B65D 81/052* (2013.01); *B31B 70/60* (2017.08); *B31B 70/84* (2017.08); *B32B 1/00* (2013.01); *B32B 27/08* (2013.01); *B32B 27/32* (2013.01); *B65D 65/40* (2013.01); *B31B 2170/20* (2017.08); *B32B 2250/242* (2013.01); *B32B 2307/732* (2013.01); *B32B 2439/40* (2013.01)

(58) Field of Classification Search
CPC ..... B65D 81/052; B65D 81/05; B65D 81/051
USPC ..................................... 206/522, 484; 383/3
See application file for complete search history.

(56) References Cited

U.S. PATENT DOCUMENTS

| | | |
|---|---|---|
| 2,213,758 A | 9/1940 | Eichberg |
| 3,030,640 A | 4/1962 | Gosman |
| 3,346,101 A | 10/1967 | Pestka |

(Continued)

FOREIGN PATENT DOCUMENTS

| | | |
|---|---|---|
| CN | 1413162 A | 4/2003 |
| CN | 1550422 A | 12/2004 |

(Continued)

OTHER PUBLICATIONS

PCT Search Report and Written Opinion for PCT/CN2021/123083 dated Mar. 14, 2022, 10 pages.

(Continued)

*Primary Examiner* — Steven A. Reynolds
(74) *Attorney, Agent, or Firm* — Kathleen Y. Carter; James Ernest Oehlenschlag

(57) ABSTRACT

A flexible package having an inner sheet having a first surface and a second surface. The flexible package has an article reservoir for accepting an article to be shipped and one or more expansion chambers. The expansion chambers can be inflated or otherwise expanded to provide structure to the flexible package and to protect the article in the article reservoir.

23 Claims, 24 Drawing Sheets

(51) Int. Cl.
  *B65D 65/40* (2006.01)
  *B31B 170/20* (2017.01)

(56) References Cited

U.S. PATENT DOCUMENTS

| | | | |
|---|---|---|---|
| 3,349,990 | A | 10/1967 | Woodford |
| 3,777,632 | A | 12/1973 | Pepmeier |
| 3,887,213 | A | 6/1975 | Goetz |
| 3,975,885 | A | 8/1976 | Carlisle |
| 4,046,314 | A | 9/1977 | Hill |
| 4,087,002 | A | 5/1978 | Bambara et al. |
| 4,190,158 | A * | 2/1980 | Ambrose ............. B65D 81/052 53/433 |
| 4,267,684 | A * | 5/1981 | Ambrose ............. B65B 23/00 53/472 |
| 4,491,225 | A | 1/1985 | Baillod |
| 4,651,360 | A | 3/1987 | Wang |
| 4,756,032 | A | 7/1988 | Wang |
| 4,872,558 | A | 10/1989 | Pharo |
| 4,889,252 | A | 12/1989 | Rockom et al. |
| 4,969,312 | A | 11/1990 | Pivert |
| 5,140,801 | A | 8/1992 | Wild |
| 5,170,609 | A | 12/1992 | Bullock et al. |
| 5,217,131 | A | 6/1993 | Andrews |
| 5,272,856 | A | 12/1993 | Pharo |
| 5,307,529 | A | 5/1994 | Wang |
| 5,487,470 | A | 1/1996 | Pharo |
| 5,535,888 | A | 7/1996 | De Luca |
| 5,639,523 | A | 6/1997 | Ellis |
| 5,727,270 | A | 3/1998 | Cope et al. |
| 5,769,232 | A | 6/1998 | Cash et al. |
| 5,770,839 | A | 6/1998 | Ruebush et al. |
| 6,139,188 | A | 10/2000 | Marzano |
| 6,520,332 | B1 | 2/2003 | Barmore |
| 6,520,333 | B1 | 2/2003 | Tschantz |
| 6,520,491 | B2 | 2/2003 | Timlick |
| 6,562,740 | B1 | 5/2003 | Todt |
| 6,629,777 | B2 | 10/2003 | Tanaka et al. |
| 7,165,677 | B2 | 1/2007 | Tanaka et al. |
| 7,303,076 | B2 | 12/2007 | Scalise |
| 7,383,953 | B2 | 6/2008 | Dickinson |
| 7,422,109 | B2 | 9/2008 | Yoshifusa |
| 7,631,762 | B2 | 12/2009 | Liao et al. |
| 7,913,848 | B2 | 3/2011 | Liao et al. |
| 8,157,096 | B2 | 4/2012 | Liao |
| 8,540,094 | B2 | 9/2013 | Riedl |
| 8,568,029 | B2 | 10/2013 | Kannankeril et al. |
| 8,707,660 | B2 | 4/2014 | Howes |
| 8,770,408 | B2 | 7/2014 | Tschantz et al. |
| 9,327,867 | B2 | 5/2016 | Stanley et al. |
| 9,469,088 | B2 | 10/2016 | Stanley |
| 9,623,622 | B2 | 4/2017 | Baines |
| 9,694,942 | B2 | 7/2017 | Stanley |
| 9,731,885 | B2 * | 8/2017 | Liao ............. B65D 81/052 |
| 9,815,258 | B2 | 11/2017 | Stanley |
| 10,040,581 | B2 | 8/2018 | Stanley |
| 10,167,128 | B2 | 1/2019 | Nevo et al. |
| 11,072,478 | B2 | 7/2021 | Borrero et al. |
| 11,124,346 | B2 | 9/2021 | Borrero et al. |
| 11,325,768 | B2 | 5/2022 | Clare et al. |
| 11,338,980 | B2 | 5/2022 | Borrero et al. |
| 11,345,532 | B2 | 5/2022 | Borrero et al. |
| 11,352,185 | B2 | 6/2022 | Borrero et al. |
| 11,352,186 | B2 | 6/2022 | Lester et al. |
| 11,542,084 | B2 | 1/2023 | Borrero et al. |
| 11,597,575 | B2 | 3/2023 | Borrero et al. |
| 2002/0064319 | A1 * | 5/2002 | Tanaka ............. B65D 33/24 383/3 |
| 2003/0006162 | A1 | 1/2003 | Smith |
| 2003/0024846 | A1 | 2/2003 | Nadler |
| 2003/0034270 | A1 | 2/2003 | Ribeiro |
| 2003/0128898 | A1 | 7/2003 | Malone et al. |
| 2003/0167572 | A1 | 9/2003 | Mileti |
| 2004/0101658 | A1 | 5/2004 | Kannankeril |
| 2004/0149618 | A1 | 8/2004 | Otaki |
| 2005/0077200 | A1 | 4/2005 | Tippey |
| 2005/0100251 | A1 * | 5/2005 | Havens ............. B65D 81/052 383/107 |
| 2005/0103676 | A1 | 5/2005 | Lee |
| 2005/0109656 | A1 | 5/2005 | Ishizaki |
| 2005/0126941 | A1 | 6/2005 | Ferri |
| 2005/0189257 | A1 | 9/2005 | Chen et al. |
| 2006/0030471 | A1 | 2/2006 | Schaller et al. |
| 2006/0207849 | A1 | 9/2006 | Sadow |
| 2007/0092164 | A1 | 4/2007 | Yasuhira |
| 2007/0199855 | A1 | 8/2007 | Lim |
| 2008/0029423 | A1 | 2/2008 | Davlin |
| 2008/0035519 | A1 | 2/2008 | Swartz et al. |
| 2008/0083640 | A1 | 4/2008 | Liu |
| 2009/0242450 | A1 | 10/2009 | Zhang |
| 2010/0072103 | A1 * | 3/2010 | Watanabe ............. B65D 81/052 206/522 |
| 2010/0233438 | A1 | 9/2010 | Stone |
| 2010/0308062 | A1 | 12/2010 | Helou, Jr. |
| 2011/0068154 | A1 | 3/2011 | Kannankeril et al. |
| 2011/0187028 | A1 | 8/2011 | Menning et al. |
| 2011/0192121 | A1 | 8/2011 | Kannankeril |
| 2011/0247725 | A1 | 10/2011 | Frayne et al. |
| 2012/0000807 | A1 | 1/2012 | Scarbrough et al. |
| 2012/0067760 | A1 | 3/2012 | Tschantz et al. |
| 2012/0097634 | A1 | 4/2012 | Riedl |
| 2013/0048529 | A1 | 2/2013 | Liao et al. |
| 2013/0058218 | A1 | 3/2013 | Wu et al. |
| 2013/0292287 | A1 | 11/2013 | Stanley et al. |
| 2013/0292353 | A1 | 11/2013 | Stanley et al. |
| 2013/0292395 | A1 | 11/2013 | Stanley et al. |
| 2013/0292413 | A1 | 11/2013 | Stanley et al. |
| 2013/0292415 | A1 | 11/2013 | Stanley et al. |
| 2013/0294711 | A1 | 11/2013 | Stanley et al. |
| 2013/0313152 | A1 | 11/2013 | Liao |
| 2013/0337244 | A1 | 12/2013 | Stanley et al. |
| 2014/0033654 | A1 | 2/2014 | Stanley et al. |
| 2014/0033655 | A1 | 2/2014 | Stanley et al. |
| 2014/0224700 | A1 * | 8/2014 | Scarbrough ......... B65D 81/052 206/522 |
| 2014/0328551 | A1 | 11/2014 | Nevo |
| 2015/0033671 | A1 | 2/2015 | Stanley |
| 2015/0034670 | A1 | 2/2015 | Stanley et al. |
| 2015/0036950 | A1 | 2/2015 | Stanley et al. |
| 2015/0121810 | A1 | 5/2015 | Bourgeois et al. |
| 2015/0122373 | A1 | 5/2015 | Bourgeois et al. |
| 2015/0122840 | A1 | 5/2015 | Cox et al. |
| 2015/0122841 | A1 | 5/2015 | McGuire et al. |
| 2015/0122842 | A1 | 5/2015 | Berg, Jr. et al. |
| 2015/0122846 | A1 | 5/2015 | Stanley et al. |
| 2015/0125099 | A1 | 5/2015 | Ishihara et al. |
| 2015/0125574 | A1 | 5/2015 | Arent et al. |
| 2015/0126349 | A1 | 5/2015 | Ishihara et al. |
| 2015/0259120 | A1 | 9/2015 | Liao |
| 2015/0287343 | A1 | 10/2015 | Moore |
| 2015/0314940 | A1 | 11/2015 | Matta |
| 2016/0058218 | A1 | 3/2016 | Yoshifusa |
| 2016/0088981 | A1 | 3/2016 | Cameron et al. |
| 2016/0122112 | A1 | 5/2016 | Nevo et al. |
| 2016/0176578 | A1 | 6/2016 | Stanley et al. |
| 2016/0176582 | A1 | 6/2016 | McGuire et al. |
| 2016/0176583 | A1 | 6/2016 | Ishihara et al. |
| 2016/0176584 | A1 | 6/2016 | Ishihara et al. |
| 2016/0176597 | A1 | 6/2016 | Ishihara et al. |
| 2016/0221727 | A1 | 8/2016 | Stanley et al. |
| 2016/0297569 | A1 | 10/2016 | Berg, Jr. et al. |
| 2016/0297589 | A1 | 10/2016 | You et al. |
| 2016/0297590 | A1 | 10/2016 | You et al. |
| 2016/0297591 | A1 | 10/2016 | You et al. |
| 2016/0325518 | A1 | 11/2016 | Ishihara et al. |
| 2016/0362228 | A1 | 12/2016 | McGuire et al. |
| 2017/0001782 | A1 | 1/2017 | Arent et al. |
| 2017/0121093 | A1 | 5/2017 | Liao et al. |
| 2017/0233116 | A1 | 8/2017 | Stanley et al. |
| 2017/0247164 | A1 | 8/2017 | Zhang |
| 2017/0305609 | A1 | 10/2017 | McGuire et al. |
| 2017/0305627 | A1 | 10/2017 | Arent et al. |
| 2017/0314283 | A1 | 11/2017 | Liu |
| 2018/0036989 | A1 | 2/2018 | Baines |

(56) References Cited

U.S. PATENT DOCUMENTS

| | | |
|---|---|---|
| 2018/0079574 A1 | 3/2018 | Ishihara et al. |
| 2018/0118438 A1 | 5/2018 | Yamamoto et al. |
| 2018/0236741 A1 | 8/2018 | Hargett et al. |
| 2018/0237172 A1 | 8/2018 | Lester et al. |
| 2018/0257836 A1 | 9/2018 | McGuire et al. |
| 2018/0297725 A1 | 10/2018 | Bourgeois et al. |
| 2018/0312283 A1 | 11/2018 | Bourgeois et al. |
| 2018/0312286 A1 | 11/2018 | Lester et al. |
| 2018/0370709 A1 | 12/2018 | Kim |
| 2019/0352033 A1 | 11/2019 | Lester |
| 2020/0024053 A1 | 1/2020 | Borrero |
| 2020/0024056 A1 | 1/2020 | Borrero |
| 2021/0284420 A1 | 9/2021 | Borrero et al. |
| 2021/0291480 A1 | 9/2021 | Opuszko et al. |
| 2021/0309435 A1 | 10/2021 | Zhang et al. |
| 2022/0041364 A1 | 2/2022 | Lester et al. |
| 2022/0135310 A1 | 5/2022 | Borrero et al. |
| 2022/0185568 A1 | 6/2022 | Borrero et al. |
| 2022/0204241 A1 | 6/2022 | Borrero et al. |

FOREIGN PATENT DOCUMENTS

| | | |
|---|---|---|
| CN | 101357705 A | 2/2009 |
| CN | 201332783 Y | 10/2009 |
| CN | 202863950 U | 4/2013 |
| CN | 104245058 A | 12/2014 |
| CN | 104284778 A | 1/2015 |
| CN | 105408226 A | 3/2016 |
| CN | 206278472 U | 6/2017 |
| CN | 107107477 A | 8/2017 |
| CN | 110817123 A | 2/2020 |
| CN | 111231470 A | 6/2020 |
| DE | 102012214862 A1 | 5/2014 |
| EP | 1251080 A1 | 10/2002 |
| EP | 2014576 A1 | 1/2009 |
| EP | 2631195 A1 | 8/2013 |
| EP | 2801537 A1 | 11/2014 |
| EP | 3575239 A1 | 12/2019 |
| FR | 2680764 B1 | 3/1994 |
| GB | 330566 A | 6/1930 |
| GB | 1403912 A | 8/1975 |
| GB | 2213464 A | 8/1989 |
| JP | H05201473 A | 8/1993 |
| JP | 2001240138 A | 9/2001 |
| JP | 2003118772 A | 4/2003 |
| JP | 2011073717 A | 4/2011 |
| JP | 2017137112 A | 8/2017 |
| WO | 9601775 A1 | 1/1996 |
| WO | 9737905 A1 | 10/1997 |
| WO | 03082699 A1 | 10/2003 |
| WO | 2004103851 A1 | 12/2004 |
| WO | 2012073004 | 6/2012 |
| WO | 2014199368 A1 | 12/2014 |
| WO | 2015012558 A1 | 1/2015 |
| WO | 2016078579 A1 | 5/2016 |
| WO | 2017150857 A2 | 9/2017 |
| WO | 2018080909 A1 | 5/2018 |

OTHER PUBLICATIONS

PCT Search Report and Written Opinion for PCT/US2022/076319 dated Dec. 12, 2022, 12 pages.
All Office Actions; U.S. Appl. No. 16/515,317, filed Jul. 18, 2019.
All Office Actions; U.S. Appl. No. 16/515,331, filed Jul. 18, 2019.
All Office Actions; U.S. Appl. No. 16/515,365, filed Jul. 18, 2019.
All Office Actions; U.S. Appl. No. 16/515,416, filed Jul. 18, 2019.
All Office Actions; U.S. Appl. No. 16/515,507, filed Jul. 18, 2019.
All Office Actions; U.S. Appl. No. 16/515,537, filed Jul. 18, 2019.
All Office Actions; U.S. Appl. No. 16/515,887, filed Jul. 18, 2019.
All Office Actions; U.S. Appl. No. 16/516,173, filed Jul. 18, 2019.
All Office Actions; U.S. Appl. No. 16/516,175, filed Jul. 18, 2019.
All Office Actions; U.S. Appl. No. 17/190,452, filed Mar. 3, 2021.
All Office Actions; U.S. Appl. No. 17/500,252, filed Oct. 13, 2021.
All Office Actions; U.S. Appl. No. 17/506,026, filed Oct. 20, 2021.
All Office Actions; U.S. Appl. No. 17/684,466, filed Mar. 2, 2022.
All Office Actions; U.S. Appl. No. 17/691,163, filed Mar. 10, 2022.
Campbell, Phillip John, "The Rigidified Standing Pouch—A Concept For Flexible Packaging", A Thesis Written In Partial Fulfillment Of The Requirements For The Degree Of Master Of Industrial Design, North Carolina State University School Of Design Raleigh, 1993, pp. 1-35.
U.S. Appl. No. 17/684,466, filed Mar. 2, 2022, to Susana E. Borrero et al.

* cited by examiner

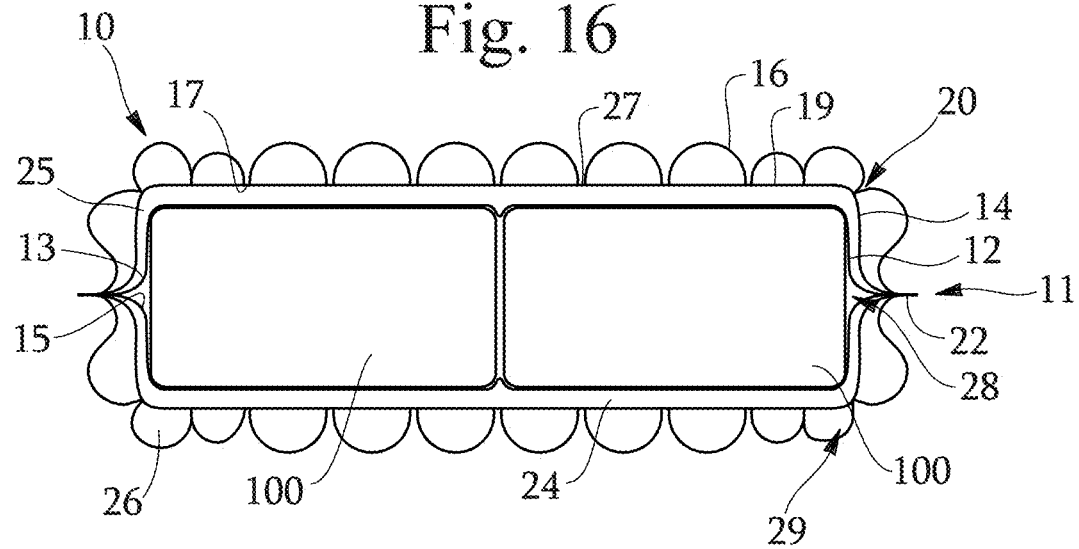

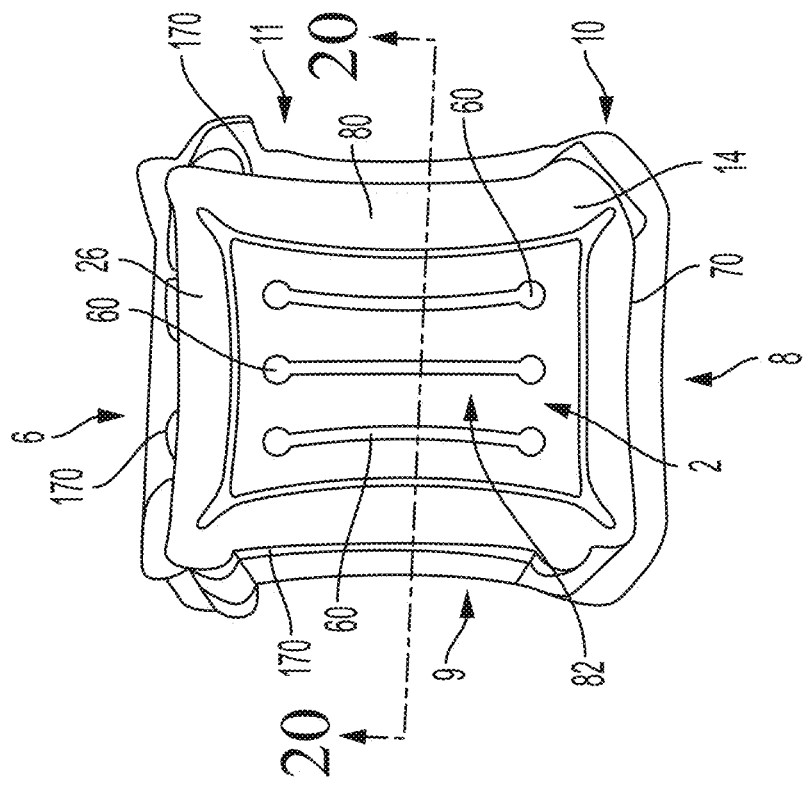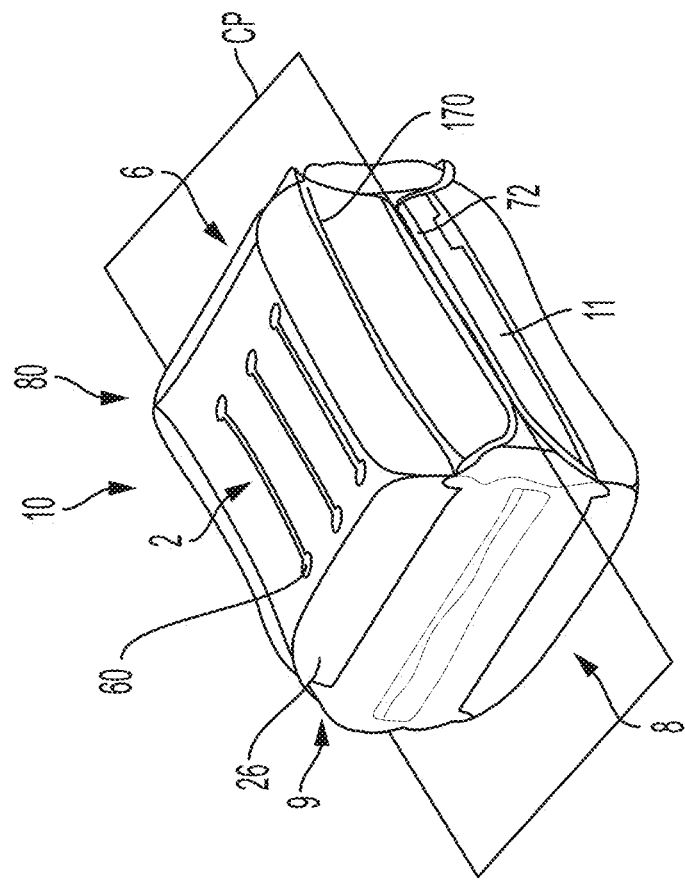

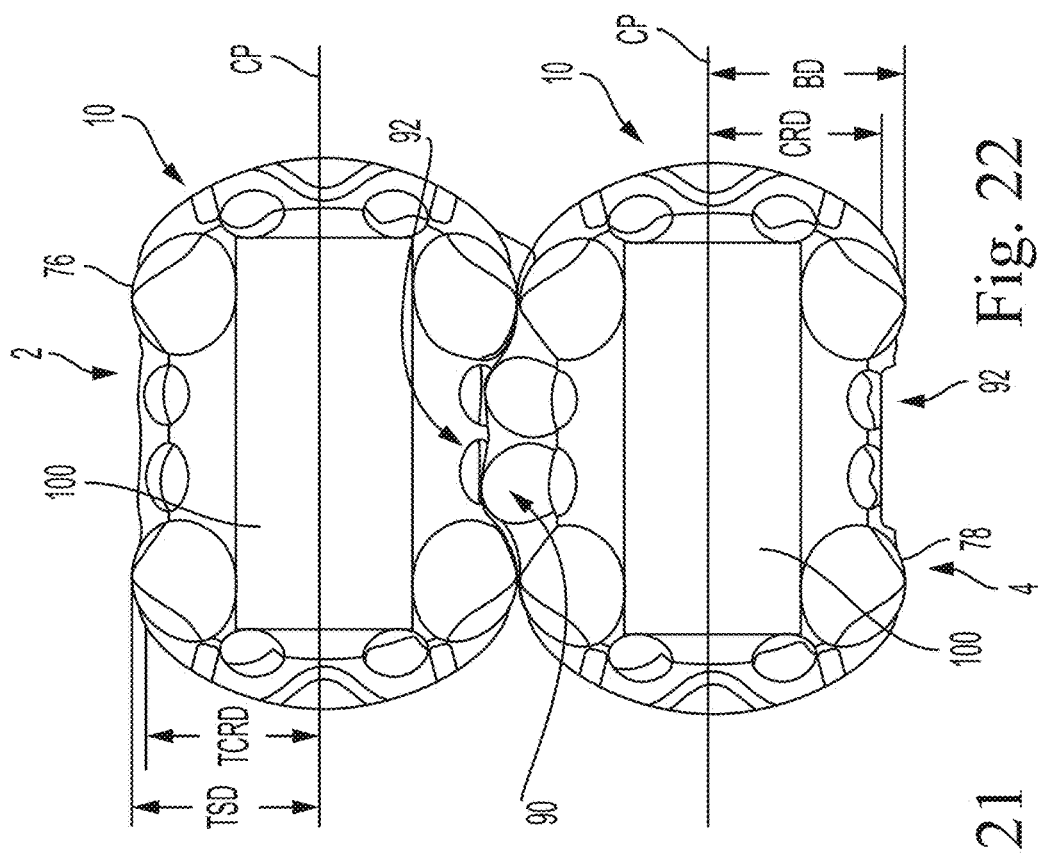
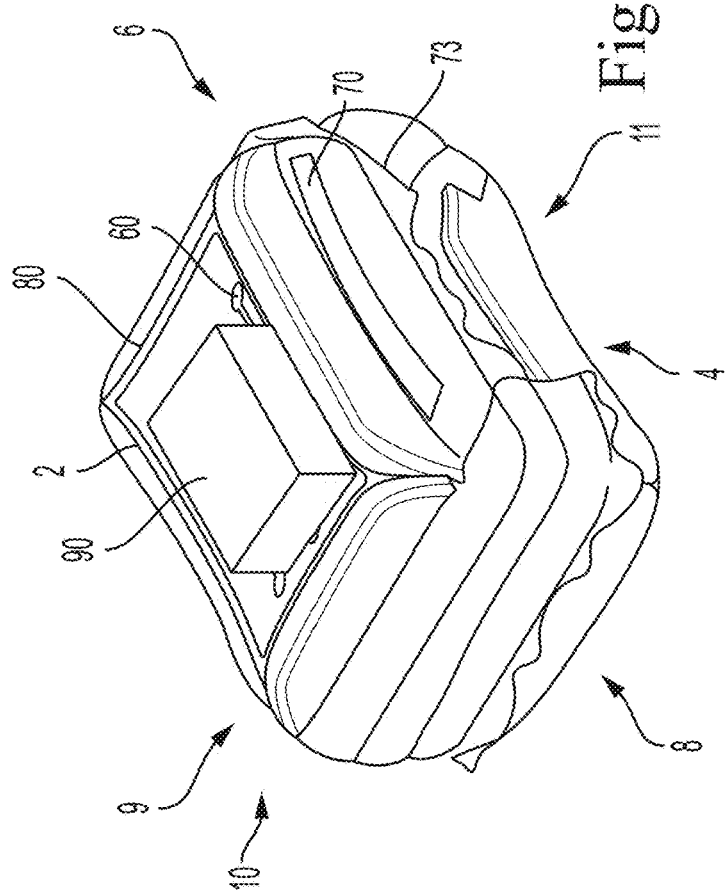
Fig. 21
Fig. 22

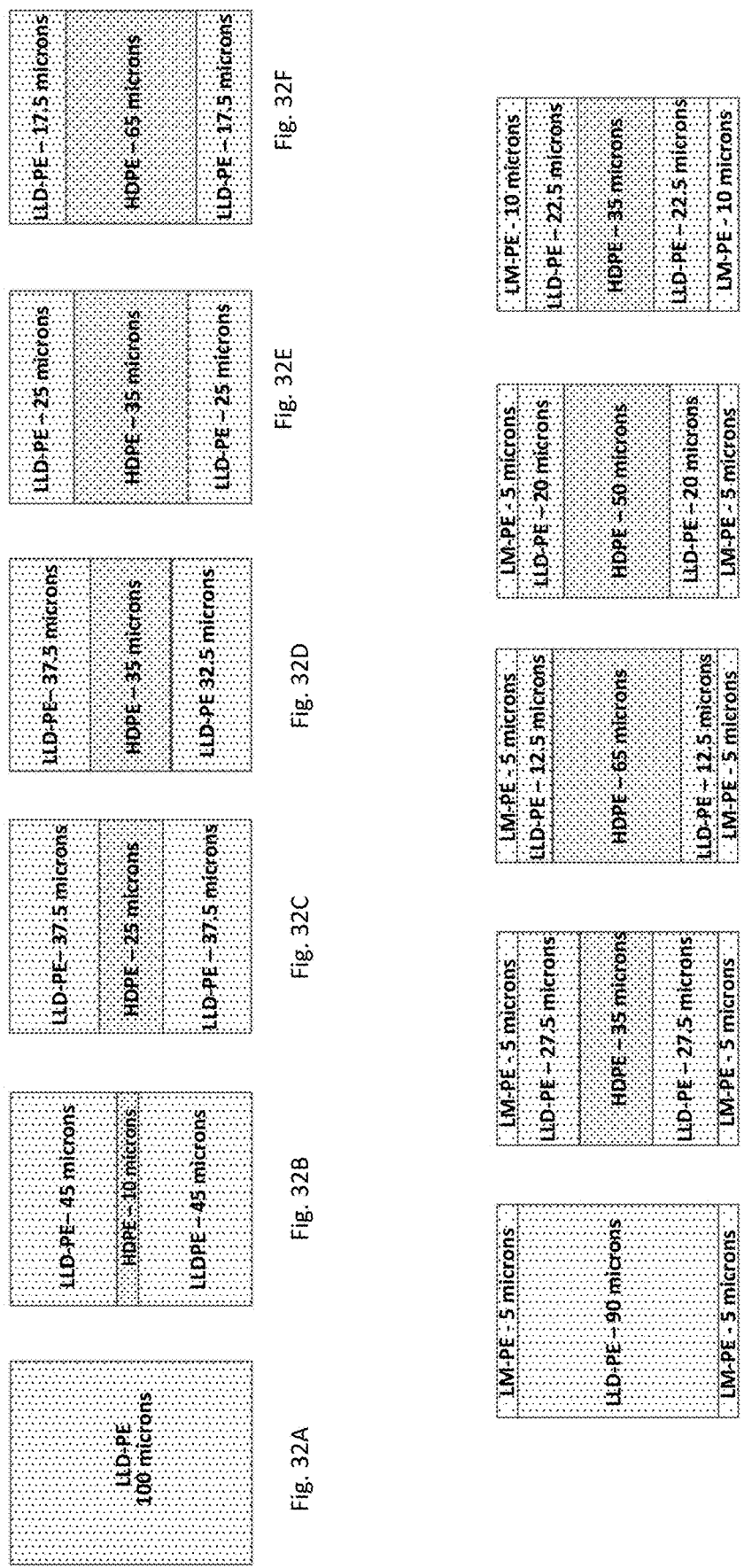

SHAPED FLEXIBLE SHIPPING PACKAGE AND METHOD OF MAKING

FIELD OF THE INVENTION

The present disclosure relates in general to shipping packages, and, in particular to shipping packages made from one or more flexible materials.

BACKGROUND

E-commerce, or the use of the internet to find and purchase goods, is becoming a very popular way for consumers to shop. The advantages of e-commerce are many, such as -time-savings; competition; shopping at home, work or virtually anywhere; and importantly, the purchaser not having to transport the purchased articles from the location of purchase to the place of use. In the e-commerce system, goods purchased by consumers are generally transported to their homes or places of use by the seller or a service used by the seller. Many e-commerce retailers rely on shipping their goods through the mail, including government mail services and other private and semi-private mail services, or through other parcel or parcel-like delivery services. Such mail and parcel services are typically quite convenient to both the buyer and seller. However, transportation of fragile, heavy and/or bulky goods can be quite expensive due to the cost of the manual labor and materials needed to protect the goods during shipment.

These aspects, and others, relating to the shipment of goods through current mail and parcel delivery services create unique issues that, if not addressed, can negatively affect the cost and quality of the goods sold. For example, when shipping goods to consumers, the goods generally need to be disposed in a package that is strong, lightweight and convenient for the shipper and for the customer. That is, it should be designed to be capable of protecting the products being shipped from external conditions throughout the shipping process, and preferably so as to minimize material usage, weight and bulkiness. It should also be easy to construct, pack, close, label, open, and discard. If the shipping package does not meet any one or all of these characteristics, it can lead to extra costs, inconvenience for the seller or buyer, product damage, and/or consumer dissatisfaction.

Currently, most shipping packages are in the form of flexible pouch (e.g. envelope) made from paper or plastic, or a box, often constructed from corrugated paperboard or cardboard. Although these shipping packages can be used to ship many different types of goods and are reasonably inexpensive, they generally are generic in the sense that they do not provide a custom fit for the products being shipped. This can lead to additional packaging being required to prevent damage to the products being shipped, significant volume being taken up in shipping trucks and warehouses due to the ill-fitting packaging, and difficulty for the consumer to open and/or discard of the shipping packaging. To address the ill-fitting, generic packaging, sellers often fill the outer shipping packages with some type of material intended to occupy the open area not filled by the goods themselves. Alternatively, sellers may employ additional processes to manipulate the products, and/or add protective layers to the product or primary packaging to ensure the product can be safe when placed into generic containers. However, both of these scenarios add more steps to process, weight, waste, and cost to the packaging and packing process, and often makes the consumer's experience when opening the package less than desirable (e.g. "packing peanuts" falling out of the package, needing a tool to open the package, etc.). Further, many of the current shipping packages are not weather or environment-resistant and can be damaged by or allow damage to the products being shipped by precipitation, wet surfaces and/or humidity. Accordingly, often such packages are wrapped in additional materials or must be placed in protected locations if they are to be left outside or unattended for any period of time.

In addition, packages made of flexible materials such as films and webs often cause problems during shipping and/or handling because they are difficult to transport on conveyor equipment and/or are difficult to stack. Such deficiencies can lead to product and equipment breakage as well as increased costs and time needed for shipping and handling. Further, such flexible packages are typically not shaped in a way to advantageously protect the products therein and/or to provide improved shipping and handling.

Thus, it would be desirable to provide a shipping package that is low cost, yet customizable in terms of fit to the products being shipped. It also would be desirable to provide a shipping package that requires no additional fill to protect the goods. It also would be desirable to provide a shipping package that is easy to pack. It also would be desirable to provide a shipping package that is easy to open. It also would be desirable to provide a shipping package that is lightweight yet provides protection to the goods being shipped. It also would be desirable to provide a shipping package that is easy to close. It also would be desirable to provide a shipping package that is easy to discard. It also would be desirable to provide a shipping package that takes up very little volume before and after use and is efficient in terms of volume when configured for shipping. It would also be desirable to provide a flexible package that can be easily conveyed on conveyor equipment. It would also be desirable to provide a flexible package that can be easily stacked. It would also be desirable to provide a package made of flexible materials such as films, webs, sheets and the like that can be advantageously shaped to protect the contents of the package, provide for easy handling and transportation, provide for easy filling and/or to provide for stacking with similar or different packages. It would also be desirable to provide a shipping package made of flexible materials that is shaped by expanding certain chambers therein. It would also be desirable to provide a shipping package made from flexible materials that is shaped by expansion of certain chambers therein and includes gussets to help provide the desired shape and to help enable products of different sizes to better fit within the package while maintaining its desired shape.

It would also be desirable to provide a shipping package made from two or more layers of flexible materials that is shaped by expansion of certain chambers therein and includes one or more expansion control tacks between layers to help provide the desired shape. It would also be desirable to provide a shipping package that is made of flexible materials that includes one or more expansion chambers that can be expanded to shape the package in the shape of a parallelepiped. It would also be desirable to provide flexible materials having sufficient strength and the ability to form strong seals without compromising the structural integrity of the material, so as not to rupture during the inflation and shipping processes; and have sufficient flexibility to allow for inflation without breaking the flexible material along seal lines. It would also be desirable to provide flexible materials having creep resistance to prevent critical amounts of creep while inflated and during the shipping process. It would also be desirable to provide flexible materials that are able to maintain a sufficient air barrier in chambers for the shipping process.

It would be desirable that the flexible material(s) used in the construction of the package be of a single material type that would allow the package, for example, to be readily recycled (for example, after its use). It may be desirable that the flexible material be a laminate or coextrusion of different grades of a single material type. Given currently available recycling streams, it may be desirable that the laminate flexible material include different grades of polypropylene.

These and other benefits may be provided by one or more of the embodiments of the invention described herein.

SUMMARY

A flexible package for shipping one or more articles is provided that comprises an inner sheet having a first surface and a second surface, an inner sheet first portion and an inner sheet second portion; an outer sheet having an outer sheet first portion and an outer sheet second portion, at least a part of the outer sheet first portion being connected to the first surface of the inner sheet to form one or more primary expansion chambers therebetween, the inner sheet second portion extending from the inner sheet first portion and being folded back onto the second surface of the inner sheet first portion to form an article reservoir between the inner sheet second portion and the inner sheet first portion; an expansion port in fluid connection with the one or more primary expansion chambers through which an expansion material can be introduced into the one or more expansion chambers; a closeable opening into which the one or more articles may be inserted; wherein the inner sheet and outer sheet comprise a multi-layered polypropylene film having two or more layers.

A flexible package for one or more articles is provided that comprises an article reservoir, a top surface and a bottom surface; an inner sheet and a flexible secondary inner sheet, the inner sheet and secondary inner sheet joined together at an outer seam and forming one or more primary expansion chambers adapted to receive a primary expansion material; and a flexible secondary outer sheet and an outer sheet, the secondary outer sheet and the outer sheet joined together at an outer seam and forming one or more secondary expansion chambers adapted to receive a secondary expansion material and; wherein the one or more non-expansion chambers are provided on the top surface over the one or more primary expansion chambers; wherein the inner sheet and outer sheet comprise a multi-layered polypropylene film having three or more layers.

A method of making a flexible package is provided that comprises the steps of providing an inner sheet having an inner sheet first portion, an inner sheet second portion, an inner sheet first surface, an inner sheet second surface; providing an outer sheet in face-to-face relationship with the inner sheet, the outer sheet having an outer sheet first portion, and an outer sheet second portion; joining at least a portion of the outer sheet first portion to the first surface of the inner sheet first portion to form one or more first primary expansion chambers therebetween; joining at least a part of the outer sheet second portion to the first surface of the inner sheet second portion to form one or more second primary expansion chamber therebetween; joining at least a portion of the second surface of the inner sheet first portion with a portion of the second surface of the second portion of the inner sheet forming an article reservoir therebetween; providing an expansion port in fluid connection with at least one of the first primary or second primary expansion chambers through which an expansion material can be introduced into the expansion chamber; providing a closeable opening into which the one or more articles may be inserted, the opening extending from an exterior of the flexible package to the article reservoir; and providing an article retrieval feature that allows a user to open the flexible package and retrieve the one or more articles from the article reservoir.

BRIEF DESCRIPTION OF THE DRAWINGS

Several figures are provided to help the reader understand the invention. The figures are intended to be viewed in conjunction with the specification and are not intended to be limiting beyond that of the wording of the specification. Reference numbers are used to identify different features of the figures. The same reference numbers are used throughout the specification and drawings to show the same features, regardless of the variation of the invention that is depicted.

FIG. 16 is a cross-sectional view of the flexible package of FIG. 14 having two articles inside the article reservoir.

FIG. 17 is an isometric view of a flexible package of the present invention having a parallelepiped shape.

FIG. 18A is a plan view of the top of the flexible package of FIG. 17.

FIG. 21 an isometric view of a flexible package in accordance with the present invention.

FIG. 22 is a cross-sectional view of two stacked flexible packages in accordance with the present invention.

FIGS. 32A-32K are illustrations of Examples A-K.

DETAILED DESCRIPTION

Figure 1:
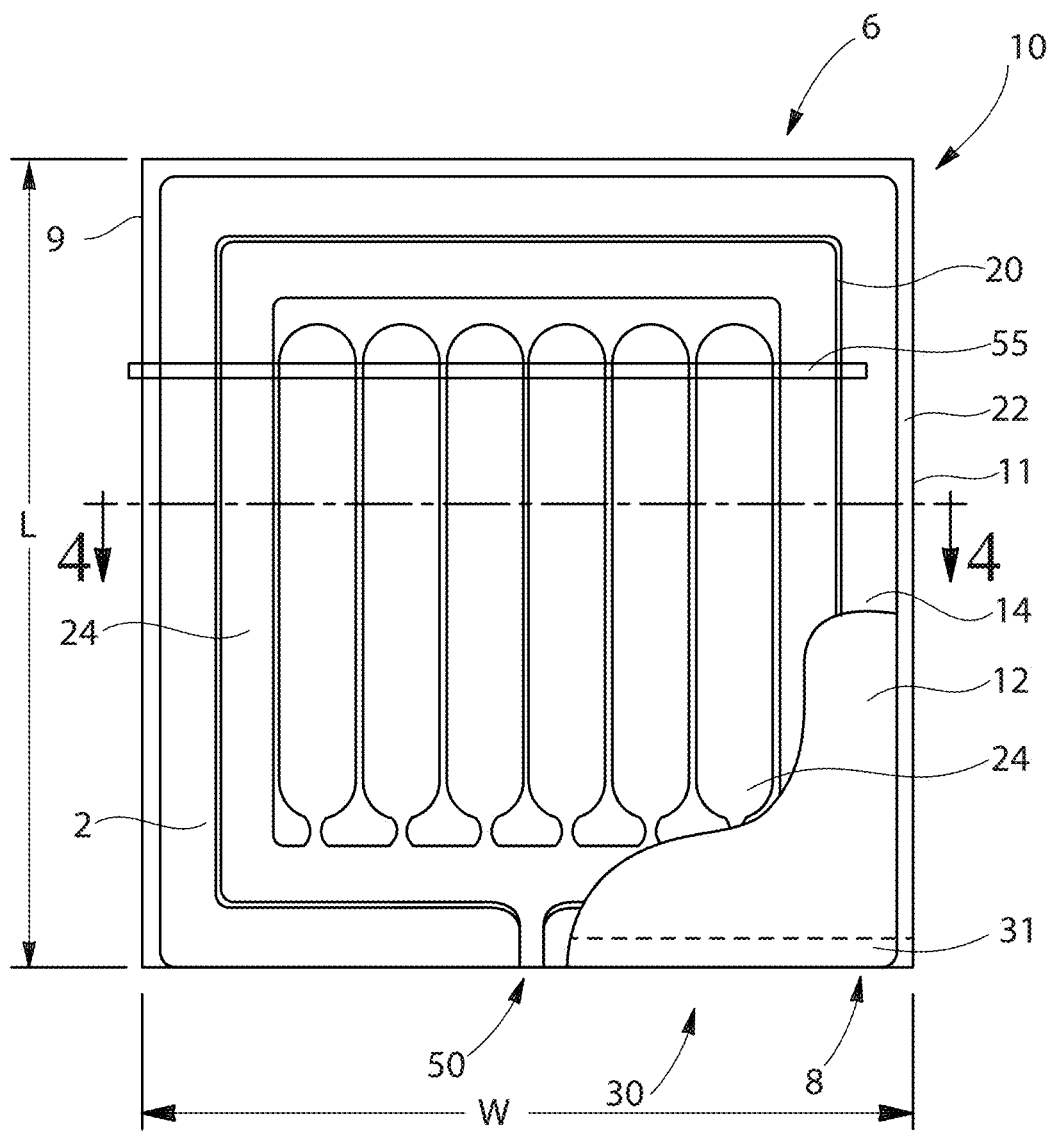
FIG. 1 illustrates a plan view of a flexible package of the type disclosed herein in an unexpanded state.

The present disclosure describes packages, such as primary packages, secondary packages, shipping packages, display packages and/or other packages having one or more multi-layered flexible materials. Although the invention is described and illustrated herein as a flexible package, the disclosure is not intended to limit the scope of the invention to a particular use and the disclosure should be considered applicable to all different types of packages having the disclosed features. Because these packages are made from flexible material(s), they can be less expensive to make, can use less material, can provide better protection, and can be easier to decorate, when compared with conventional rigid packages. These packages can be less expensive to make because the conversion of flexible materials (from sheet form to finished goods) generally requires less energy and complexity than formation of rigid materials (from bulk form to finished goods). They may use less material, because they are configured with novel support structures that do not require the use of the thick solid walls used in conventional rigid packages. They also can be easier to decorate because their flexible materials can be easily printed before or after they are constructed into three-dimensional flexible packages. Such flexible packages can be less prone to scuffing, denting, and rupture, because flexible materials allow their outer surfaces to deform when contacting surfaces and objects, and then to return to their original shape. They can provide better protection by making the packages out of weather and environment-resistant materials and configuring the materials in such a way (e.g. expansion of portions thereof) to provide protection from dropping and other physical forces during shipping and handling.

Importantly, even though the flexible packages of the present disclosure are made from flexible material(s), they can be configured with sufficient structural integrity, such that they can receive and contain one or more articles or products, as intended, without failure. Also, these packages can be configured with sufficient structural integrity, such that they can withstand external forces and environmental conditions from shipping and handling, without failure.

Yet another desirable feature of the packages of the present invention is that they can be easily shaped and configured for machine handling and use with autonomous vehicles and drones. The packages provide protection from bumping and dropping and have expandable chambers that can be used to provide grip regions for humans and machines.

As used herein, the term "closed" refers to a state of a package, wherein any articles or products within the package reservoir are prevented from escaping the package (e.g. by one or more materials that form a barrier), but the package is not necessarily hermetically sealed. For example, a closed package can include a vent, which allows a head space in the package to be in fluid communication with air in the environment outside of the package.

As used herein, when referring to a flexible package, the terms "disposable" and "single use" refer to packages which, after being used for its intended purpose (e.g. shipping a product to an end user), are not configured to be reused for the same purpose, but is configured to be disposed of (i.e. as waste, compost, and/or recyclable material). Part, parts, or all of any of the flexible packages, disclosed herein, can be configured to be disposable and/or recyclable.

As used herein, when referring to a flexible package, the term "durable" refers to a package that is intended to be used more than one time. Part, parts, or all of any of the flexible packages, disclosed herein, can be configured to be durable and/or recyclable.

As used herein, when referring to a flexible package, the term "expanded" or "inflated" refers to the state of one or more flexible materials that are configured to change shape when an expansion material is disposed therebetween. An expanded structure has one or more dimensions (e.g. length, width, height, thickness) that is significantly greater than the combined thickness of its one or more flexible materials, before the structure has one or more expansion materials disposed therein. Examples of expansion materials include liquids (e.g. water), gases (e.g. compressed air), fluent products, foams (that can expand after being added into a structural support volume), co-reactive materials (that produce gas or foam), or phase change materials (that can be added in solid or liquid form, but which turn into a gas; for example, liquid nitrogen or dry ice), or other suitable materials known in the art, or combinations of any of these (e.g. fluent product and liquid nitrogen). Expansion materials can be added at atmospheric pressure, or added under pressure greater than atmospheric pressure, or added to provide a material change that will increase pressure to something above atmospheric pressure. For any of the flexible packages disclosed herein, its one or more flexible materials can be expanded at various points in time with respect to its manufacture, sale, and use. For example, one or more portions of the package may be expanded before or after the article or product to be shipped in the package is inserted into the package, and/or before or after the flexible package is purchased by an end user.

As used herein, the term "flexible package" refers to a flexible package configured to have an article reservoir for containing one or more articles for shipment. Examples of flexible packages are film, woven web, non-woven web, paper or foil-based packages made from one or more flexible materials.

As used herein, when referring to a flexible package, the term "flexible material" refers to a thin, easily deformable, sheet-like material, having a flexibility factor within the range of 1,000-2,500,000 N/m. Flexible materials can be configured to have a flexibility factor of 1,000-2,500,000

N/m, or any integer value for flexibility factor from 1,000-2,500,000 N/m, or within any range formed by any of these values, such as 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m, or 45,000-85,000 N/m, etc. Throughout the present disclosure the terms "flexible material", "flexible sheet", "sheet", and "sheet-like material" are used interchangeably and are intended to have the same meaning. Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate, or as part(s) of a composite material, in a microlayered or nanolayered structure, and in any combination, as described herein or as known in the art. Part, parts, or all of a flexible material can be coated or uncoated, treated or untreated, processed or unprocessed, in any manner known in the art. Part, parts, or about all, or approximately all, or substantially all, or nearly all, or all of a flexible material can made of sustainable, bio-sourced, recycled, recyclable, and/or biodegradable material. Part, parts, or about all, or approximately all, or substantially all, or nearly all, or all of any of the flexible materials described herein can be partially or completely translucent, partially or completely transparent, or partially or completely opaque. The flexible materials used to make the packages disclosed herein can be formed in any manner known in the art, and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

As used herein, the term "joined" refers to a configuration wherein elements are either directly connected or indirectly connected.

As used herein, when referring to a sheet or sheets of flexible material, the term "thickness" refers to a linear dimension measured perpendicular to the outer major surfaces of the sheet, when the sheet is lying flat. The thickness of a package is measured perpendicular to a surface on which the package is placed such that the sheet would be lying flat if the package were not in an expanded state. To compare the thickness of a package in an unexpanded state, an expanded state and a deflated state, the thickness of each should be measured in the same orientation on the same surface. For any of the configurations, the thickness is considered to be the greatest thickness measurement made across the surface or face of the article in that particular orientation.

As used herein, the term "article reservoir" refers to an enclosable three-dimensional space that is configured to receive and contain one or more articles or products. This three-dimensional space may enclose a volume, the "article reservoir volume". The articles or products may be directly contained by the materials that form the article reservoir. By directly containing the one or more products, the products come into contact with the materials that form the enclosable three-dimensional space, there is no need for an intermediate material or package. Throughout the present disclosure the terms "reservoir" and "article reservoir" are used interchangeably and are intended to have the same meaning. The flexible packages described herein can be configured to have any number of reservoirs. Further, one or more of the reservoirs may be enclosed within another reservoir. Any of the reservoirs disclosed herein can have a reservoir volume of any size. The reservoir(s) can have any shape in any orientation.

As used herein, when referring to a flexible package, the term "expansion chamber" refers to a fillable space made from one or more flexible materials, wherein the space is configured to be at least partially filled with one or more expansion materials, which create tension in the one or more flexible materials, and form an expanded volume.

As used herein, when referring to a flexible package, the term "unexpanded" refers to the state of an expansion chamber, prior to expanding the chamber, when the chamber does not include an expansion material.

Flexible packages, as described herein, may be used across a variety of industries for a variety of products. For example, flexible packages, as described herein, may be used for shipping across the consumer products industry, including but not limited to the following products: cleaning products, disinfectants, dishwashing compositions, laundry detergents, fabric conditioners, fabric dyes, surface protectants, cosmetics, skin care products, hair treatment products, soaps, body scrubs, exfoliants, astringents, scrubbing lotions, depilatories, antiperspirant compositions, deodorants, shaving products, pre-shaving products, after shaving products, toothpaste, mouthwash, personal care products, baby care products, feminine care products, insect repellants, foods, beverages, electronics, medical devices and goods, pharmaceuticals, supplements, toys, office supplies, household goods, automotive goods, aviation goods, farming goods, clothing, shoes, jewelry, industrial products, and any other items that may be desirable to ship through the mail or other parcel services, etc.

The flexible packages disclosed herein can be configured to have an overall shape. In the unexpanded state, the overall shape may correspond to any known two-dimensional shape including polygons (shapes generally comprised of straight-portions connected by angles), curved-shapes (including circles, ovals, and irregular curved-shapes) and combinations thereof. In the expanded state, the overall shape may correspond with any other known three-dimensional shape, including any kind of polyhedron, any kind of prismatoid, any kind of prism (including right prisms and uniform prisms), and any kind of parallelepiped.

FIG. 1 illustrates a plan view of the top panel 2 of a flexible package 10 of the type disclosed herein in an unexpanded state. As used herein, the term "panel" refers to a portion of the package 10 and may be a separate piece of material joined to other materials to form the package 10 or may be a part of one or more pieces of material that make up other parts of the package 10. As shown, the package 10 includes an inner sheet 12 and an outer sheet 14. The inner sheet 12 is at least partially joined to the outer sheet 14 along primary expansion chamber seams 20. The package 10, as shown, has a length L, a width W, sides 9 and 11 and opposing ends 6 and 8.

Figure 2:
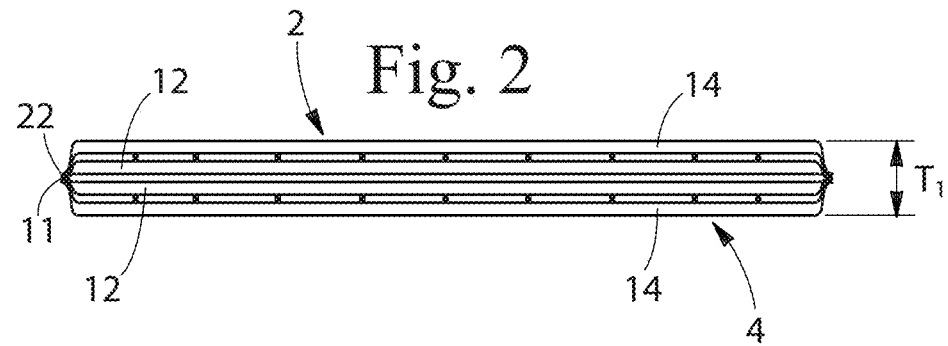
FIG. 2 illustrates a side view of the flexible package of FIG. 1.

FIG. 2 illustrates a side view of the flexible package of FIG. 1. As can be seen, the package 10 may be relatively thin, flat and planar in its unexpanded state. That is, the unexpanded thickness T1 of the package 10 is relatively small when compared to the length L and width W of the package 10 in its unexpanded state or configuration, as well as the thickness T2 of the package 10 in an expanded configuration (e.g. FIG. 4). As shown in FIG. 2, the package 10 of FIG. 1 may be constructed from two separate, two-sheet pieces joined together to form a top panel 2 and a bottom panel 4 of the package 10. The top panel 2 is joined to the bottom panel 4 along at least a portion of sides 9 and 11 of the package 10 at one or more exterior seams 22. The terms "top" and "bottom" are not intended to be limiting, but rather merely to help more clearly distinguish parts of the package from each other. As such, unless specifically set forth, the terms should not be considered to limit the orientation of the package in any way. The exterior seams 22 can take on any desired shape and size and can be formed by any suitable method or material. For example, the exterior seams 22 may be formed by glue, heat (e.g. ultrasound, conductive sealing, impulse sealing, ultrasonic sealing, or welding), mechanical crimping, sewing, or by any other known or developed technology for joining sheets of material.

Figure 3:
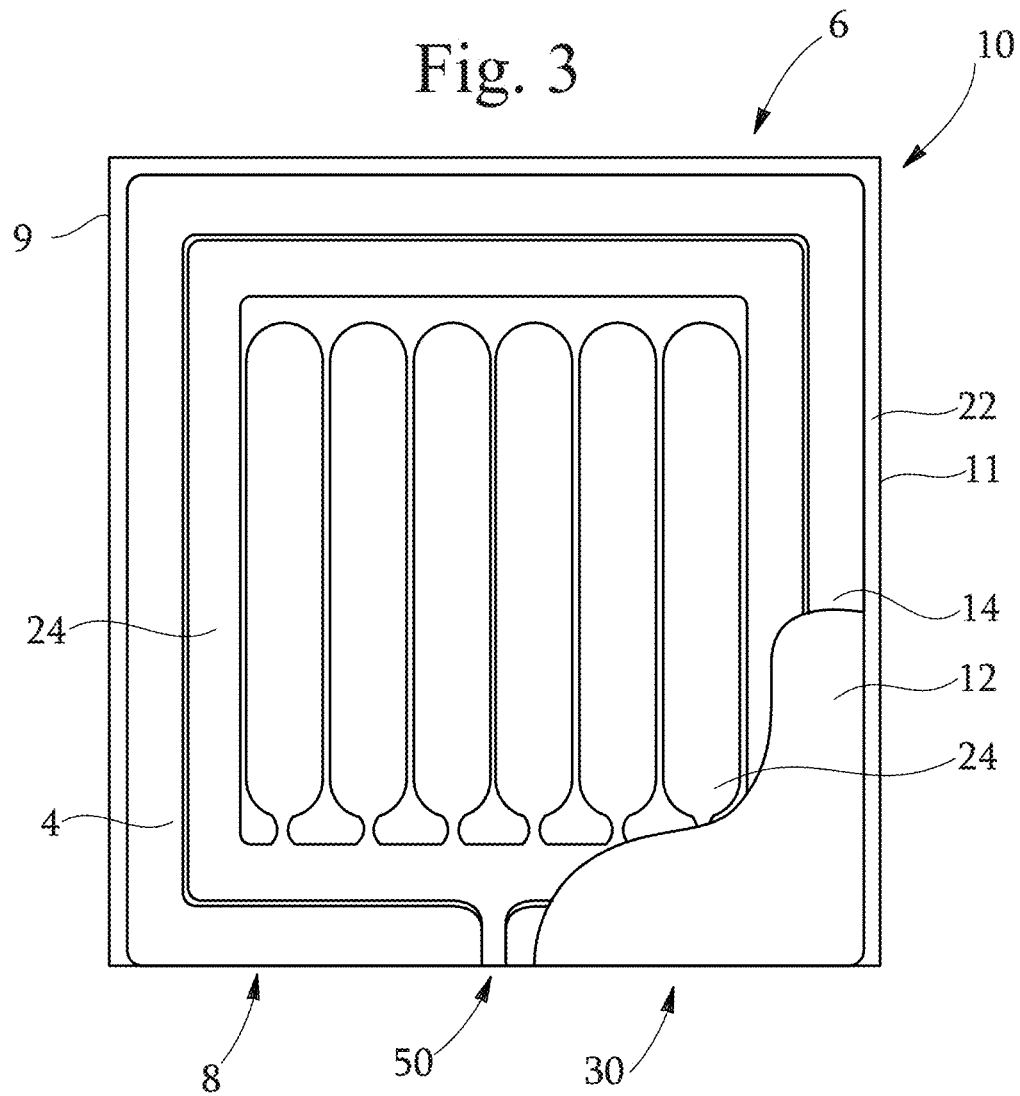
FIG. 3 illustrates a bottom view of the flexible package of FIG. 1.

FIG. 3 illustrates a plan view of the bottom panel 4 of the flexible package 10 of FIG. 1. As shown, the bottom panel 4 has an inner sheet 12 and an outer sheet 14. Similar to that shown in FIG. 1, the inner sheet 12 is at least partly connected to the outer sheet 14 to form one or more primary expansion chambers 24 described in more detail, below. If more than one primary expansion chamber 24 is provided, the primary expansion chambers 24 may be independent from each other (e.g. discrete) or in fluid communication with each other, depending on the desired characteristics of the package. When discrete primary expansion chambers are used, any number of such chambers is envisioned, and the discrete chambers may be disposed symmetrically or asymmetrically throughout the package. When in fluid communication, the primary expansion chambers 24 can be expanded (e.g. inflated) or deflated as a single unit, whereas if they are independent from each other, they may be expanded or deflated separately or expanded together and subsequently sealed from one another. Additionally, it is possible to use a manifold or the like to reduce the number of ports needed to introduce an expansion material into the expansion chambers 24. The manifold may be formed as part of the package blank from the flexible materials of the package or provided separately from the package. All or a portion of the manifold can be removed after use or may remain as part of the package 10 throughout use.

Figure 4:
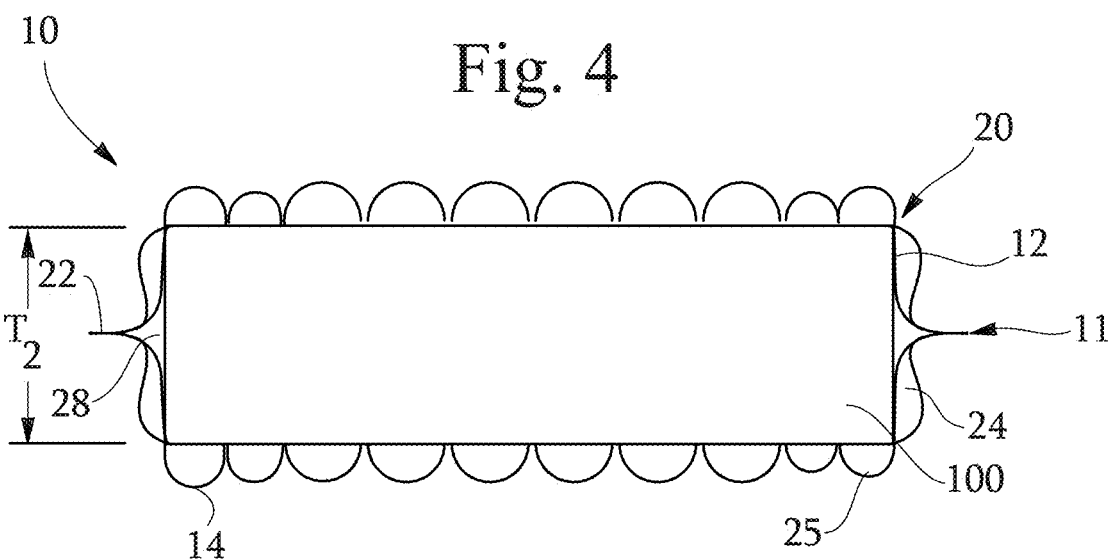
FIG. 4 is cross-sectional view of the flexible package of FIG. 1, as seen through section 4-4, having an article inside the article reservoir, wherein the package is in an expanded state.

FIG. 4 is a cross-sectional view of the flexible package 10 shown in FIG. 1 taken through section 4-4. The package 10 is shown in an expanded state and has article 100 therein. As can be seen, the inner sheet 12 is joined to the outer sheet 14 in at least the area of the exterior seam 22 to form a primary expansion chamber 24. The primary expansion chamber 24 is in an expanded configuration where an expansion material 25 has been provided into the primary expansion chamber 24. The expansion material 25 increases the spacing between the sheets forming the volume of the primary expansion chamber(s) 24 such that the expanded primary expansion chamber(s) 24 each have a volume that is greater than the primary expansion chamber(s) 24 volume when not filled with the expansion material 25. The primary expansion chamber(s) 24 may provide structural rigidity, mechanical protection and/or shape to the flexible package 10 when in an expanded configuration. They may also help to restrain any articles 100 placed into the package 10.

The package 10 in its expanded configuration has an expanded thickness T2. The expanded thickness T2 is significantly larger than the unexpanded thickness T1. The ability for the package to change size between its unexpanded state and expanded state is one of the reasons why the package of the present invention is unique and advantageous. The package 10 can be manufactured, shipped and stored in an unexpanded state and then expanded only when needed. This allows for significant efficiencies in terms of handling and storing the packages 10 before use. The same is true of the package 10 at the end of the shipping lifecycle. Whether it is intended to be reused or discarded, the package 10 can be deflated from its expanded state to a deflated state. As used herein, the term "deflated" means any pressure from a fluid that is causing an expansion chamber to expand has been released. A "deflated state" is when the package 10 has been expanded by introduction of an expansion material into one or more expansion chambers, but then the expansion chambers have been opened or otherwise made to be in fluid communication with the surrounding atmosphere and the expansion chambers are all in a state of equilibrium with respect to pressure of the surrounding atmosphere. Any measurements made of a package 10 in a deflated state should be made without any articles 100 in the article reservoir 28 unless otherwise set forth herein.

Figure 5:
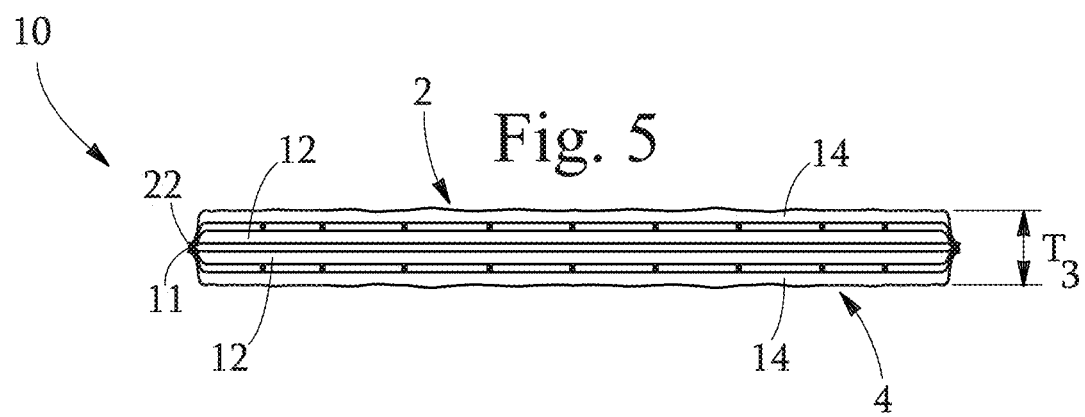
FIG. 5 shows the package of FIGS. 1-4 in a deflated state.

FIG. 5 shows the package of FIGS. 1-4 in its deflated state after the article(s) 100 have been removed. The package 10 has a deflated thickness T3 that can be significantly smaller than the expanded thickness T2. As such, the volume of waste to dispose of related to the package 10 is minimized and/or the package 10 can be stored for later use or shipped to another location re-use or refurbishment. Although the specific difference between the thicknesses of the package 10 prior to use, during use, and after use will vary depending on the particular package and materials used, the package 10 of the present invention can provide an unexpanded thickness T1 that is less than $\frac{1}{15}^{th}$ of the expanded thickness T2, less than $\frac{1}{20}^{th}$ of the expanded thickness T2, less than $\frac{1}{25}^{th}$ of the expanded thickness T2, less than $\frac{1}{50}^{th}$ of the expanded thickness T2 or even less. Similarly, the package 10 of the present invention can provide a deflated thickness T3 that is less than $\frac{1}{10}^{th}$ of the expanded thickness T2, less than $\frac{1}{15}^{th}$ of the expanded thickness T2, less than $\frac{1}{20}^{th}$ of the expanded thickness T2, less than $\frac{1}{25}^{th}$ of the expanded thickness T2 or even less. Further, the package 10 of the present invention can be configured such that the unexpanded thickness T1 and the deflated thickness T3 are both less than $\frac{1}{15}^{th}$ of the expanded thickness T2, less than $\frac{1}{20}^{th}$ of the expanded thickness T2, less than $\frac{1}{25}^{th}$ of the expanded thickness T2, or even less.

As shown in FIG. 4, an article 100 is located in the space between inner sheets 12. The space between the inner sheets 12 is referred to herein as the article reservoir 28. The article reservoir 28 can be formed between two portions of a single inner sheet 12 or can be formed between two or more different inner sheets 12, depending on the particular configuration of the package 10. The article reservoir 28 is intended to surround at least a portion of one or more articles 100 placed therein. Different shaped packages 10 can be used for different shaped articles 100, different sized articles 100, and/or different numbers of articles 100. However, one of the advantages of the package 10 of the present invention is that a single size and shape of the package can be designed and constructed to fit many different sized articles 100. This is due do the flexible nature of the materials making up the package 10 as well as the fact that portions of the package 10 can be expanded or contracted to snugly fit, for example, inner sheet 12, around the article(s) 100 and even provide for partial or complete immobilization of the article(s) in the package 100. Alternatively, or in addition, a vacuum or partial vacuum can be applied to the article reservoir 28 such the internal pressure in the article reservoir is less than the ambient pressure of the surrounding atmosphere. The vacuum can help bring the inner sheets 12 in contact with the articles 100 and to hold them snugly in place. Removing some or all of the air in the article reservoir 28 can also help to shape the package 10. That is, a vacuum can be used to pull one or more portions of the package 10, such as all or predetermined portions of the ends 6 and 8, sides 9 and 11, top panel 2, and/or bottom panel 4 toward the article reservoir 28. This can be a non-permanent way of providing a predetermined shape for the article without the need for actually joining or tacking portions of the package 10 as set forth herein. Also, a vacuum can be used in combination with seal tack areas or other shaping features to provide the desired shape of the package in its expanded form. Further still, removing the air and/or filling the reservoir 28 with a fluid other than air, such as, for example, nitrogen, can provide additional benefits depending on the particular articles 100 being shipped. For example, filling the reservoir 28 with nitrogen can help reduce the negative effects that water vapor and oxygen can have on some items. Of course, other fluids can also be used depending on the items being shipped and the desires of the shipper.

Although the package 10 shown and described with respect to FIG. 1 has two sheets, inner sheet 12 and outer sheet 14, joined together to form the top panel 2 of the package 10, any number of sheets can be used depending on the desired end structure of the package 10. Different numbers of sheets could be used to provide additional strength, decoration, protection and/or other characteristics.

Figure 6:
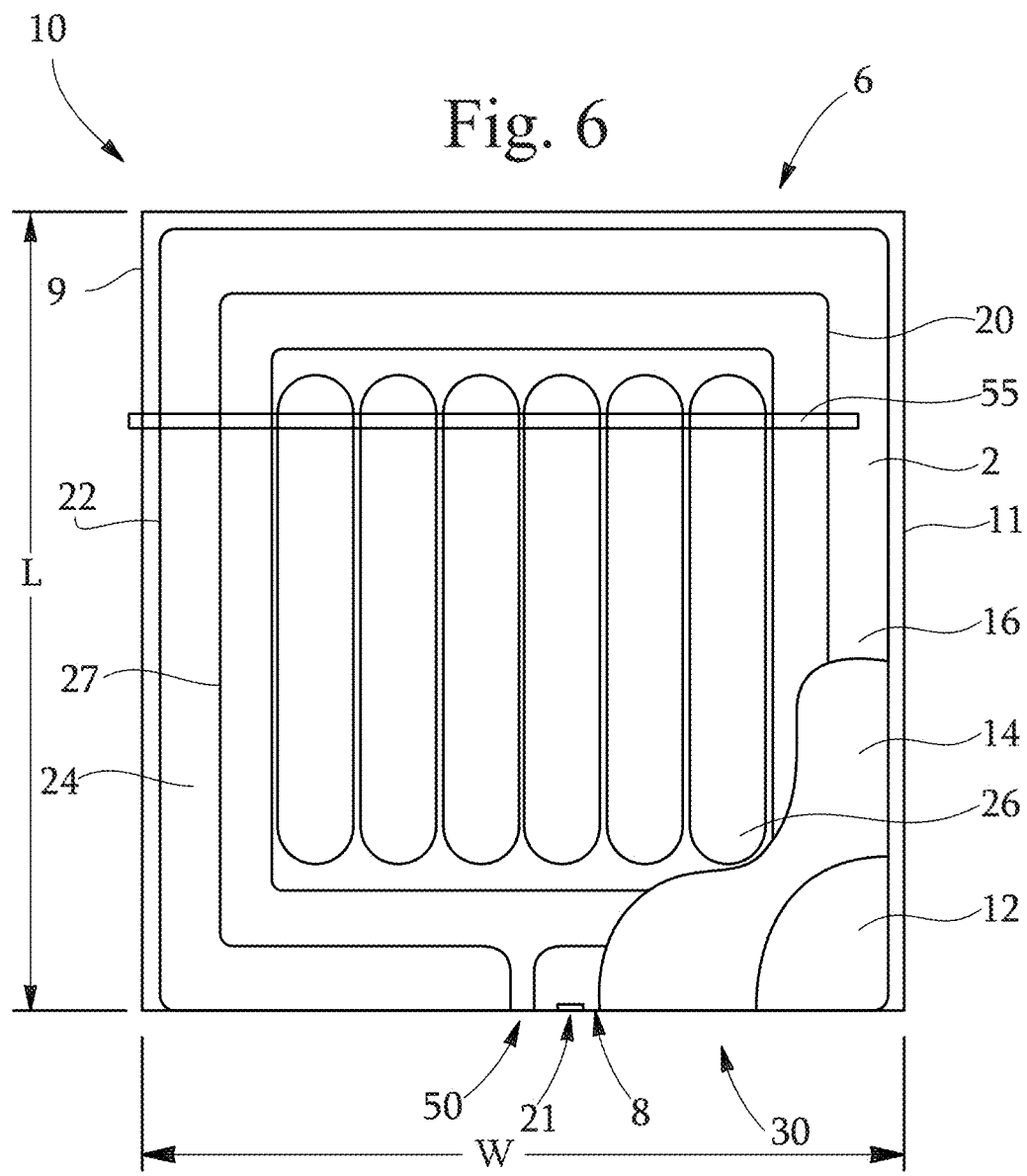
FIG. 6 illustrates a plan view of a flexible package of the type disclosed herein in an unexpanded state.

FIG. 6 illustrates a plan view of the top panel 2 of a flexible package 10 of the type disclosed herein in an unexpanded state. As shown, the package 10 includes an inner sheet 12, an outer sheet 14 and a secondary outer sheet 16. The inner sheet 12 is at least partly connected to the outer sheet 14 to form a primary expansion chamber 24. The outer sheet 14 is also at least partially joined to the secondary outer sheet 16 along secondary expansion chamber seams 27 to form at least one secondary expansion chamber 26. The package 10, as shown, has a length L, a width W, sides 9 and 11 and opposing ends 6 and 8.

Figure 7:
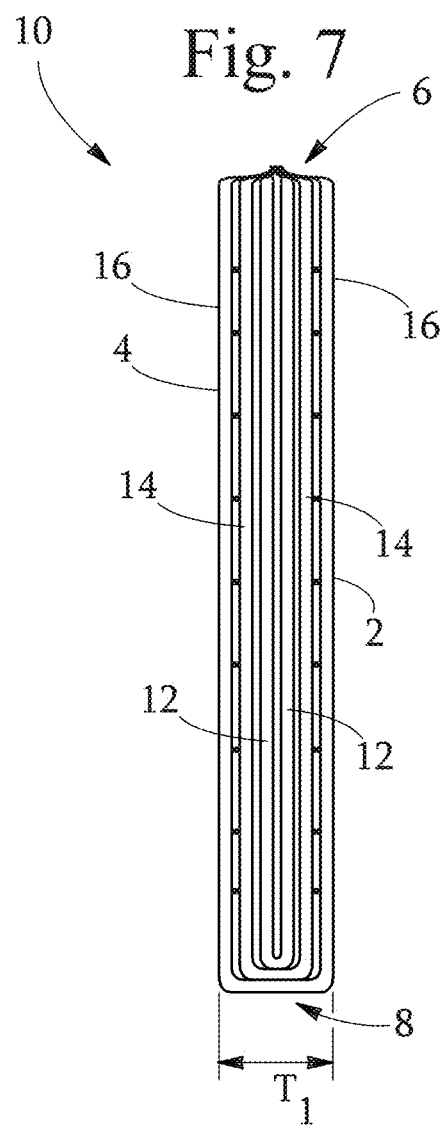
FIG. 7 illustrates a side view of the flexible package of FIG. 6.

FIG. 7 illustrates a side view of the flexible package of FIG. 6. As can be seen, the package 10 is relatively, thin, flat and planar in its unexpanded state. That is, the thickness T1 of the package 10 is relatively small when compared to the length L and width W of the package 10 in its unexpanded state. As shown in FIG. 7, the package 10 of FIG. 6 is constructed from a stack of three sheets of flexible material that is folded upon itself to form the top panel 2, a bottom panel 4, a first end portion 6 and a second end portion 8. The top panel 2 is joined to the bottom panel 4 along at least a portion of sides 9 and 11 of the package. As with the description of FIGS. 1-4 the terms "top" and "bottom" are not intended to be limiting, but rather merely to help more clearly distinguish parts of the package from each other. As such, unless specifically set forth, the terms should not be considered to limit the orientation of the package in any way. The top panel 2 may be joined to the bottom panel 4 by one or more exterior seams 22. The exterior seams 22 can take on any desired shape and size and can be formed by any suitable method or material, as set forth above.

Figure 8:
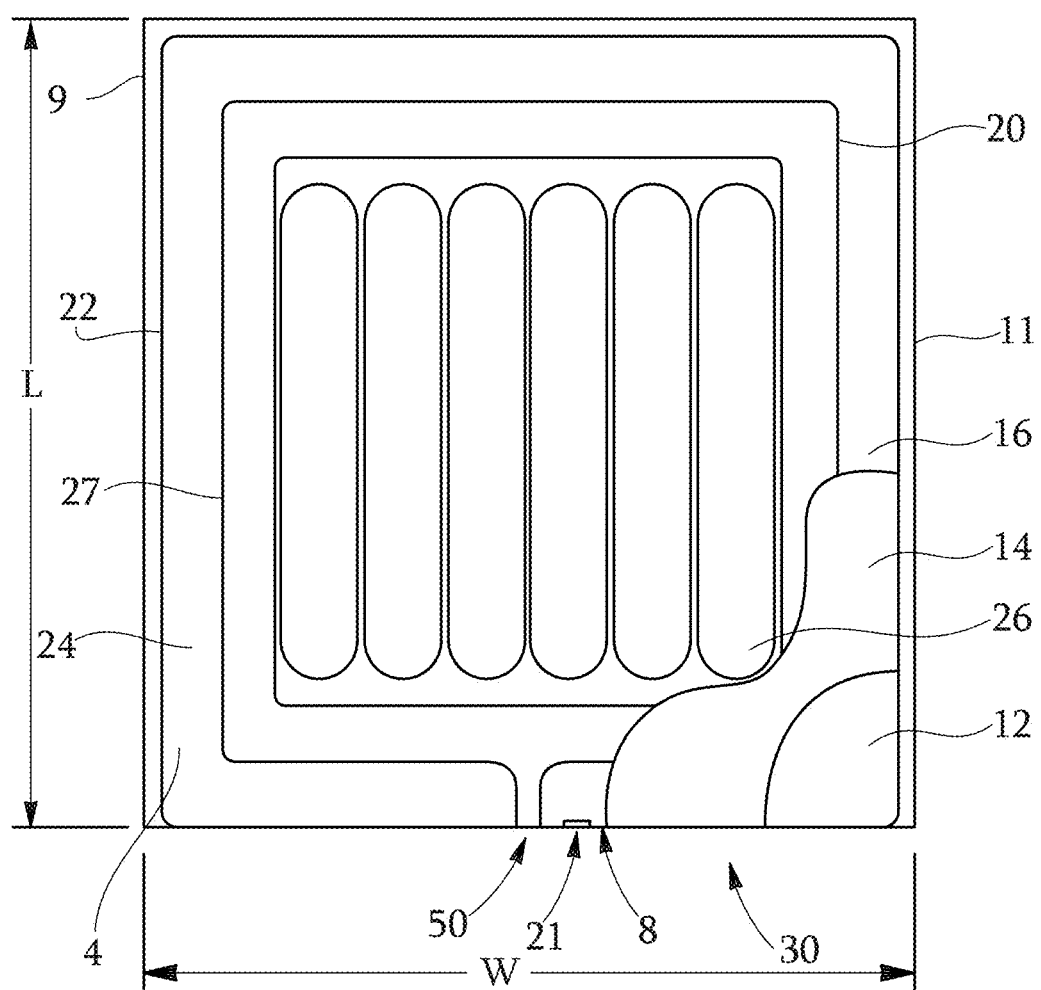
FIG. 8 illustrates a bottom view of the flexible package of FIG. 6.

FIG. 8 illustrates a plan view of the bottom panel 4 of the flexible package 10 of FIG. 6. As shown, the bottom panel 4 the inner sheet 12, the outer sheet 14 and the secondary outer sheet 16. Similar to that shown in FIG. 6, the inner sheet 12 is at least partly connected to the outer sheet 14 to form a primary expansion chamber 24. The outer sheet 14 is also at least partially joined to the secondary outer sheet 16 along secondary expansion chamber seams 27 to form at least one secondary expansion chamber 26.

Figure 9:
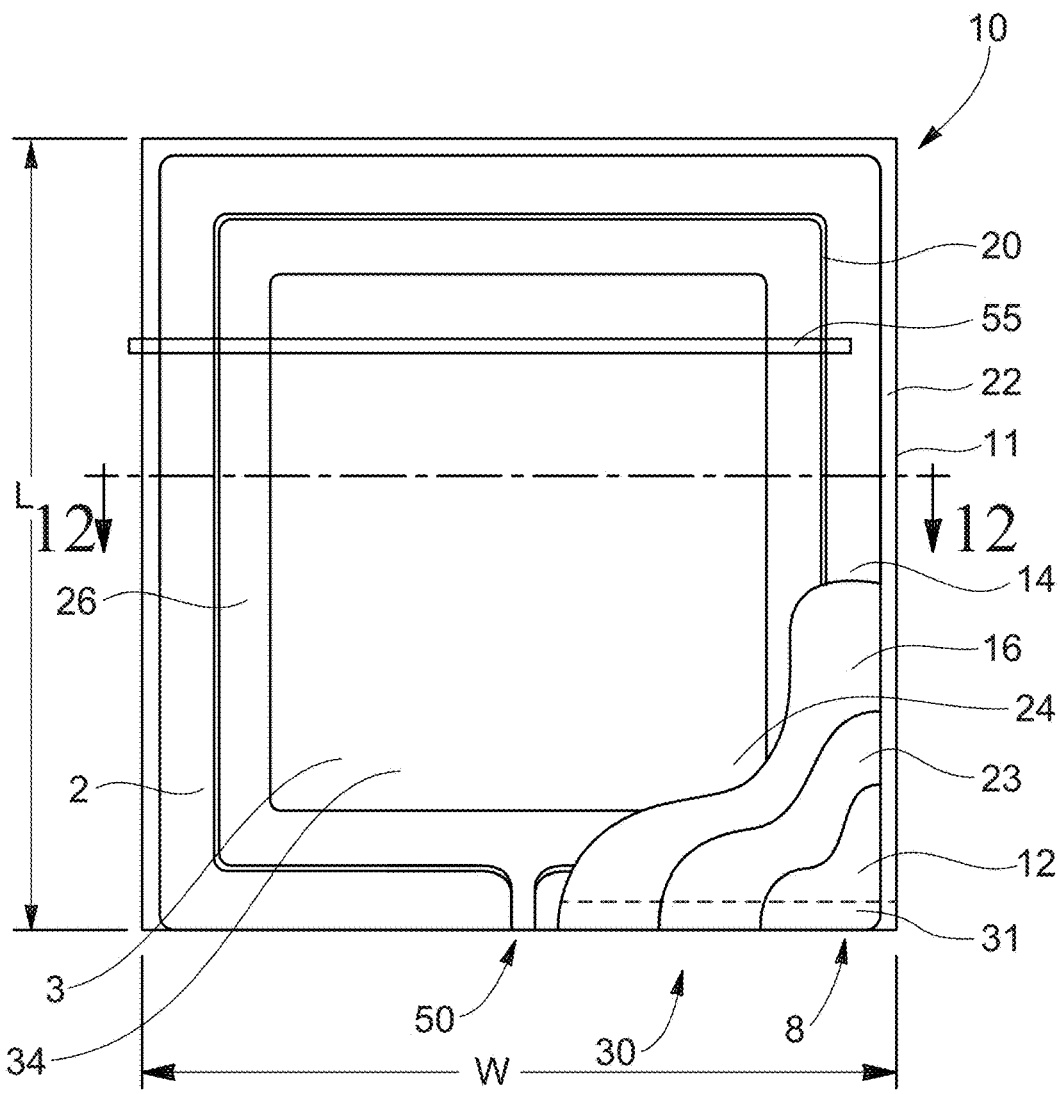
FIG. 9 illustrates a plan view of a flexible package of the type disclosed herein in an unexpanded state.

FIG. 9 illustrates a plan view of the top panel 2 of a flexible package 10 of the type disclosed herein in an unexpanded state. As shown, the package 10 includes an inner sheet 12 and an outer sheet 14. The inner sheet 12 is at least partially joined to the outer sheet 14 at outer seam 22. The package 10, as shown, has a length L, a width W, side edges 9, 11 and opposing ends 6 and 8. The package 10 also includes a secondary inner sheet 23 and a secondary outer sheet 16 at least partially joined to the inner sheet 12 and the outer sheet 14 at outer seam 22. The package 10, as shown, has a non-expansion chamber 34 that provides label region 3 on top panel 2. The package 10 also may include one or more expansion ports 50 to allow a user to direct an expansion material into one or more expansion chambers to expand the package 10, and a closeable opening 30 with a closure mechanism 31. The closable opening allows a user to place one or more articles in the package 10 before shipping. Non-expansion chamber 34 is sealed off from expansion port 50, and upon expansion of package 10 (or inflation of the expansion material is air), non-expansion chamber 34 will not expand and non-expansion chamber 34 provides label region 3 on top panel 2. Label region is flat or substantially flattened and of a sufficient size such that mailing information can be provided directly onto the package, such as by printing or by adding a label directly onto to the label region that can be maintained during the shipping process.

Figure 10:
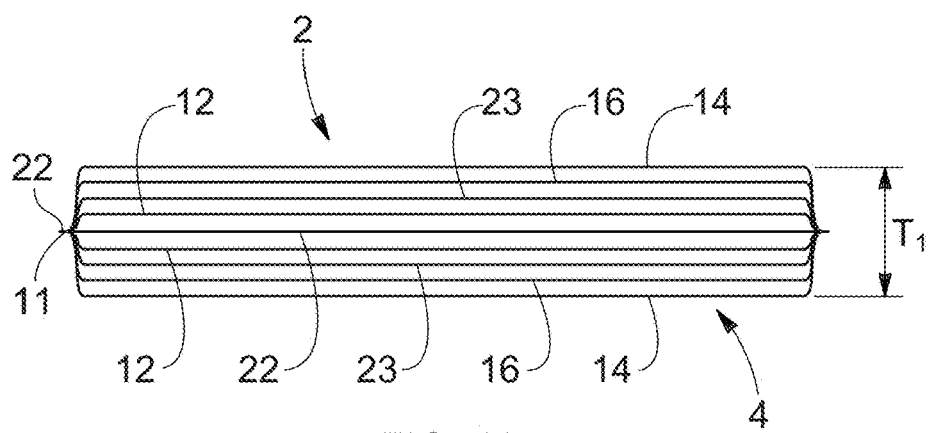
FIG. 10 illustrates a side view of the flexible package of FIG. 9.

FIG. 10 illustrates a side view of the flexible package of FIG. 9. As can be seen, the package 10 may be relatively thin, flat and planar in its non-expanded state. That is, the unexpanded thickness T1 of the package 10 is relatively small when compared to the length L and width W of the package 10 in its unexpanded state or configuration (as shown in FIG. 9), as well as the thickness T2 of the package 10 in an expanded configuration (e.g. FIG. 12). As shown in FIG. 10, the package 10 of FIG. 9 may be constructed from four layers of material that are folded to form a top panel 2 and a bottom panel 4 of the package 10. The top panel 2 is joined to the bottom panel 4 along at least a portion of longitudinal side 11 of the package 10 at one or more outer seams 22. The terms "top" and "bottom" are not intended to be limiting, but rather merely to help more clearly distinguish parts of the package from each other. As such, unless specifically set forth, the terms should not be considered to limit the orientation of the package in any way. The outer seam 22 can take on any desired shape and size and can be formed by any suitable method or material. For example, the outer seam 22 may be formed by glue, heat (e.g. ultrasound, conductive sealing, impulse sealing, ultrasonic sealing, or welding), mechanical crimping, sewing, or by any other known or developed technology for joining sheets of material. While one outer seam 22 is shown in FIG. 10, the package 10 may be constructed with more than one outer seam 22, for example, outer seams 22 formed on two sides, three sides or four sides or more as the shape of the package allows.

Figure 11:
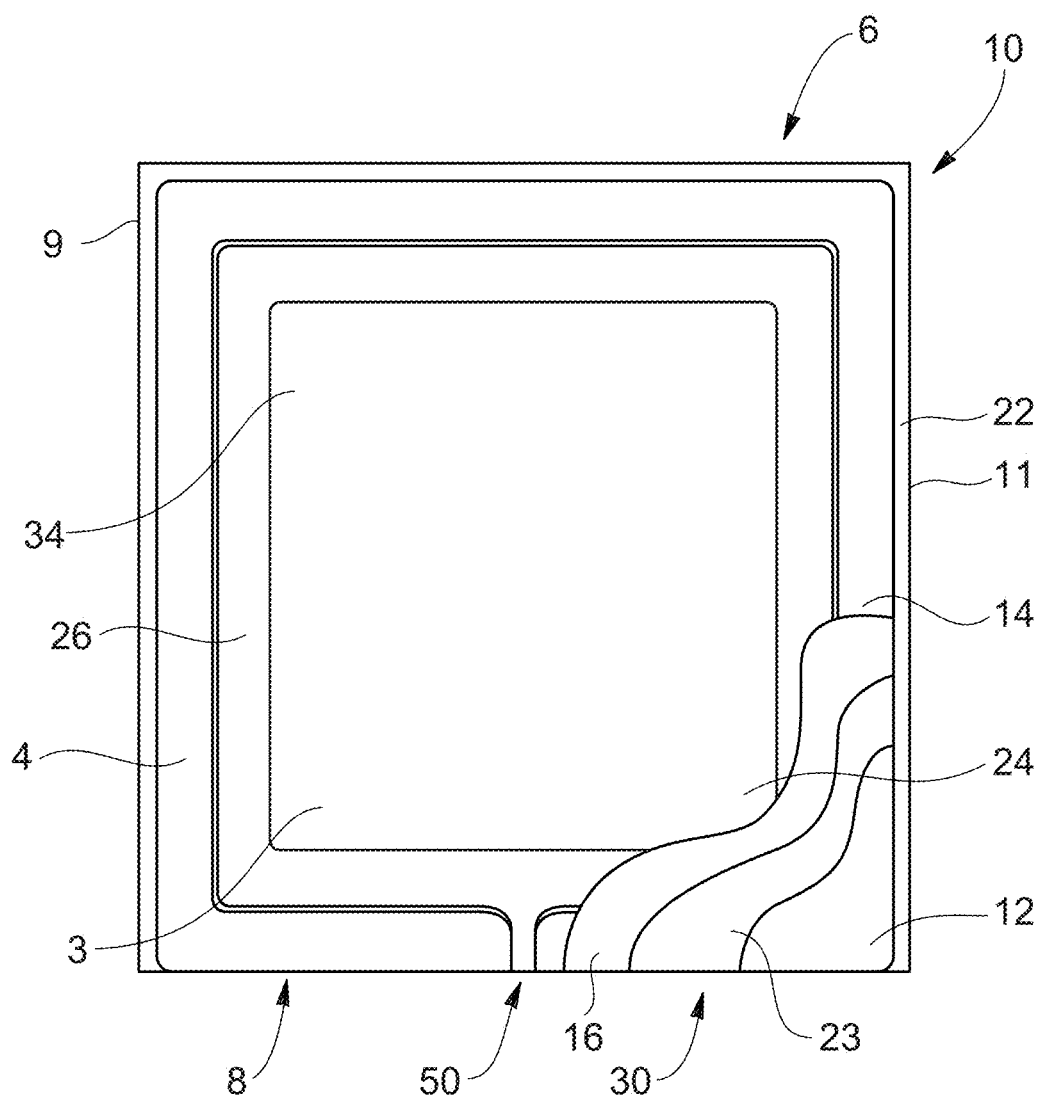
FIG. 11 illustrates a plan view of the flexible package of FIG. 9.

FIG. 11 illustrates a plan view of the bottom panel 4 of the package 10 of FIG. 9. As shown, the bottom panel 4 has an inner sheet 12, a secondary inner sheet 23, an outer sheet 14, and a secondary outer sheet 16. The inner sheet 12 is at least partly connected to the secondary inner sheet 23 at least one or more outer seams 22 and forms one or more primary expansion chambers 24 described in more detail, below. The secondary outer sheet 16 may be joined to the outer sheet 14 along at least one or more outer seams 22. As shown in FIG. 11, package 10 has non-expansion chamber 34 that can provide label region 3 on bottom panel 4.

Figure 12:
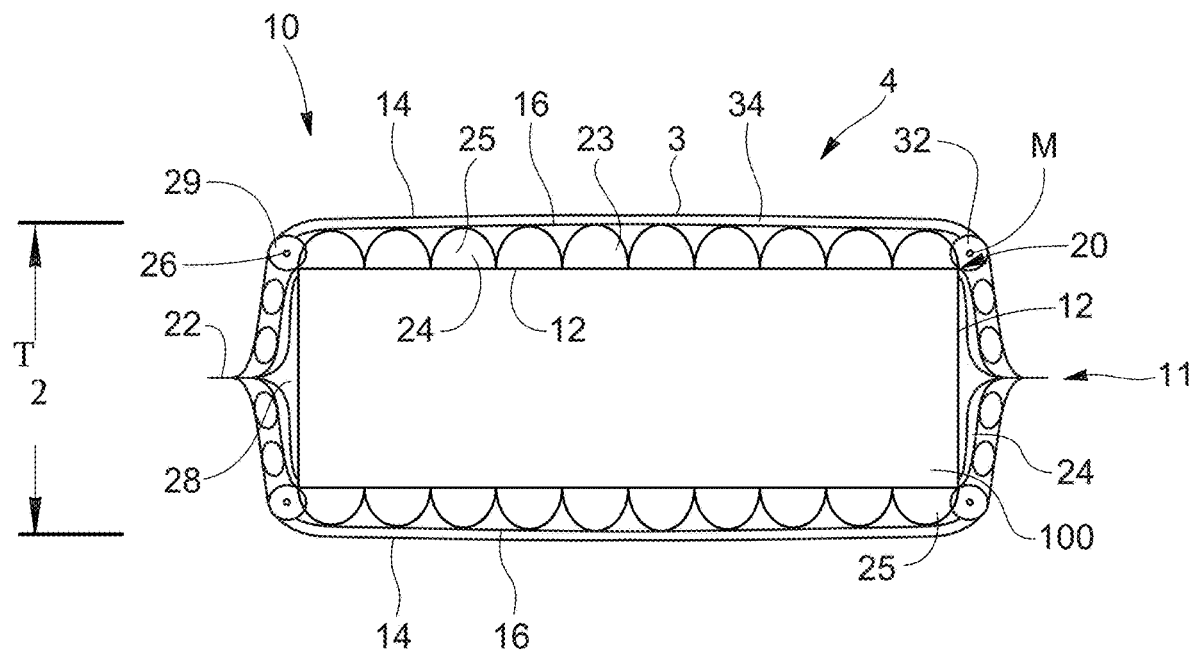
FIG. 12 is cross-sectional view of the flexible package of FIG. 9, as seen through section 12-12, having an article inside the article reservoir, wherein the package is in an expanded state.

FIG. 12 is a cross-sectional view of a flexible package 10 shown in FIG. 9 taken through section 12-12. The package 10 is shown in an expanded state. The package 10 has non-expansion chamber 34 that provides label region 3 on the bottom panel 4 of package 10. The label region can be any suitable size and will generally be at least large enough to display shipping information, such as for example, a 4 inch by 6-inch standard shipping label. As can be seen, the inner sheet 12 is joined to the secondary inner sheet 23 in at least the area of the outer seam 22. As shown, inner sheet 12 and secondary inner 23 are joined to form one or more primary expansion chambers 24. The primary expansion chamber(s) 24 are in an expanded configuration where an expansion material 25 has been provided into the primary expansion chamber 24. The expansion material 25 increases the spacing between the sheets forming the volume of the primary expansion chamber(s) 24 such that the expanded primary expansion chamber(s) 24 each have a volume that is greater than the primary expansion chamber(s) 24 volume when not filled with the expansion material 25. The primary expansion chamber(s) 24 are inflated to provide structure to the package 10 and to stretch outer sheet 14 and secondary outer sheet 16 such that label region 3 is provided on the top panel 2 or bottom panel 4 of package 10. The primary expansion chamber(s) 24 also may provide structural rigidity, mechanical protection and/or shape to the package 10 when in an expanded configuration. They may also help to restrain any articles placed into the package 10.

Further, as shown in FIG. 12, the secondary outer sheet 16 is joined to the outer sheet 14, the inner sheet 12, and the secondary inner sheet 23, in at least the area of the outer seam 22, and secondary outer sheet 16 and outer sheet 14 are joined to form a secondary expansion chamber(s) 26. The secondary expansion chamber(s) 26 are in an expanded configuration where a secondary expansion material 29 has been provided into the secondary expansion chamber 26. The secondary expansion material 29 increases the spacing between the sheets forming the volume of the secondary expansion chamber(s) 26 such that the expanded secondary expansion chamber(s) 26 each have a volume that is greater than the secondary expansion chamber(s) 26 volume when not filled with the secondary expansion material 29. The secondary expansion chamber(s) 26 can provide an outer frame to package 10 and also may provide structural rigidity, mechanical protection, and/or shape to the package 10, when in an expanded configuration. As shown in FIG. 12, the package 10 can be designed such that secondary expansion chambers 26 form supports 32 for the package 10.

The flexible package 10 also may include one or more expansion ports 50 that may be provided to allow a user to direct an expansion material into one or more of the primary expansion chambers 24 and the secondary expansion chambers 26. The primary expansion chambers 24 may be expanded by providing a primary expansion material 25 into the primary expansion chamber 24 such as via expansion port 50. The secondary expansion chambers 26 may be expanded by providing a secondary expansion material 29 into the secondary expansion chamber 26. The secondary expansion material 29 may be the same or a different material than the primary expansion material 25 used to expand the primary expansion chamber(s) 24. If more than one primary expansion chamber 24 is provided, the primary expansion chambers 24 may be independent from each other (e.g. discrete) or in fluid communication with each other, depending on the desired characteristics of the package. If more than one secondary expansion chamber 26 is provided, the secondary expansion chambers 26 may be independent from each other (e.g., discrete) or in fluid communication with each other, depending on the desired characteristics of the package. When discrete secondary expansion chambers are used, any number of such chambers is envisioned, and the discrete chambers may be disposed symmetrically or asymmetrically throughout the package. The primary expansion chambers 24 and secondary expansion chambers 26 may also be independent from each other or in fluid communication with each other, depending on the desired characteristics of the package. The pressures within the primary expansion chambers and the secondary expansion chambers may be the same or may be different.

The package 10 in its expanded configuration has an expanded thickness T2. The expanded thickness T2 is significantly larger than the unexpanded thickness T1. The ability for the package to change size between its unexpanded state and expanded state is one of the reasons why the package of the present invention is unique and advantageous. The package 10 can be manufactured, shipped and stored in an unexpanded state and then expanded only when needed. This allows for significant efficiencies in terms of handling and storing the packages 10 before use. The same is true of the package 10 at the end of the shipping lifecycle. Whether it is intended to be reused or discarded, the package 10 can be deflated from its expanded state to a deflated state. As used herein, the term "deflated" means any pressure from an expansion material that is causing an expansion chamber to expand has been released. A "deflated state" is when the package 10 has been expanded by introduction of an expansion material into one or more expansion chambers, but then the expansion chambers have been opened or otherwise made to be in fluid communication with the surrounding atmosphere and the expansion chambers are all in a state of equilibrium with respect to pressure of the surrounding atmosphere. Any measurements made of a package 10 in a deflated state should be made without any articles 100 in the article reservoir 28 unless otherwise set forth herein.

Figure 13:
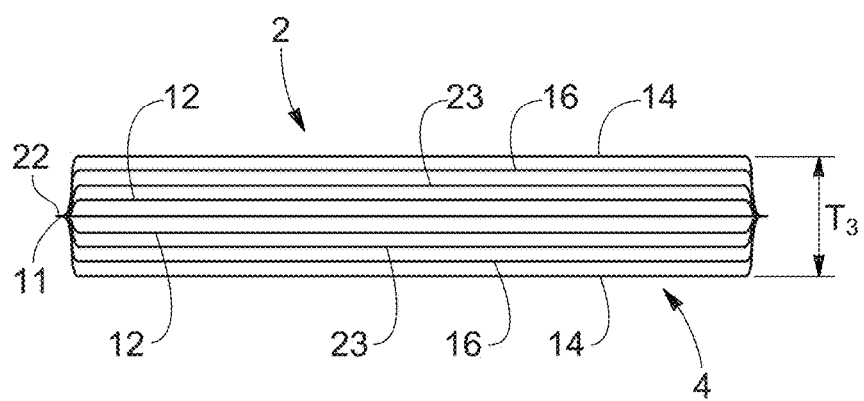
FIG. 13 shows the flexible package of FIG. 9, in a deflated state.

FIG. 13 shows the package of FIGS. 9-12 in its deflated state after the article(s) 100 have been removed. The package 10 has a deflated thickness T3 that can be significantly smaller than the expanded thickness T2. As such, the volume of waste to dispose of related to the package 10 is minimized and/or the package 10 can be stored for later use or shipped to another location for re-use or refurbishment. Although the specific difference between the thicknesses of the package 10 prior to use, during use, and after use will vary depending on the particular package and materials used, the package 10 of the present invention can provide an unexpanded thickness T1 that is less than $1/10^{th}$ of the expanded thickness T2, less than $1/15^{th}$ of the expanded thickness T2, less than $1/20^{th}$ of the expanded thickness T2, less than $1/25^{th}$ of the expanded thickness T2, less than $1/50^{th}$ of the expanded thickness T2 or even less. Similarly, the package 10 of the present invention can provide a deflated thickness T3 that is less than $1/10^{th}$ of the expanded thickness T2, less than $1/15^{th}$ of the expanded thickness T2, less than $1/20^{th}$ of the expanded thickness T2, less than $1/25^{th}$ of the expanded thickness T2 or even less. Further, the package 10 of the present invention can be configured such that the unexpanded thickness T1 and the deflated thickness T3 are both less than $1/15^{th}$ of the expanded thickness T2, less than $1/20^{th}$ of the expanded thickness T2, less than $1/25^{th}$ of the expanded thickness T2, or even less.

As shown in FIG. 12, an article 100 may be located in the space between inner sheets 12. The space between the inner sheets 12 is referred to herein as the article reservoir 28. The article reservoir 28 can be formed between two portions of a single inner sheet 12 or can be formed between two or more different inner sheets 12, depending on the particular configuration of the package 10. The article reservoir 28 is intended to surround at least a portion of one or more articles 100 placed therein. Different shaped packages 10 can be used for different shaped articles 100, different sized articles 100, and/or different numbers of articles 100. However, one of the advantages of the package 10 of the present invention is that a single size and shape of the package can be designed and constructed to fit many different sized articles 100. This is due to the flexible nature of the materials making up the package 10 as well as the fact that portions of the package 10 can be expanded or contracted to snugly fit, for example, inner sheet 12, around the article(s) 100 and even provide for partial or complete immobilization of the article(s) in the package 100. Alternatively, or in addition, a vacuum or partial vacuum can be applied to the article reservoir 28. The vacuum can help bring the inner sheets 12 in contact with the articles 100 and to hold them snugly in place. Removing the air and/or filling the reservoir with a fluid other than air, such as, for example, nitrogen, can provide additional benefits depending on the particular articles 100 being shipped. For example, filling the reservoir 28 with nitrogen can help reduce the negative effects that water vapor and oxygen can have on some items. Of course, other fluids can also be used depending on the items being shipped and the desires of the shipper.

Although the package 10 shown and described with respect to FIG. 12 has four sheets, inner sheet 12, secondary inner sheet 23, outer sheet 14, and secondary outer sheet 16, joined together to form the package 10, any number of sheets can be used depending on the desired end structure of the package 10. Different numbers of sheets could be used to provide additional strength, decoration, protection and/or other characteristics.

Figure 14:
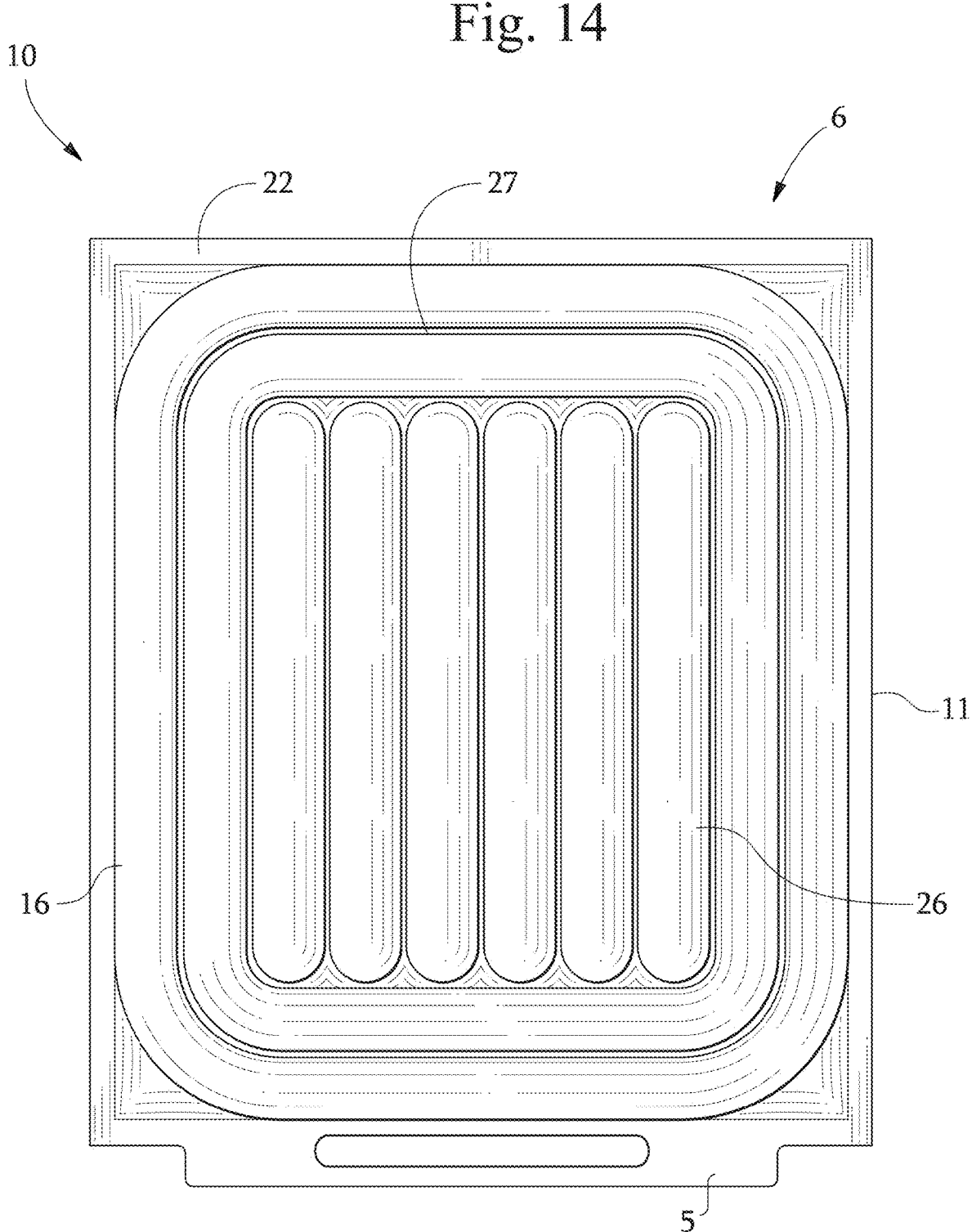
FIG. 14 is a plan view of a flexible package shown in an expanded configuration.

FIG. 14 illustrates a plan view of a flexible package 10 of the type described herein and shown in FIGS. 6-8 in an expanded configuration. The package 10 of FIG. 14 includes a handle 5. The handle 5 can provide an additional convenience for the user of the package 10. The handle 5 can act as part of the package 10 for the user to hold or can act as a hanger or other handling feature to help the user pick up, carry, move, orient, hang, position or otherwise handle the package 10. The package 10 can have any number of handles 5 and the one or more handles can be integral with any one or more of the sheets forming the package 10. Alternatively, or in addition, the handle 5 may include one or more materials added to the package 10 and may be operatively associated with one or more features of the package 10 such as the article retrieval feature 55, the article reservoir 28, the closeable opening 30, a deflation feature, a manifold, or any other feature of the package 10.

Figure 15:
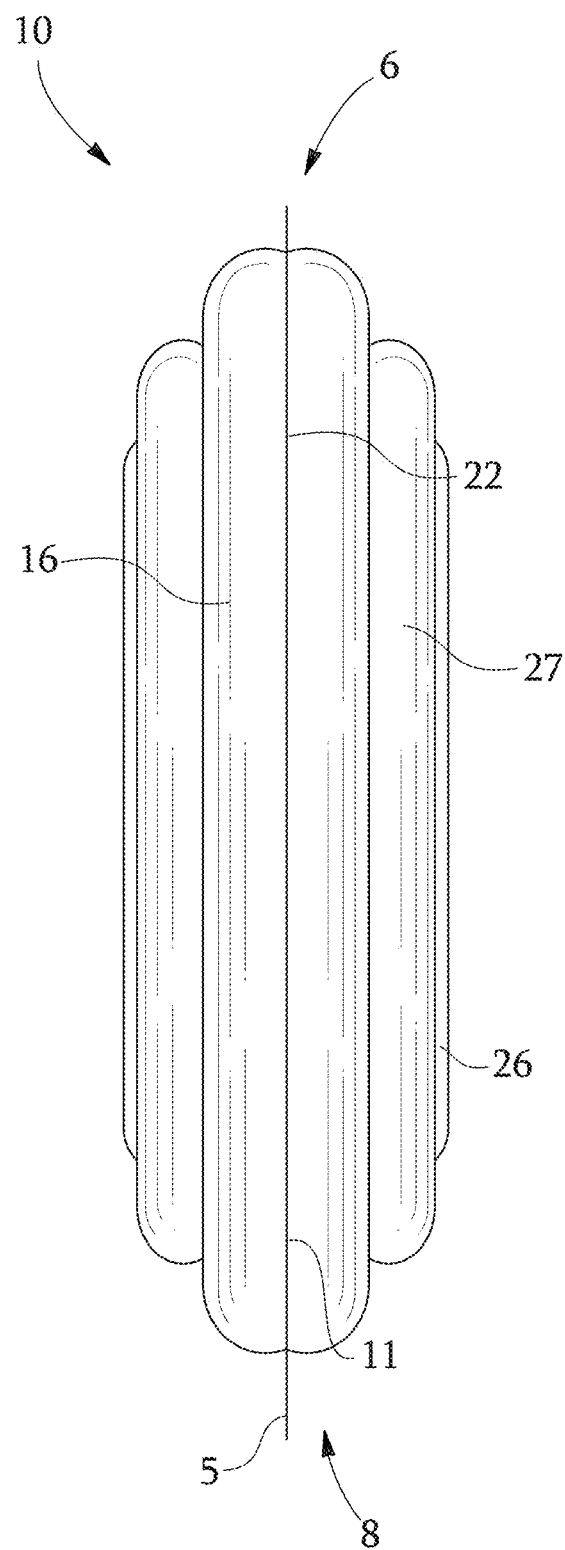
FIG. 15 is a side view of the flexible package of FIG. 14 shown in an expanded configuration.

FIG. 15 illustrates a side view of the flexible package 10 of FIG. 14. As shown, the package 10 includes exterior seams 22 disposed adjacent the sides 9 and 11 of the package 10. The package 10 shown in FIGS. 6-10 is designed and configured to form a generally rectangular parallelepiped when in its expanded state. However, any desired shape can be formed by changing the shape, direction, width and other dimensions of the exterior seams 22, the shape of the sheets that form the package 10 and other seams and structural features.

FIG. 16 illustrates a cross-sectional view of a flexible package 10 in accordance with the type disclosed herein, the package 10 being in an expanded state and having articles 100 therein. Article reservoir 28 is formed by the space between the two facing inner sheets 12. The inner sheets 12 have a first surface 13 and a second surface 15 opposed to the first surface. As can be seen, the inner sheet 12 is joined to the outer sheet 14 in at least the area of the exterior seam 22 to form the primary expansion chamber 24. The expansion chamber 24 is in an expanded configuration where an expansion material 25 has been provided into the expansion chamber 24. The expansion material 25 increases the spacing between the sheets forming the volume of the expansion chamber(s) 24 such that the expanded expansion chamber(s) 24 each have a volume that is greater than the expansion chamber(s) 24 volume when not filled with the expansion material 25. At least a portion of the second surface 15 of the inner sheet may be in contact with the article(s) 100 when the primary expansion chamber 24 is in an expanded state.

Further, as shown in FIG. 16, the secondary outer sheet 16 may be joined to the outer sheet 14 along at least the secondary expansion chamber seams 27 to form secondary expansion chambers 26. The secondary expansion chambers 26 may be expanded by providing a secondary expansion material 29 into the secondary expansion chamber 26. The secondary expansion material 29 may be the same or a different material than the primary expansion material 25 used to expand the expansion chamber(s) 24. The secondary outer sheet 16 is also shown as being joined to the outer sheet 14 along the outer seams 22.

Like the primary expansion chamber(s) 24, the secondary expansion chamber(s) 26 may be used to provide structural rigidity, mechanical protection and/or shape to the flexible package 10 when in an expanded configuration. If more than one secondary expansion chamber 26 is provided, the secondary expansion chambers 26 may be independent from each other or in fluid communication with each other. Also, the secondary expansion chamber(s) 26 may be in fluid communication with the primary expansion chamber(s) 24 or they may be separate from each other. They may be in fluid communication at one point during the manufacture and filling of the package 10 and then made separate or discontinuous from each other at some later point in time. This could be done by sealing portions of the chambers and/or by the use or one or more valves to control the flow of fluid between the chambers.

For packages having a single primary expansion chamber 24 and a single secondary expansion chamber 26, it may be desirable for the pressure in the chambers to be equal or different from each other. Further, where the package 10 includes more than one primary expansion chamber and/or more than one secondary expansion chamber 26, it may be desirable that some or all of the expansion chambers have the same internal pressure or that any one of the one or more primary expansion chambers 24 be expanded to a different pressure than any one or more of the remaining primary expansion chambers and/or one or more of the secondary expansion chambers 26. Adjusting the pressure in different expansion chambers can provide the benefit of strengthening portions of the package (e.g. the expansion chambers that create a frame for the package), but allow for more flexible expansion chambers to be disposed, for example, in contact with the articles 100 in the article reservoir 28. Examples include but are not limited to configurations where the primary expansion chambers 24 have a higher internal pressure than the secondary expansion chambers 26, or vice-versa. Some specific, but non-limiting examples include where at least one of the primary expansion chamber(s) 24 have an internal pressure of from about ambient pressure to about 25 psig, from about 1 psig to about 20 psig, about 2 psig to about 15 psig, about 3 psig to about 8 psig, or about 3 psig to about 5 psig., and at least one of the secondary expansion chamber(s) 26 have an internal pressure of from about ambient pressure to about 25 psig, from about 1 psig to about 20 psig, about 2 psig to about 15 psig, about 3 psig to about 10 psig, about 4 psig to about 10 psig or about 5 psig to about 10 psig, or about 7 psig to about 9 psig. In one example, one or more of the primary expansion chamber(s) 24 have an internal pressure of between about 2 psig to about 8 psig or about 3 psig to about 5 psig and one or more of the secondary expansion chamber(s) 26 have an internal pressure of between about 5 psig and about 10 psig or about 7 psig to about 9 psig.

The inner sheet 12, the outer sheet 14 and/or the secondary outer sheet 16 and/or secondary inner sheet 23 (if present) can be joined to each other in any number of places creating any number, shape and size of expansion chambers. The primary and/or secondary expansion chamber seams 20 and 27 can be of any length, width and shape. The primary and/or secondary expansion chamber seams 20 and 27 can be formed by any suitable method or material. For example, the seams 20, 27 may be formed by glue, heat (e.g. ultrasound, conductive sealing, impulse sealing, ultrasonic sealing, or welding), mechanical crimping, sewing, or by any other known or developed technology for joining sheets of material. The seams 20, 27 can be continuous or intermittent, can be straight or curved, and can be permanent or temporary. The shape of the seams 20, 27 can be used to form the shape of the expansion chambers 24 or 26 alone or in addition to other structural elements. For example, the secondary expansion chambers 26 can be shaped by the secondary expansion chamber seams 27 in combination with additional materials disposed within the secondary chambers 26 or joined thereto. Further, chambers 24, 26 can be shaped by the use of chemical or mechanical modifications to the materials forming the sheets. For example, a portion of the inner sheet 12, outer sheet 14 and/or secondary outer sheet 16 and/or secondary inner sheet 23 (if present) may be heated, ring-rolled, chemically treated or modified to make it more or less flexible, extensible, non-extensible, stronger, weaker, shorter, or longer than prior to treatment.

The expansion chamber(s) 24, 26 can have various shapes and sizes. Part, parts, or about all, or approximately all, or substantially all, or nearly all, or all of the expansion chamber(s) 24, 26 can be straight, curved, angled, segmented, or other shapes, or combinations of any of these shapes. Part, parts, or about all, or approximately all, or substantially all, or nearly all, or all of an expansion chamber 24, 26 can have any suitable cross-sectional shape, such as circular, oval, square, triangular, star-shaped, or modified versions of these shapes, or other shapes, or combinations of any of these shapes. An expansion chamber 24, 26 can have an overall shape that is tubular, or convex, or concave, along part, parts, or about all, or approximately all, or substantially all, or nearly all, or all of a length. An expansion chamber 24, 26 can have any suitable cross-sectional area, any suitable overall width, and any suitable overall length. An expansion chamber 24, 26 can be substantially uniform along part, parts, or about all, or approximately all, or substantially all, or nearly all, or all of its length, or can vary, in any way described herein, along part, parts, or about all, or approximately all, or substantially all, or nearly all, or all of its length. For example, a cross-sectional area of an expansion chamber 24, 26 can increase or decrease along part, parts, or all of its length.

Typically, after the user introduces the expansion material through the expansion port 50, the expansion port is temporarily or permanently closed to prevent the escape of the expansion material(s) from the expanded chamber(s) 24, 26. A pressure source may remain in fluid communication with the expanded chamber 24, 26 throughout an operation that closes the expansion port 50 to help maintain the desired pressure in the expansion chamber 24, 26. Any means can be used to close the expansion port, including those described herein with respect to making chamber seams 20 and 27 as well as any other method suitable for closing the particular expansion port 50 that is used. The expansion port 50 may be hermetically sealed closed or not, depending on the desired end use of the package 10. Further, the expansion port 50 may include a closure other than a seal, such as, for example, a valve, a cap, a folded section, a material to hold the expansion port 50 closed, such as an adhesive, or any other closure or closure means. The closure may be single use (e.g. once closed, can't be opened without damaging the package 10, expansion port 50 or closure, or may be reusable, such as a threaded cap or friction-fit plug or other closure that can be reused one or more times.

In any configuration, it may be desirable to include one or more vents 21 (e.g. shown inn FIG. 8) in fluid communication with the article reservoir 28 to allow the vacuum to be applied and/or to allow fluid to escape the article reservoir 28 during or after the expansion of the primary expansion chamber(s) 24. The vent 21 can be sealed after the package is fully constructed or it can remain partially or fully open to allow for fluid flow into and/or out of the article reservoir 28. The vent 21 can be configured to be self-sealing or can be sealed by some separate step and/or tool. The vent 21 can, for example, include a valve and can be one-way or two-way. That is, it can allow fluid to flow in both directions (in and out) or just one direction. One or more vents 21 can also be provided to allow fluid flow to or from other portions of the package 21, as desired.

The package 10 of the present invention includes one or more closeable openings 30 through which one or more articles 100 may be placed into the article reservoir 28. The closeable opening 30 is preferably an unjoined portion of the sheets making up the article reservoir 28. For example, the inner sheets 12 at one end 6, 8 of the package 10 may be left unjoined across all or a portion of the width W of the package 10 to form the closeable opening 30. The closeable opening 30 may be located anywhere on the package 10 and may be configured to best meet the needs of the user. For example, if a larger opening is needed, the closeable opening 30 may be disposed along a side edge 11. Also, the closeable opening 30 may be provided through one or more of the sheets making up the package 10. Thus, for example, the inner sheet 12, the outer sheet 14, and/or the secondary outer sheet 16 and/or secondary inner sheet (if present) may include an opening therethrough to form the closeable opening 30. At a minimum, the closeable opening 30 should provide access to the article reservoir 28 prior to being closed. This allows the user to place the one or more articles 100 in the article reservoir 28 before shipping. In an alternative execution, the article(s) 100 may be placed in the reservoir 28 prior to any of the sheets being joined together or after some, but not all of the sheets are joined together.

The closeable opening 30 may be any size desired by the user and can include any type of closure mechanism 31 or material, if a closure mechanism/material is used. For example, the closeable opening 30 may include an adhesive, mechanical closure, magnets, clips, folding closure device or any other closure mechanism desired by the user. As shown in FIG. 1, the closure mechanism 31 can be joined to package 10 at the closeable opening 30 or any other part of the package 10 or may be separate therefrom. The closure mechanism 31 may be a single-use mechanism or may be reusable. Examples of closure mechanisms include, but are not limited to hook and loop fasteners, zippers, buttons, tapes, adhesives, magnetic strips, sewing, string, bands, interference-type fasteners and any other types of closure mechanisms suitable for the particular use of the flexible package 10.

Where a distinct closure mechanism 31 is not used, the closeable opening 30 may be closed by sealing the materials located in the region of the closeable opening 30. Such sealing can be done using heat, chemicals, friction, static, sound, or other sources to close the closeable opening 30. It is also possible to provide additional materials in the location of the closeable opening 30 to help provide the desire closure. For example, additional materials with different melting temperatures or strength profiles may be provided. Also, materials like particles, metals, magnets and others may be provided in the area of the closeable opening to allow for sealing of the materials with different equipment and processes. Additionally, or alternatively, the closeable opening 30 may be closed by expanding one or more of the expansion chambers 24 or 26.

The closeable opening 30 may be configured to be reusable (i.e. can be open and closed more than one time) or may be a single-use-type opening. Other features may also be included to help make the package more user-friendly. For example, the closeable opening 30 may be a different color from the rest of the package 10 or may include texture, indicia or other features to make it more readily apparent to the user. Also, the closeable opening 30 may have a sheet, coating or other material therein to help the user open the closeable opening 30 when it is time to insert the article(s) 100.

The closeable opening 30 may be configured such that it can be closed at the same time and/or with the same equipment as one or more of the expansion ports 50. For example, the package 10 can be configured such that the closeable opening can be heat seal closed at the same time one or more of the expansion ports 50 is heat seal closed. Alternatively, the closeable opening 50 can be configured to be closed at a different time than the expansion port(s) 50 and/or by different means. Thus, the article(s) 100 can be placed in the package 100 and the closeable opening 30 be closed at a time different than the expansion of the expansion chambers 24, 26. This may allow for better overall results, for example, if the article 100 must be protected from dust, but the package 10 can't be finally expanded for shipment until a time and/or location different from when and where the article 100 is placed in the package 10. In such situations, the closeable opening 30 can be closed after the article 100 is placed in the article reservoir 28 and need not wait to be closed until the expansion chambers 24, 26 are expanded for shipment.

The package 10 may include one or more article retrieval features 55, as shown in FIGS. 1 and 6 and 9. The article retrieval feature 55 is used to open the package 10 so that the end user can retrieve the article(s) 100 from the article reservoir 28. The package 10 may include any desired number of article retrieval features 55 and they can be located anywhere on the package 10. Typically, only a single article retrieval feature 55 is necessary, but there may be some situations where two or more are desired to make the package 10 easier to use and/or to allow for retrieval of articles 100 from different article reservoirs 28 or different regions of the article reservoir 28. The article retrieval feature 55 may comprise any element, means, structure, or the like that can be used to open the package and allow the user to gain access to the article(s) 100 in the article reservoir 28. Examples of article retrieval features 55 include, tear strips, zippers, lines of weakness, perforations, sharp tools, and other devices that can be used to open the package 10.

It may be desirable that the article retrieval feature 55 forms part of the package 10 so that no additional tools are needed to access the article(s) in the article reservoir 28. Alternatively, a tool that can be used to open the package 10 can be attached to the package 10, disposed in the package 10, made part of the package or otherwise provided for ease of opening such packages 10. The tool, if used, can be reusable, disposable or single-use.

It may also be desirable that the article retrieval feature 55 be operatively associated with one or more of the expansion chambers 24, 26. That is, when the package 10 is opened using the article retrieval feature, one or more of the expansion chambers 24, 26 are also opened, allowing the expansion material to escape. This configuration may be preferred when the end user intends to deflate or return the package 10 to its unexpanded state once the article 10 is retrieved. The article retrieval feature 55 can be operatively associated with one or more of the expansion chambers 24, 26 to provide for immediate or extended release of the expansion material. Further, the article retrieval feature can be configured to release the pressure or deflate one or more of the expansion chambers 24, 26 at a different time than one or more of the other expansion chambers 24, 26 and/or at any time during the package opening or article retrieval process.

The article retrieval feature 55 may be configured to permanently destroy the package 10 or any part thereof. For example, the article retrieval feature may, when deployed, render the package 10 unfit for re-use. This could be due to tearing of some part of the package 10 or by otherwise rendering one or more of the expansion chambers 24, 26 or the article reservoir 28 unusable. Alternatively, the article retrieval feature 55 can be configured to be reusable and allow for the package to be reused as a flexible package 10. For example, the article retrieval feature 55 may be configured such that it provides access to the article reservoir 28 when deployed, but does not deflate or otherwise interfere with any of the expansion chambers. In such configurations, it is possible to open the package 10 to retrieve any articles 100 therein, but to not otherwise deflate, damage or destroy the package 10. Thus, it can allow for reuse of the package 10. This is especially beneficial for product returns and for packages 10 that are intended to be used to display, store, or provide some other functional property to the articles 100 therein.

The package may also include a chamber deflation feature that is integral with or separate from the article retrieval feature 55. As used herein, a "chamber deflation feature" is used to describe any feature that is used to deflate an expansion chamber and can include a chamber deflation feature or a combined article retrieval and chamber deflation feature. Examples of chamber deflation features include but are not limited to tear strips; tools to puncture one or more layers of the package 10; openable closures such as, for example, screw on caps, snap on caps, adhesive closures, mechanical closures; and other closure means and mechanisms. Another example includes providing a sticker or other cover material over a hole in one or more of the expansion chambers 24, 26 that can be removed to release the expansion material 25. Another example includes creating a tear strip the bisects the package and releases expansion material on both sides of the perforated lines. As noted above, it may be desirable and/or advantageous for the package 10 to take on a particular three-dimensional shape and/or have one or more surfaces with certain geometric characteristics when configured (e.g. expanded) for use, including shipment. For example, it may be desirable for the overall shape of the package 10 to be generally parallelepiped or at least two of the outer surfaces be generally parallel with each other. For example, it may be desirable for the package 10 to have six sides with three pairs of sides being generally parallel to each other and generally perpendicular to the two other pairs of sides. Other shapes are also contemplated including packages with two sides, three sides, four sides, five sides or any other desired number of sides. Packages that are generally parallelepiped in shape tend to be preferred for shipping and handling as they typically have at least one outer surface that can act as a bottom or base on which the package 10 can sit and at least one outer surface that can act as a top or staking surface onto which other packages or articles can be stacked. Although not required, each side preferably includes a generally flat outer surface. As used herein, the terms "flat" and "generally flat" are not intended to only describe absolutely flat surfaces, but rather include surfaces and features that are not entirely curved. That is, a surface or feature may be flat or generally flat even if it has some cured or uneven regions so long as it presents a surface topography that has three or more points that when joined to form a plane will not cut through any portion of the surface. This ensures that the feature presents a stable surface for the package 10 regardless of any particular surface topography that might be present. Providing one or more generally flat surfaces on the package 10 can help ensure the package can be handled by conventional conveying systems (e.g. conveyor belts, rollers, chutes, etc.) and can provide for more efficient packing in storage facilities and transportation vehicles.

Figure 19:
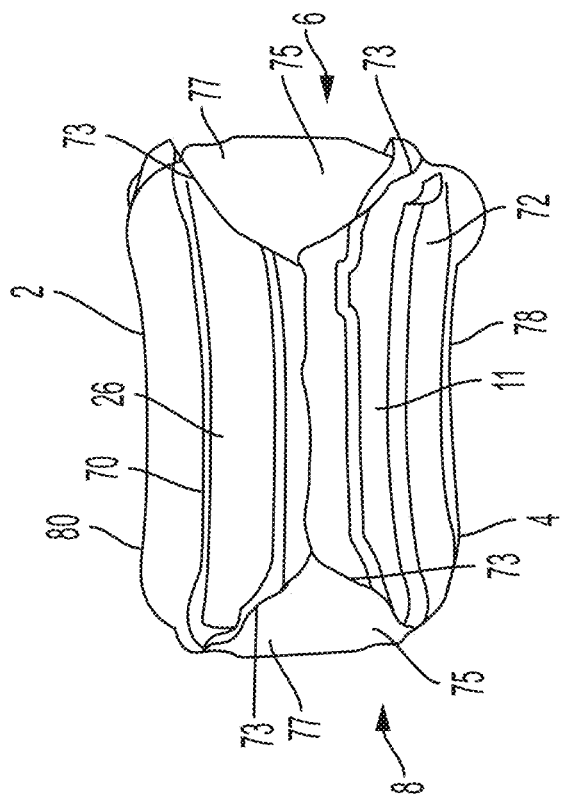
FIG. 19 is a side view of the flexible package of FIG. 17.
Figure 18B:
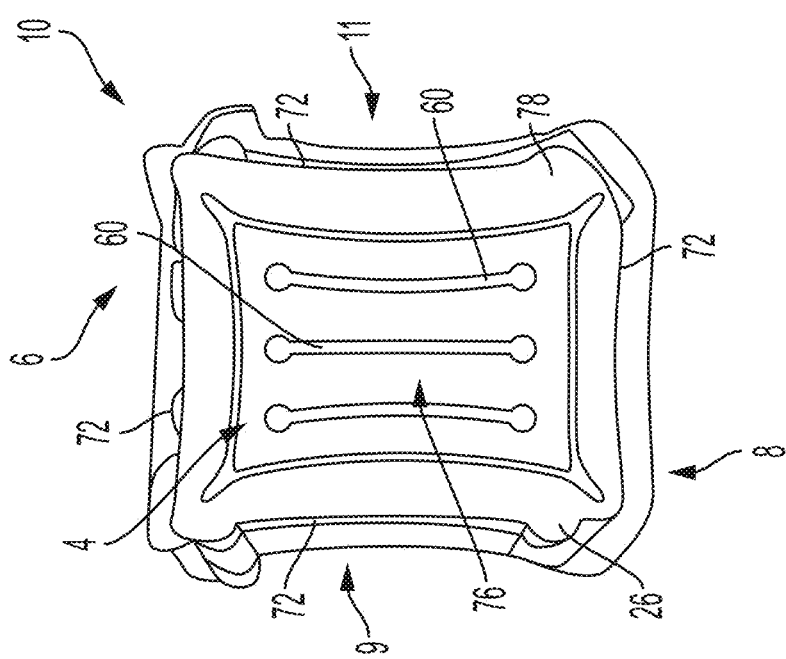
FIG. 18B is a plan view of the bottom of the flexible package of FIG. 17.

FIGS. 17-19 depict an example of a flexible package 10 according to the present invention. FIG. 17 is an isometric view of the package 10, FIG. 18A is a top plan view of the package 10, FIG. 18B is a bottom plan view of package 10, and FIG. 19 is a side view of the package 10. The package has a top panel 2, a bottom panel 4, first side panel 9, second side panel 11 opposed to first side panel 9, first end panel 6, and second end panel 8 opposed to first end panel 6. The first end panel 6 and the second end panel 8 each extend between the top panel 2 and the bottom panel 4 and the first side panel 9 and the second side panel 11. The first side panel 9 and the second side panel 11 each extend between the top panel 2 and the bottom panel 4 and between the first end panel 6 and the second end panel 8. Central plane CP bisects the first end panel 6, the second end panel 8, the first side panel 9 and the second side panel 11.

Figure 20:
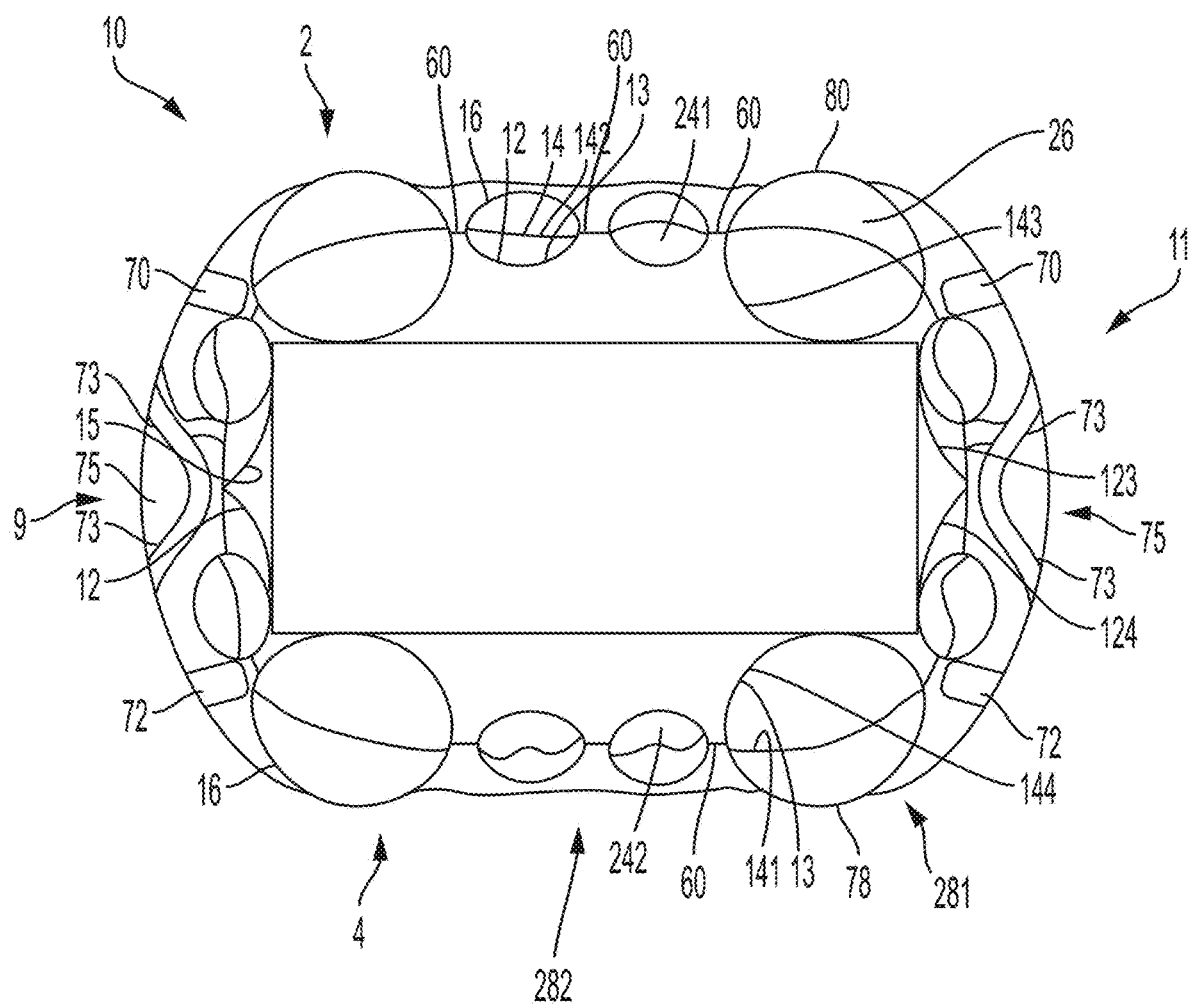
FIG. 20 is a cross-sectional view of the flexible package of FIG. 18A taken through section line 20-20.
Figure 23:
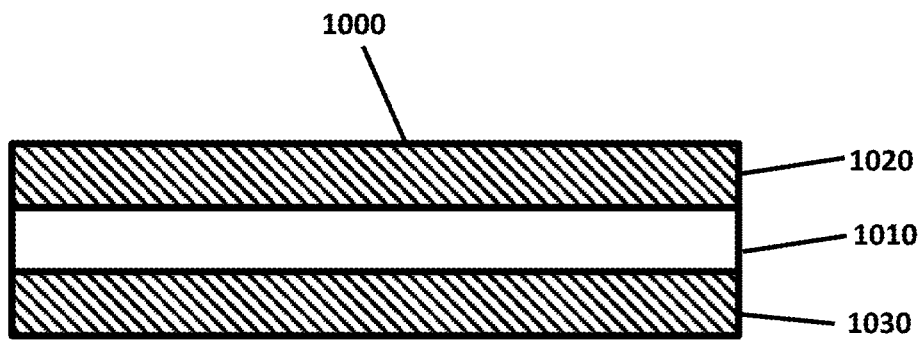
FIG. 23 is a depiction of a three layer multi-layer film used in the present invention.
Figure 24:
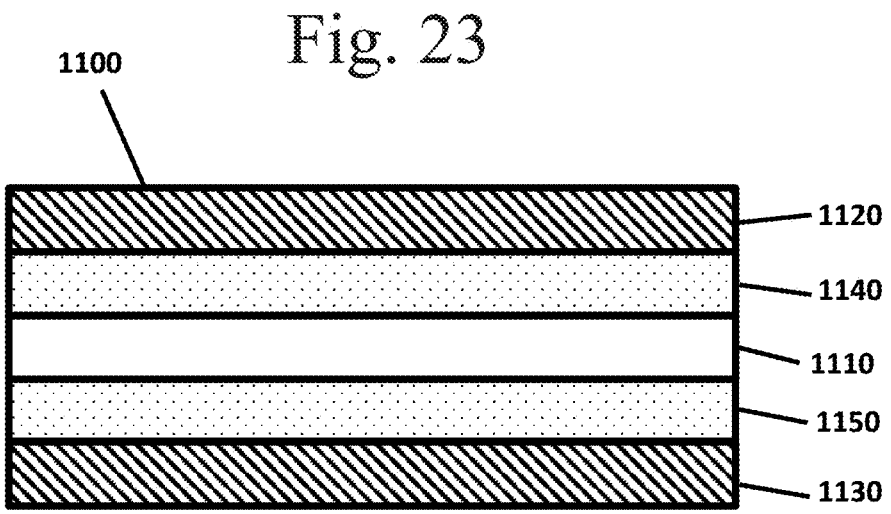
FIG. 24 is a depiction of five layer multi-layer film used in the present invention.

As shown in FIG. 20, which is a cross section of the exemplary package 10 shown in FIGS. 17-19 taken through 20-20, the package 10 also includes an inner sheet 12 having an inner sheet first surface 13, an inner sheet second surface 15, and inner sheet first portion 123, and an inner sheet second portion 124. The package 10 also includes an outer sheet 14 having an outer sheet inner surface 141, an outer sheet outer surface 142, an outer sheet first portion 143, and an outer sheet second portion 144. At least a portion of the outer sheet inner surface 141 of the outer sheet first portion 143 is joined to the inner sheet first surface 13 of the inner sheet first portion 123 to form one or more first primary expansion chambers 241 therebetween. At least a part of the outer sheet inner surface 141 of the outer sheet second portion 144 is joined to the inner sheet first surface 13 of the inner sheet second portion 124 to form one or more second primary expansion chambers 242 therebetween. At least a portion of the inner sheet second surface 15 of the inner sheet first portion 123 is disposed in face-to-face relationship with and joined to a portion of the inner sheet second surface 15 of the inner sheet second portion 124 forming an article reservoir 28 therebetween. The article reservoir 28 has a periphery 281 where the inner sheet first portion 123 and the inner sheet second portion 124 are joined together and a central area 282 within the periphery 281. At least a portion of the inner sheet first surface 13 within the central area 282 is joined to the outer sheet inner surface 141 forming an expansion control tack 60.

The expansion control tack 60 can be formed from or may include any joining means such as adhesive, heat joining, ultrasound, sewing, stitching, melting the sheets together, or any other means or combination thereof. The expansion control tack 60 can be used to help control the shape of the package 10. For example, the expansion control tack 60 can control the size and/or shape of one or more of the first primary expansion chambers 241 when an expansion material 25 is introduced therein. More specifically, the expansion control tack 60 can hold all or a portion of the outer sheet 14 closer to the inner sheet 12 than it would otherwise be once any expansion chambers are expanded. The tack 60 can be any shape, length, width or thickness and can be continuous or intermittent. The tack 60 can be permanent such that it is not able to be released or may be releasable. The tack 60 may be formed before or after the package 10 is expanded and may be disposed anywhere on the package 10 and between any two or more sheets forming any part of the package 10. In the example shown, the package 10 includes three expansion control tacks 60 disposed in the top panel central region 82, three expansion control tacks 60 in the bottom panel central region 76 and one expansion control tack 60 in each of the side panels 9 and 11 and the end panels 6 and 8.

As shown in FIGS. 17-20, a secondary outer sheet 16 may be at least partially joined to the outer sheet outer surface 142 to form a plurality of secondary expansion chambers 26. As noted above, any number of secondary expansion chambers 26 is possible and the location, shape and size of the secondary expansion chambers 26 can be chosen based on the desired shape and other characteristics of the package 10. At least one secondary expansion chamber 26 may be disposed at least partially in the top panel 80 adjacent a first juncture 170 between the top panel 2 and the first end panel 6, the second end panel 8, the first side panel 9 and the second side panel 11. The at least one secondary expansion chamber 26 disposed adjacent the first juncture 170 may provide a top surface 80 on which other packages or articles may be set or stacked, or upon which the package 10 may be set or stacked. The top surface 80 may surround all or a portion of the top panel central region 82. Further, the article 10 may include at least one secondary expansion chamber 26 disposed at least partially in the bottom panel 4 and adjacent a second juncture 72 between the bottom panel 4 and the first end panel 6, the second end panel 8, the first side panel 9 and the second side panel 11. The at least one secondary expansion chamber 26 disposed adjacent the second juncture 72 may provide a base 78 on which the package 10 may be set or stacked. The base 78 may surround all or a portion of the bottom panel central region 76.

In embodiments including a secondary outer sheet 16, any portion of the secondary outer sheet 16 may be joined to any other sheet forming a part of the package 10. For example, the secondary outer sheet 16 may be joined to the outer sheet 14 and/or the inner sheet 12 and/or secondary inner sheet 23 (if present) along all or a portion of the exterior seams 22. Further, the secondary outer sheet 16 may be joined to the outer sheet 14 with expansion control tacks 60. In such cases, if the package also includes expansion control tacks 60 between the outer sheet 14 and the inner sheet 12, the expansion control tacks 60 between the secondary outer sheet 16 and the outer sheet 14 may be the same as, form part of, be different from, and/or be located in the same or different locations from the expansion control tack(s) 60 between the inner sheet 12 and the outer sheet 14 or between the inner sheet 12 and secondary inner sheet 23 (if present). In FIGS. 17-20, the expansion control tack 60 joins the inner sheet 12 and the outer sheet 14 as well as the outer sheet 14 and the secondary outer sheet 16, however, as mentioned, this need not be the case. Different tacks 60 can be used for some or all of the expansion control tacks 60 between the different sheets.

Together, the expansion control tacks 60 can be used to help control the shape of the package 10 such that it expands to and maintains the desired shape, such as, for example, a generally parallelepiped shape. As noted above, other means may also be used to help provide the package 10 with the desired shape. For example, air may be removed from the article reservoir 28 to create a full or partial vacuum to help hold portions of the package 10 in the desired configuration. Yet other means, including static, friction, magnets, stitching, tape, glue, bonds as well as other known means for holding materials in place may be used alone or in combination with any other suitable tacking means. Of course, other shapes can be obtained by changing the shapes and sizes of the sheets making up the package, the location, size and number of expansion chambers and the shape, size and number of expansion control tacks 60.

In addition, or alternatively, the shape of the package 10 may be influenced by the amount of expansion material 25 that is placed in the expansion chambers. For example, one or more expansion chambers may be expanded to an internal pressure that is greater than or less than one or more other expansion chambers. In one exemplary embodiment, one or more secondary expansion chamber 26 may be expanded such that it has an internal pressure that is less than the internal pressure of one or more of primary expansion chambers 24. For example, one or more secondary expansion chambers 26 disposed adjacent the central area of the reservoir 281 may be expanded to an internal pressure that is less than the internal pressure of the one or more primary expansion chambers 24. This can help shape the package 10 such that one or more of the, bottom, side or end panels presents a generally flat surface rather than a surface that is curved or bulging. Also, it is contemplated that one or more of the expansion chambers may be unexpanded during use. That is, one or more of the expansion chambers may not include an expansion material 25 or the expansion material 25 may not be caused to expand the expansion chamber during use. For example, one or more secondary expansion chambers 26 disposed adjacent the central area of the reservoir 282 may remain unexpanded. Again, this can help shape the package 10, as desired. Other than not providing an expansion material 25 in the one or more expansion chambers that are to remain unexpanded, an activatable expansion material 25 can be used that is not activated and/or holes may be provided in the one or more expansion chambers such that an expansion material 25 introduced merely escapes the expansion chamber through the holes.

One feature that can help reduce the amount of material used in the package 10 and help reduce the overall size of the package 10 is to separate the top panel 2 and the bottom panel 4 from each other such that they are spaced apart when the package 10 is expanded for use. As described above, one way to do that is to provide sides 9 and 11 and ends 6 and 8 between the top panel 2 and bottom panel 4. End panels 6 and 8 may be provided by folding the sheets of material making up the package 10 in a configuration to form gussets 75, such as those shown in FIG. 19. For example, the material forming the ends 6 and 8 is folded inwardly and while folded, joined by gusset seams 73 or otherwise held in place relative to the side panel 9 or 11 that it touches. In the embodiment shown, the ends 6 and 8 each have a gusset panel 77 that is joined to the sides 9 and 11 along the gusset seams 73. This creates the gusset 75 that separates the top panel 2 from the bottom panel 4 and allows the package to have one or more ends 6 and/or 8 that are generally parallel to each other and generally perpendicular to the top panel 2 and bottom panel 4. The sides 9 and 11 can be extensions of the top panel 2 and side panel 4 and are held in a generally perpendicular orientation to the top panel 2 and bottom panel 4 by the gusset seams 73. Of course, this is merely one exemplary embodiment used to explain how the package 10 may be configured to provide the desired shape. Other configurations are also contemplated that include other types of gussets 75, different folding patterns and/or different orientations of the panels and sides of the package 10 with respect to each other.

As noted above, one often desirable feature of a flexible package is for it to have a stable base onto which it can be placed. One way to ensure that a stable base 78 is provided, for example on the bottom panel 4, is to ensure that the base 78 is that part of the package 10 that extends a greater distance from the central plane CP than any other portion of the bottom panel 4. Specifically, as shown for example, in FIG. 22, it may be desirable that the base 78 extends from the central plane CP a distance, base distance BD, and preferably the maximum base distance BD, that is greater than the distance, central region distance CRD, and preferably the maximum central region distance CRD, that the bottom panel central region 76 extends from the central plane CP. The same can be done with the top surface 80 or any other panel of the package 10. For example, it may be desirable to ensure that the top surface 80 extends a greater distance from the central plane CP than any other portion of the top panel 2. Specifically, it may be desirable that the top surface 80 extends from the central plane CP a distance, top surface distance TSD, and preferably a maximum top surface distance TSD that is greater than the distance, top panel central region distance TCRD, and preferably the maximum top panel central region distance TRCD that the top panel central region 82 extends from the central plane CP.

Another feature that may be desirable for certain packages is a structure that provides for nesting of one or more surfaces of the package 10 with other surfaces and/or other packages 10. For example, it may be desirable the that top panel 2 of one package is configured to nest with the bottom panel 4 of another package or packages. By nesting, it is meant that a structural feature of one package 10 is able to fit within or otherwise interact with a structural feature of another article (e.g. another package 10 or a surface) in a predetermined way so as to improve how the two articles fit together or coexist in a particular space. Nesting can allow for reduced space needed for shipping or storing multiple packages, can help keep packages from shifting, moving or falling, and can help ensure packages are oriented as desired with other packages or surfaces, etc. Nesting can be realized by shaping one or more of the surfaces or panels of the package 10 to deliberately interact with another surface, article or package. For example, the top panel 2 of the package 10 may be shaped to nest with the bottom panel 4 of another package 10. Alternatively, or in addition, other sides, ends or panels of the package may be configured for nesting. One example of a package 10 configured for nesting is shown in FIGS. 21 and 22. As shown, the top panel 2 includes a protruding expansion chamber 90 that extends beyond the top surface 80 of the top panel 2. In the embodiment shown, the protruding expansion chamber 90 is generally in the shape of a rectangular parallelepiped extending outwardly from the top surface 80 of the package 10. The same package 10 has an inwardly extending depression 92 disposed on the bottom panel 4 that is sized and shaped such that the protruding expansion chamber 90 can fit at least partially within the depression 92. Of course, any side, end or panel can have one or more protrusions 90 or depressions and the protrusions 90 and depressions can have any desired shape, height or depth.

As noted above, the flexible package 10 may optionally include one or more retrieval features 55 such as a tear strip or any other feature that allows a user to access the article reservoir 28 after it has been closed. The retrieval feature 55 may be configured to allow access to the article reservoir 28 without otherwise affecting the package 10 or may be configured to deflate any one or more of the expansion chambers. The retrieval feature(s) 55 can be configured to provide access to the article reservoir 28 at least partially across one side, end or panel or may extend fully across any one or more ends, sides or panels. For example, the retrieval feature(s) 55 may allow access to the article reservoir 28 on three sides, allowing the package 10 to be fully opened like a clam shell, on all sides and edges to allow the top panel 2 and bottom panel 4 to be completely separated from each other, or on one or two sides or edges to allow access more like an envelope or pouch.

The package 10 can be made from a variety of materials. Such materials may include, for example and without limitation, films, woven materials, non-woven materials, paper, foil, and/or any other flexible materials. In fact, an advantage of the package 10 of the present invention is that it can be made substantially, almost entirely or entirely from flexible materials but still provide the rigidity, strength and protection needed to successfully and economically ship consumer products through established parcel and mail delivery systems. For example, the package 10 may comprise or be manufactured only of one or more film materials without the need for additional rigid interior or exterior elements, such as wood, metal, solid foam or rigid plastic or a paperboard box, to provide shape and/or structure to the package 10. Stated differently, the package 10 may consist of, or consist essentially of flexible materials. This can be advantageous for both manufactures and consumers as flexible materials such as sheets of film are often easier to handle, ship and store than more bulky items like paperboard boxes and other structural packaging members.

If films are used, the films may include, for example, polyethylene, polyester, polyethylene terephthalate, nylon, polyproplene, polystyrene, polyvinyl chloride, and the like. The sheets may include and/or be coated with a dissimilar material. Examples of such coatings include, without limitation, polymer coatings, metalized coatings, ceramic coatings, and/or diamond coatings. The sheets may be plastic film having a thickness such that the sheets are compliant and readily deformable by an application of force by a human. The thicknesses of the inner, outer and secondary outer sheets 12, 14 and 16, respectively, may be approximately equivalent. Alternatively, the thicknesses of the sheets may be different. Where materials other than the multi-layer polyethylene laminate film are incorporated into the package, they are preferably used at low level (i.e. less than 10% or less than 5% or less than 1% or the total eight of the package) and/or are readily separable from the package.

Multi-layered films useful in the present invention include laminates of polypropylene and/or polypropylene copolymers and are substantially free of non-polypropylene polymers and copolymers. Specifically, polypropylene polymers and copolymers are preferably >80 wt % of the total polymer content, more preferably >90 wt %, and most preferably >95 wt %. For the purpose of this invention, polypropylene polymers and/or copolymers are polymers or copolymers that contain >50 wt % repeat units based upon propylene monomer. Non-limiting examples of polypropylene polymers or copolymers include iso-tactic polypropylene, atatic polypropylene, syndiotactic polypropylene, impact copolymers (with >50 wt % propylene monomer units), heterophasic polypropylene copolymers (with >50 wt % propylene monomer), PP-MAH (with >50 wt % propylene monomer), and elastomeric poly-propylene copolymers (with >50 wt % propylene monomer). The multi-layered films of the present invention may include common non-polymeric additives such as slip agents, anti-block agents, AOs, energy absorbers, pigments, etc. The multi-layered films of the present invention may include various commonly used surface treatments such as corona treatment, varnishes, or surface printing.

The multi-layered films of the present invention may comprise two or more or three or more layers, which may be in the form of a laminate. The multi-layered films may comprise a first and second outer layer, and one or more intermediate layers. In embodiments there may be from 1 to about 20 intermediate layers, from about 2 to about 16, from about 2 to about 12, from about 2 to about 10, from about 2 to about 8, from about 2 to about 6, or from about 2 to about 4. As used herein, the term "laminate" is not intended to require any particular type of joining, but rather, merely indicates individual layers within the film that comprises the flexible materials used on the package are disposed face-to-face, one on top of the other. Other types of laminate structures may be suitable for use as well. Non-limiting examples include laminates created from co-extrusion or adhesive laminates of multiple layers. The films of the present invention may be produced by the blown film or cast film process or various post-orientation process including MDO or tentering. In embodiments, a multi-layered film may comprise two outer layers, which may be the same or differ (for example differ in structure, thickness, chemical composition, additives, etc. . . . ), wherein at least one of the outer layers has the following characteristics; a primary melting point below 130 C. Non-limiting examples of such materials include polypropylene elastomers such as VistaMax. In embodiments a multi-layered film may comprise one or more inner layers, which when there is more than one inner layer the individual inner layers may also be the same or differ (for example differ in structure, thickness, chemical composition, additives, etc. . . . ), wherein the inner layer(s) may have the following characteristics; a primary melting point above 130 C. Non-limiting examples of such include various homopolymer isotactic polypropylenes, which may include nucleators. In embodiments a surface of each layer may be in partial, substantial, or complete contact with a surface of an adjacent layer. In embodiments a surface of a layer may be chemically or physically bonded to a surface of an adjacent layer. In embodiments there may be intermixing between adjacent layers. Each of the respective layers comprises at least one polypropylene material. The polypropylene material may include one or more of a homopolymer isotactic polypropylene, a impact copolymer polypropylene, a nucleated homopolymer isotactic polypropylene, and an elastomeric polypropylene. The polypropylene materials may be chosen to be recyclable in the polypropylene recycle stream, that is to say that the laminate including the polyethylene materials may be recycled in currently available infrastructure without requiring that the layers of the laminate be separated from one another. Polypropylene materials may include one or more of a Low melting polypropylene based polymers and copolymers (LM-PPP) are ideal heat seal materials due to low melting point, which increases interdiffusion at the seal interface. For the present invention, a LM-PP is defined as a polypropylene based polymer or copolymer with a primary melting point preferably below 130° C., more preferably below 110° C., and most preferably below 95° C. Non-limiting examples include polypropylene elastomers such as VistaMax series of resins from ExxonMobil Exact, etc. The LM-PP layer can comprise 10-50% of the multi-layered film structure, preferably 10%-25%. The LM-PP layer is disposed on at least one of the outer surfaces of the multi-layered film structure (preferably both outer surfaces) and may be further incorporated as at least one inner-layer of the multi-layered film. The LM-PP on the outer surfaces provides that the PP multi-layered films can be effectively heat-sealed at the outer surface in forming the flexible package. While it is possible to heat-seal the other types of PP, the heat seals provided by the LM-PP form more completely and more quickly and provide for improved burst-strength of the inflated flexible package. For example, if the heat-seals are poorly formed, the inflated flexible package may burst through the heat-seal seams. Incorporating LM-PP as an inner-layer may divide the non-LM-PP layers with a more flexible material. This can prevent failures in one layer of the non-LM-PP material from propagating through the entire non-LM-PP structure. The non-LM-PP layer can comprise 20-65% of the total multi-layered film preferably 30%-50%. The non-LM-PP is incorporated as an inner or intermediate layer of the multi-layered film and can be disposed as one or more layers within the multi-layered film. Where the non-LM-PP is incorporated as multiple layers within the multi-layered film, the layers of non-LM-PP may be separated by layers of LM-PP. Incorporating Non-LM-PP into the multi-layered film structure provides stiffness, strength, and creep resistance to the overall structure. In addition, non-LM-PP provides gas barrier. Non-limiting examples of non-LM-PP include homopolymer isotactic PP, nucleated homopolymer isotactic PP, and impact copolymer PP (with >50 wt % propylene monomer). The non-LM PP layer can comprise 0-80% of the multi-layered film structure, preferably 35%-55%. The non-LM PP can be incorporated as any layer of the multi-layered film and can be disposed as one or more layers within the multi-layered. Where the non-LM PP is incorporated as multiple layers within the multi-layered film, the layers of non-LM PP may be separated by layers of LM-PP or any other variety of PP.

Figure 25:
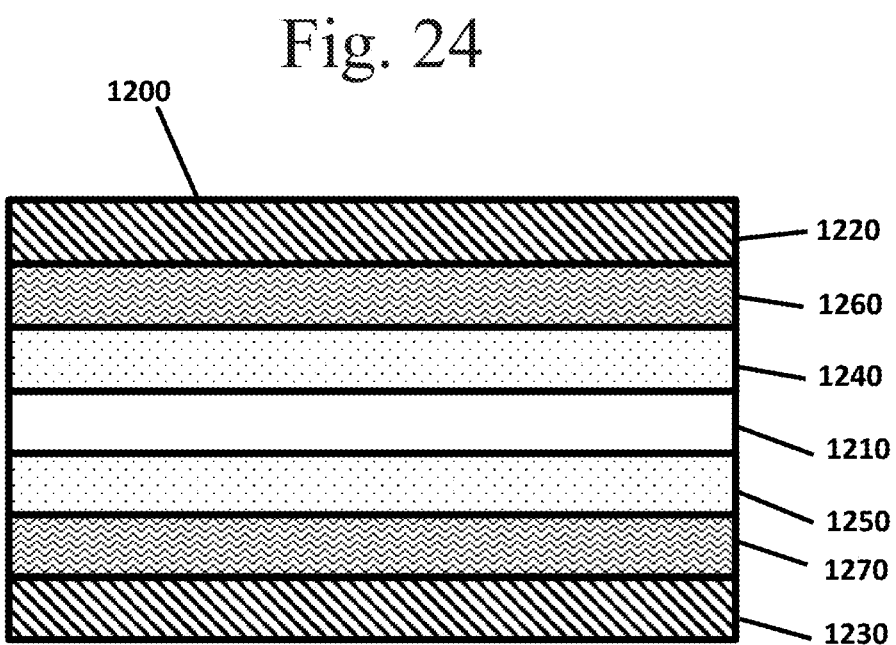
FIG. 25 is a depiction of a seven layer multi-layer film used in the present invention.

FIG. 25 depicts a multi-layered film 1200 comprising seven layers, an inner layer 1210, a first and second outer layer 1220, 1230, a first intermediate layer 1240, a second intermediate layer 1250, a first secondary intermediate layer 1260, and a second secondary intermediate layer 1270. In embodiments the multi-layered film can be about 75 μm thick. In embodiments the two outer layers of the multi-layered film are LM-PP each about 7 μm thick and comprise about 9% of the total thickness of the multi-layered film; a 7 μm layer of LM-PP comprises the inner layer (for a total of about 28% of the multi-layered film). The first and second intermediate layers comprise isotactic PP homopolymer (each about 9 μm thick, or about 24% of the total multi-layered film) and the first and second secondary intermediate layers comprise heterophasic PP (each of which is about 18 μm thick for a total of 48% of the total multi-layered film).

In embodiments a seven-layer multi-layered film can be about 100 μm thick. The two outer layers of the multi-layered film are LM-PP each about 7 μm thick and comprising about 7% of the total thickness of the multi-layered film; a 7 μm layer of LM-PPE is also included as the inner layer (for a total of about 28% of the multi-layered film). The first and second intermediate layers comprise isotactic PP homopolymer (each about 20 μm thick, or about 40% of the total multi-layered film) and the first and second secondary intermediate layers comprise heterophasic PP (each of which is about 20 μm thick for a total of 40% of the total multi-layered film).

In embodiments a seven-layer multi-layered film can be about 120 μm thick. The two outer layers of the multi-layered film can be LM-PP each about 10 μm thick and comprising about 8% of the total thickness of the multi-layered film; a 10 μm layer of LM-PP is also included as an inner-layer (for a total of about 25% of the multi-layered film). The first and second intermediate layers comprise isotactic PP homopolymer (each about 20 μm thick, or about 33% of the total multi-layered film) and the first and second secondary intermediate layers comprise heterophasic PP (each of which is about 25 μm thick for a total of 42% of the total multi-layered film).

In embodiments a seven-layer multi-layered film can be about 60 μm thick. The two outer layers of the multi-layered film can be LM-PP each about 5 μm thick and comprising about 8% of the total thickness of the multi-layered film; a 5 μm layer of LM-PP is also included as an inner-layer (for a total of about 25% of the multi-layered film). The first and second intermediate layers comprise heterophasic PP (each about 10 μm thick, or about 33% of the total multi-layered film) and the first and second secondary intermediate layers comprise heterophasic PP (each of which is about 12.5 μm thick for a total of 42% of the total multi-layered film).

In embodiments a seven-layer multi-layered film can be about 100 μm thick. The two outer layers of the multi-layered film can be LM-PP each about 5 μm thick and comprising about 10% of the total thickness of the multi-layered film. The first and second intermediate layers comprise HDPE (each about 17 μm thick, or about 34% of the total multi-layered film) and the first and second secondary intermediate layers comprise heterophasic PP intermediate (each of which is about 25 μm thick); a 6 μm layer of LM-PP is also included as inner-layer (for a total of about 56% of the multi-layered film).

It may be desirable for a non-symmetrical layer structure with different material fixtures.

Figure 26:
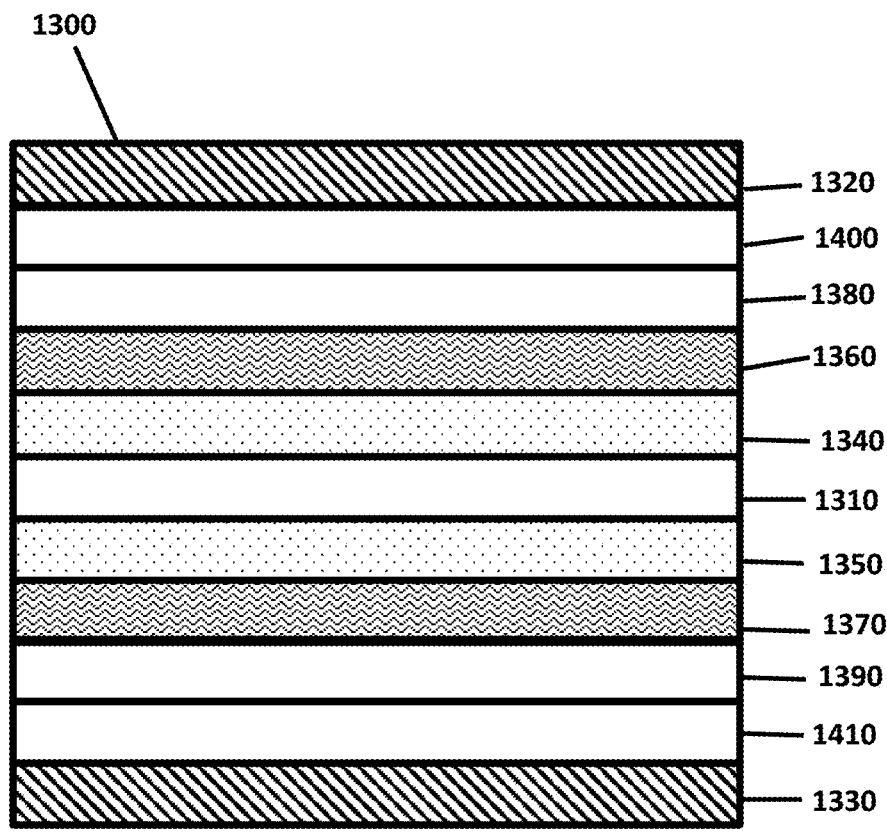
FIG. 26 is a depiction of an eleven layer multi-layer film used in the present invention.

FIG. 26 depicts a multi-layered film 1300 comprising eleven layers, an inner layer 1310, a first and second outer layer 1320, 1330, a first intermediate layer 1340, a second intermediate layer 1350, a first secondary intermediate layer 1360, and a second secondary intermediate layer 1370, a first tertiary intermediate layer 1380, and a second tertiary intermediate layer 1390, a first quaternary intermediate layer 1400, and a second secondary quaternary layer 1410. In embodiments an eleven layer multi-layered film can be about 90 μm thick. The two outer layers of the multi-layered film can be LM-PPE each about 10 μm thick and comprising about 22% of the total thickness of the multi-layered film.

The first and second intermediate layers and first and second tertiary comprise nucleated isotactic homopolymer PP (each about 5 μm thick, or about 22% of the total multi-layered film); and the inner layer, first and second secondary layers, and first and second quaternary layers comprise heterophasic PP (each of which is about 10 μm thick; for a total of about 56% of the multi-layered film).

Furthermore, coated paper film materials may be used. Additionally, laminating nonwoven or woven polyethylene materials to film materials may be used.

The sheets making up the package 10 may be provided in a variety of colors and designs, as to appeal to a consumer interested in purchasing the product held in the package 10. Additionally, materials forming the sheets may be pigmented, colored, transparent, semitransparent, or opaque. Such optical characteristics may be modified through the use of additives or masterbatch during the film making process. Any of the aforementioned optical modifiers may be incorporated into any layer of the film laminate structure. Additionally, other decoration techniques may be present on any surface of the sheets or within the internal structure of the sheet such as a sandwich printed inks, lenses, holograms, security features, cold foils, hot foils, embossing, metallic inks, transfer printing, varnishes, coatings, and the like. Preferably, additives including pigments, inks, foils, or additives such as those used to alter the resulting gloss and matte level of finish sheet and the like are used at sufficiently low levels that they do not interfere with the recyclability of the PE laminate film. Any one or all of the sheets may include indicia such that a consumer can readily identify the nature of the product, or any given property of the product, held in the article reservoir 28 of the package 10, along with the brand name of the producer of the product held in the package 10, the sender of the package 10, or any third-party such as a sponsor of either the producer of the product or the sender of the package 10. The indicia may contain decorative elements. The indicia may also provide comment or instruction on use of the product and/or package 100 and may be incorporated adjacent to any of the functional features disclosed herein (e.g. the closeable opening 30 or the article retrieval feature 55) as a means to facilitate recognition of the locations and/or purpose of the feature. In particular, the first surface 17 or the second surface 19 of the outer sheet 14 may be generally flat and free from interruptions. Accordingly, a variety of branded indicia may be applied to the first surface 17 or second surface 19 of the outer sheet 14 of the package 10 for viewing by a shipper or consumer.

Flexible film materials forming the sheets may be colored or pigmented. Flexible film materials may also be pre-printed with artwork, color, and or indicia before forming a package preform using any printing methods (gravure, flexographic, digital printing, screen, ink jet, laser jet, and the like). Additionally, the assembled package 10 may be printed after forming using any of the printing means noted. Any and all surfaces of the package 10 may be printed or left unprinted. Additionally, certain laminates of a laminated film forming the sheets may be surface printed or reverse printed. It may be desirable to print one surface of a laminate layer before combining it with other laminate layers so that the printed surface is located inside the sheet. In addition, functional inks may be printed on the sheets. Functional inks are meant to include inks providing decoration benefits, texture coatings, or other benefits including, for example and without limitation, printed sensors, printed electronics, printed RFID, and light-sensitive dyes and laser-marking additives. Additionally, or in the alternative, labels, for example and without limitation, flexible labeling, or heat shrink sleeves may be applied to the sheets making up the flexible packages 10 or the flexible packages 10 themselves before or after expansion to provide the desired visual appearance of the packages 10. Because films can be printed flat and then formed into three dimensional objects, artwork can be designed to conform precisely to the package 10 itself or articles 100 therein. For example, some or all of the printing may be distorted relative to its desired finished appearance, so that the indicia acquire their desired finished appearance upon being formed into three dimensional objects. Such pre-distortion printing may be useful for functional indicia such as logos, diagrams, bar-codes, and other images that require precision in order to perform their intended function.

A variety of primary expansion materials 25 and/or secondary expansion materials 29 may be provided into the primary expansion chambers 24 and secondary expansion chambers 26, respectively. The primary expansion material 25 and/or secondary expansion material may be a gas, a liquid, a solid or a combination thereof. One example of a solid expansion material is a solidifying foam. Such materials can be introduced into the expansion chambers as a fluid that changes to a solid or as a solid. If a foam is used, it may be an expandable foam that increases in volume as the foam solidifies. An example of such foams includes, without limitation, a two-part liquid mixture of isocyanate and a polyol that, when combined under appropriate conditions, solidify to form a solid foam. One advantage of such an expansion material 25 is that it may be possible to use it for the intended purpose without the need to seal the expansion chamber(s), which can simplify the manufacturing and/or expansion chamber filling process. The expansion material may include a perfume, scent, color or have other consumer noticeable attributes that can provide aesthetic and/or functional benefits while enclosed within the expansion chambers or when released therefrom. For example, a scent can be included in the expansion material 25 such that when one or more of the expansion chambers is deflated, the scent is released into the air. Further, an expansion material can be used that provides UV protection, insulation or another desirable function.

The expansion material 25 may be an "expand-on-demand" material that can be expanded at any time by the user. For example, expansion of the expansion chambers 24, 26 may be caused by a phase change of a fluid introduced into the chambers. Examples of the phase change may include injecting a quantity of cooled material, for example and without limitation, liquid nitrogen or dry ice. By sealing the chamber from the external environment and allowing the expansion material to vaporize and/or sublimate when reaching an ambient temperature, pressures between the sheets may cause the expansion chambers to expand. Chemically reactive materials, for example and without limitation, a weak acid, such as citric acid, to a weak base, such as sodium bicarbonate, may be introduced into the chambers and can be activated, as desired, by the user. In such configurations, it may not be necessary to have an opening or port into which the user can introduce the expansion materials.

If chemically reactive materials are used, they can be separated from one another to allow the user to determine when to expand the expansion chambers. For example, they can be separated using a frangible seal, which may be broken to induce a reaction that causes expansion of the expansion chambers. Also, chemically reactive materials may be chosen that are non-reactive with one another at certain environmental conditions, for example at certain temperatures. When expansion of one or more of the expansion chambers is desired, the package 10 may be exposed to the environmental conditions, for example, by increasing the ambient temperature, causing the chemically reactive materials to react with one another to cause the expansion. The chemically reactive materials may be non-reactive with one another unless subject to electromagnetic energy including, for example and without limitation UV light or microwave energy. In such cases, when expansion of one or more of the expansion chambers is desired, the package 10 may be exposed to the electromagnetic energy, causing the chemically reactive materials to react with one another to cause the expansion. Such expand-on-demand expansion materials 25 may be especially desirable for situations where it is useful for the user to be able to expand the expansion chambers at any desired time and/or at a location other than the manufacturing or fulfillment location. For example, a user could purchase a package 10, take it home or to a shipping location, place article(s) 100 in the reservoir 28 and expand the expansion chamber(s).

Although the expansion material may provide any amount of expansion desired, it has been found that a pressure from about ambient pressure to about 25 psig, or from about 1 psig to about 20 psig is generally suitable for flexible packages 10 used to ship typical consumer products. Higher or lower pressures may be desired in one or all of the expansion chambers 24, 26 depending on the article(s) 100 being shipped, the method of shipment, the expected environmental conditions, such as the temperature and/or altitude to which the flexible package 10 will be exposed.

The packages 10 of the present invention can be configured to have any desired mechanical, chemical, environmental (e.g. temperature, humidity, light, sound, dust, atmospheric pressure, precipitation, etc.), and other performance characteristics desired. For example, the packages 10 may include materials that resist penetration of humidity, water, light, certain chemicals, and/or gases. An advantage of the package 10 of the present invention is that it can be configured to meet or exceed many of the most common parcel shipping requirements, for example, as set for in industry standards like ISTA performance tests, without the need for multiple different packaging materials or difficult to construct and/or store packages.

The package 10 may be configured to endure the rigors of shipping through regions of changing ambient air pressure, such as transportation over mountains or shipment via air-cargo. Changes in ambient pressure may include increases in atmospheric pressure and decreases in atmospheric as well as changes in ambient pressure, such as in pressurized cargo holds. Transportation over high altitudes and/or shipment via air-cargo typically include a reduction in ambient air pressure. Such reductions in ambient pressure can result in an expansion chamber 24, 26 that is expanded to a pressure below its burst pressure at or near sea-level to burst during shipment. The expansion chambers 24 and 26 may be inflated sufficiently below their burst-pressure that they do not burst during shipment at reduced ambient pressure and/or may include vents or valves to allow some or all of the expansion material to escape if the expansion chamber is nearing its burst pressure.

In terms of mechanical protection, the packages 10 may be designed and configured to have properties that help protect any articles 100 shipped therein from damage due to mechanical forces, such as dropping, stacking, puncture, squeezing, tearing, pinching, etc. As with other attributes, the package 10 can be specifically designed to meet the needs of the user in terms of mechanical protection by choosing appropriate materials for different parts of the package 10, appropriately designing the shape of the package 10, appropriately expanding the one or more expansion chambers 24, 26, among other things.

One of the most important mechanical damaging forces to protect against during shipping is dropping. Often packages do not provide adequate protection for dropping because they allow the articles being shipped therein to "bottom out" when dropped. Bottoming-out occurs when any protective material in the package reaches its limit of protection and the article therein is subjected to the full resistance force of the surface on which it is dropped. The packages 10 of the present invention have been found to be particularly good at resisting bottoming out of articles shipped therein, and thus, can effectively prevent breakage and other damage to the articles.

Further, the package 10 may include one or more thermally insulating material. A thermally insulating material is one that would result in an increase of the R-value as measured between the reservoir 28 and the outside of the package. In one example, one or more of the expansion chambers 24, 26 may include a thermally insulating material. Non-limiting examples of thermally insulating materials include foams and gasses with R-values greater than air, such as, for example, noble gases such as argon.

The overall shape of the package 10 may include at least one relatively flat portion or "face". This portion may be useful for applying shipping labels or instructions. Although not required, having a relatively flat portion may be useful in terms of handling the package 10 through conventional shipping systems. For example, when conveying packages at angles, rounded packages have a tendency to tumble, while packages comprising relatively flat portions are less likely to have that disadvantage. The overall shape of the package 10 may be roughly polyhedral. The overall shape of the package may be substantially a rectangular prism. Such shapes can also provide for better stacking, fit into conventional shipping equipment and handling.

Figure 27:
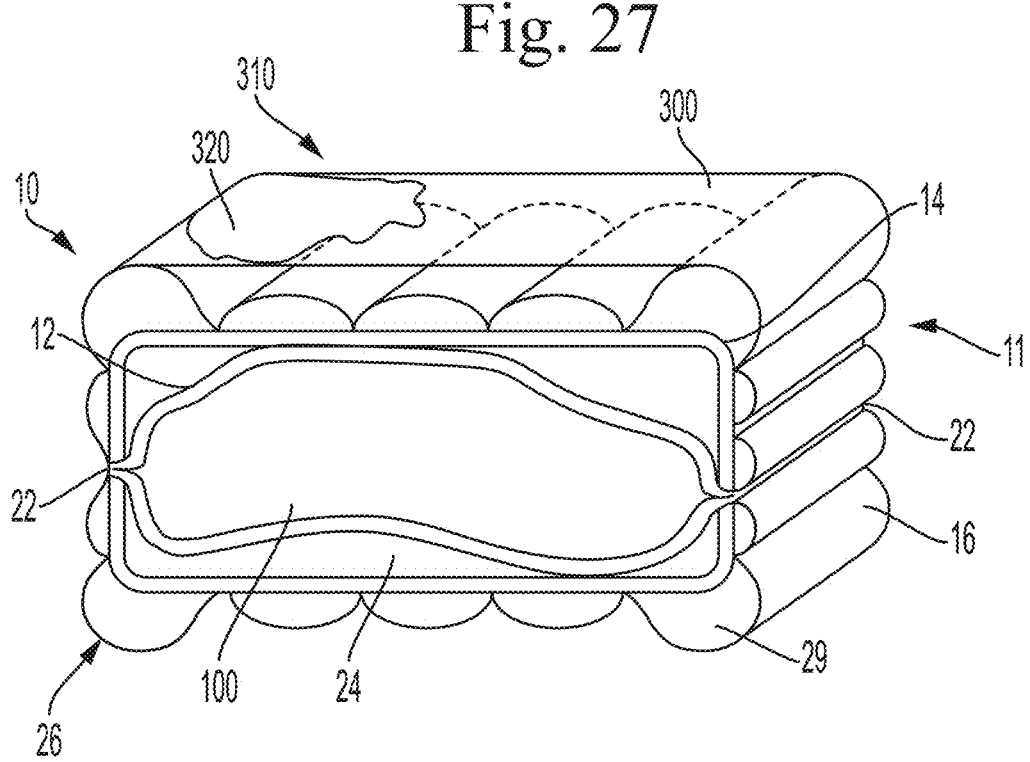
FIG. 27 is an isometric, cross-sectional view of an alternative embodiment of the package of the present invention having an outer wrap disposed about a portion of the package.

It may be desirable for the package 10 to have one or more outwardly-facing surfaces that are relatively planar. A relatively planar outwardly-facing surface can provide the benefits of allowing for easy application of a label and/or printing, and can also make the package 10 more stable during shipment and storage. One difficulty with providing one or more relatively planar surfaces in packages of the invention described herein is that the expansion chambers often create curved and/or irregular surfaces when they are expanded. As such, it would be desirable to have the advantages of the inventive package described herein, but also the added benefit of one or more relatively planar surfaces. Several ways to provide such desired relatively planar surfaces are contemplated. For example, an external wrap 300, as shown in FIG. 27, may be provided that surrounds some or all of the package 10 and provides one or more outwardly facing relatively planar surfaces 310.

The external wrap 300 can be made of any desirable material, including plastic films, foils, woven materials, nonwoven materials, composite materials, paper, and/or any other flexible material. If the external wrap is permanently attached to the package 10, it is preferably that the external wrap also be made from a polyethylene material. If the external wrap is not made from a polyethylene material it is preferably that the external wrap be removably attached to the package 10. Of course, non-flexible materials may be used, but such materials tend to be less preferred where the benefits of a flexible package are desired. Examples of materials that are especially useful are shrink films, stretch films and other polymeric films. Such materials may, for example, be formed into sleeves that can be placed around all or a portion of the package 10 or can be discrete sheets and/or continuous materials that are wrapped about the package 10 and cut to the desired size. In some embodiments, the external wrap 300 extends about the entire circumference of the package 10 and in other embodiments, the external wrap 300 may be a discrete sheet of material that extends only across a portion of the circumference of the package 10. For example, the external wrap 300 may extend across one or more sides of the package 10 or may extend across only a single side or portion of a single side of the package 10. Multiple external wraps 300 are also contemplated. For example, different materials or the same material may be used in multiple layers or in different locations on the package 10.

Figure 28:
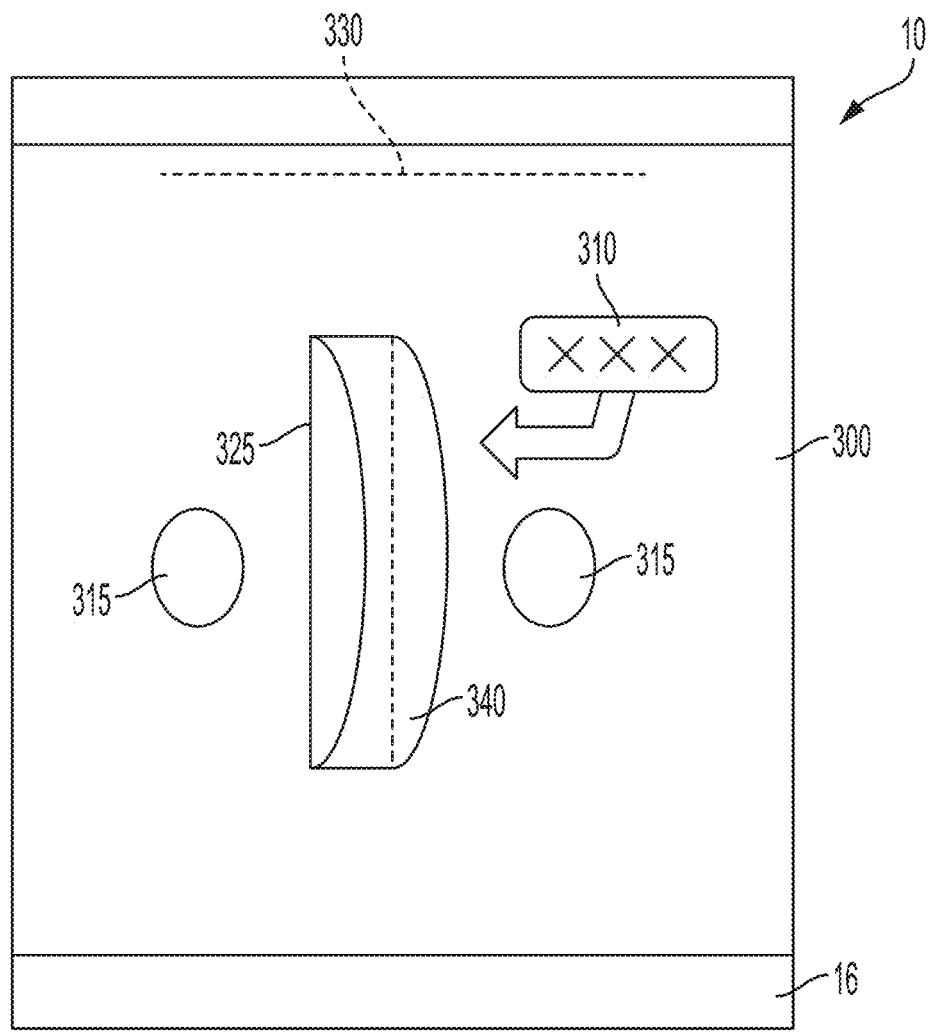
FIG. 28 is a simplified plan view of a package of the present invention.

The external wrap 300, or any portion thereof, may be printed, mechanically or chemically modified or otherwise provided with one or more indicia, including but not limited to letters, numbers, characters, graphics, etc. The indicia may be 2-dimensional or three dimensional. Additionally or alternatively, the external wrap 300 may be provided with a scent, texture or other functional characteristic. Further, the external wrap 300 may be provided with a coating or have imbedded therein a material that acts to provide some other benefit, such as, for example, UV protection, scuff, tear or puncture resistance, insulative properties, coefficient of friction modification, or any other beneficial property that might be desired by the user. The external wrap 300 may also provide dimensional stability and/or uniformity to the package 10, which can be advantageous for shipping, handling, stacking and storage. For example, the external wrap 300 may provide or may be used to join one or more handles, a grip region, a hanger or other functional feature. FIG. 28 is a simplified figure showing an example of a package 10 of the present invention wherein the external wrap 300 has holes 315, slits 325, perforations 330 and external wrap handle 340. Of course, any combination of these and other functional features may be included and formed from or joined to the external wrap 300. Such functional features may also be aligned with decorative or instructional indicia, such as external wrap indicia 310, to help the user use the package 10 and or to provide an aesthetically desired configuration.

The benefits of employing an external wrap 300 are numerous, some of which are noted above. However, some of the most beneficial aspects relate to aesthetics and ease of printing or decorating. As noted, use of an external wrap 300 can provide for a relatively planar surface onto which a label may be placed and/or onto which ink or another material may be printed (e.g. the external wrap 300 may be the shipping or other label). Further, use of an external wrap 300 allows for printing and/or otherwise treating the material making up the external wrap 300 at a time, process and/or location different from manufacture, filling, expanding and/or closing of the package 10. Thus, it allows for late stage customization of packages. It can also provide for printing and handling of the outer wrap 300 at speeds that are higher than they might otherwise be if the printing of the external wrap 300 had to be done when the wrap is integral with, joined to or disposed about the package 10. It also allows for more simple printing of the package 10 after it is expanded as the external wrap 300 can provide a planar surface even after expansion. Further still, the external wrap 300 can provide a "billboard" on the package to allow for improved communication to the user and/or end consumer. Even further, this allows for the package 10 to be produced more generically in terms of printing and decoration, which can save cost, and then provided with the desired information, aesthetics and/or labelling at a later stage allowing for more customization and more efficient handling. Also, providing a relatively planar surface allows use of existing labeling and handling equipment and can also help with storage and/or shipping as well as provide what looks like a more finished or refined package.

Any portion or surface of the external wrap may be printed or otherwise include external wrap indicia 320 (e.g. as shown in FIG. 27) and the external wrap 300 or portions thereof may be opaque, translucent or transparent. Further, any one or more of the external wrap indicia 310 and/or any opaque, translucent or transparent portion of the external wrap 300 may be aligned with any indicia 84, transparent, translucent or opaque portion of any other sheet of the package 10.

The external wrap 300 can be a separate piece or pieces of material that can be affixed to any portion of the package 10 or may be unjoined thereto. As previously noted, if the external wrap is permanently attached to the package 10, it is preferably that the external wrap also be made from a polyethylene material. It can be wrapped around a portion or the entirety of the package 10. It can be stretched and/or shrunk to snugly fit about the package 10. For example, a stretch wrap or shrinkable material such as a shrink wrap or a shrink sleeve may be used and wrapped around the package 10 after an article 100 is placed therein and one or more of the expansion chambers is expanded. Alternatively, stretch wrap or a non-stretchable material may be wrapped about or affixed to the package 10 before an article is placed therein and/or before one or more of the expansion chambers is expanded. Further still, a shrink wrap material can be used that can be disposed about a portion of the package and then shrunk to provide a taught, relatively flat surface. The external wrap 300 can be provided with the package 10 as an integral part thereof or can be a separate piece or pieces that can be used or not based on the desires of the particular user.

There are several advantages of providing the external wrap 300 as a separate material than that which makes the entirety or a portion of the rest of the package 10. One example is that the external wrap 300 can be made of a material with different properties than the rest of the package 10 and this can make the overall package less expensive. For example, the external wrap 300 could be made of a material that is stronger, thicker, more puncture resistant, etc. than the rest of the package 10. Since the external wrap 300 material can be independent of the other materials that make up the package, the user can choose a more expensive material for the external wrap 300 and a less costly material for the rest of the package 10 than would have otherwise been useful for the particular situation if the external wrap 300 was not used. Another example is that the external wrap 300 can be recyclable and/or reusable, but in a different recycling stream from the polyethylene-based package 10. Thus, it may be desirable to have the external wrap 300 made of a different material than the package 10.

As noted above, it may be desirable for the package 10 to have single, double or more redundancy for one or more of the expansion chambers. By making chambers discrete from each other, they can provide redundancy to each other. That is, if one chamber is deflated, other chambers can remain in an expanded configuration. This is especially desired when the expansion chambers provide structural rigidity and/or the shape of the package 10 can be provided in such a way that if one or more of the expansion chambers is damaged or deflated, one or more other expansion chambers remains and can continue to provide the structural rigidity and/or shape of the package 10. This can help ensure that the package 10 maintains its shape and/or protective capabilities, can be easily handled throughout its use, and/or provide the desired protection for any articles therein even if the package 10 is damaged during use.

Figure 29:
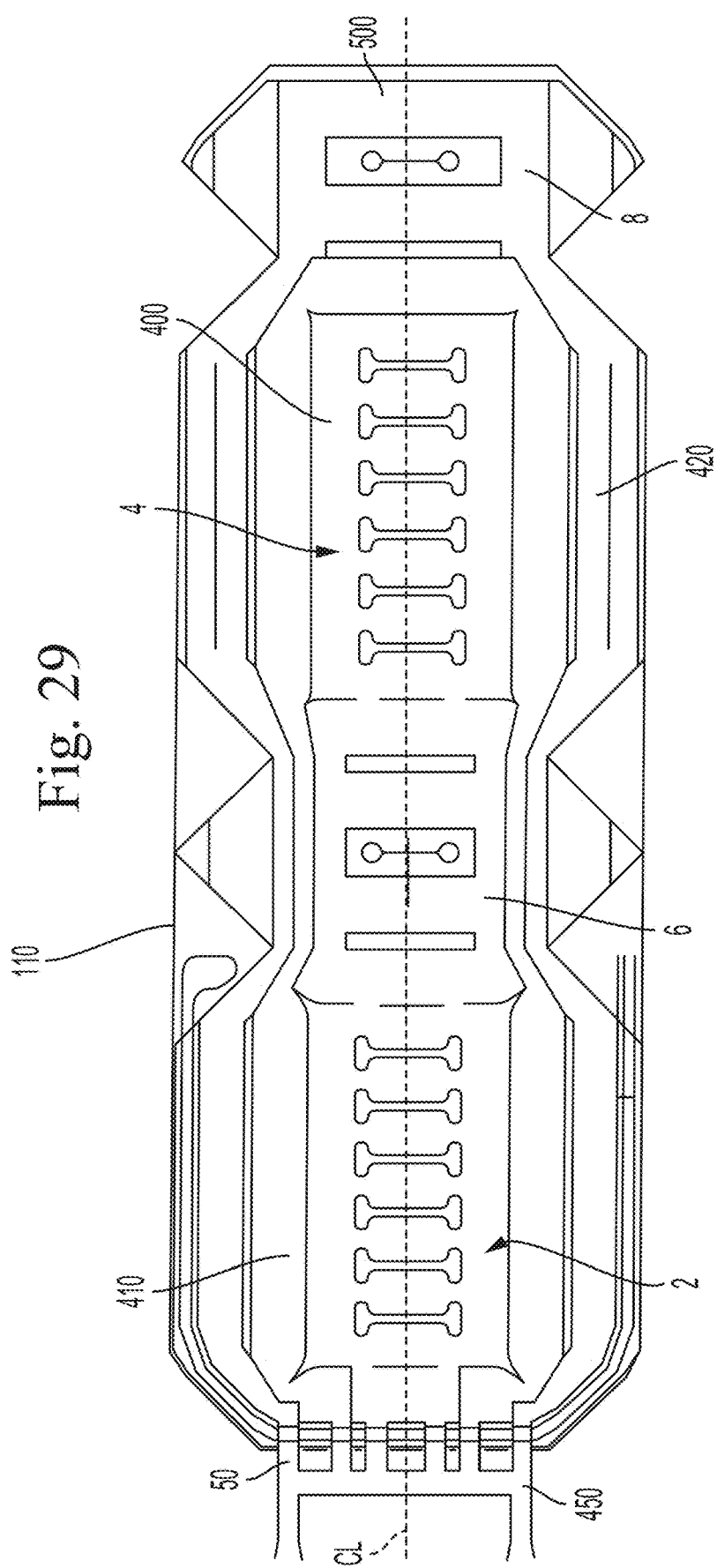
FIG. 29 is a plan view of a blank for a package of the present invention shown in a flat state prior to being formed into a package.

FIG. 29 is an example of a preform 110 including three flexible materials that have been joined together to form expansion chambers, such as secondary expansion chambers 26. The preform 110, as shown, has yet to be assembled into the final package 10. As shown, there are three discrete secondary expansion chambers 26, a first chamber 400, a second chamber 410 and a third chamber 420. Although three discrete secondary expansion chambers 26 are shown, there could be as few as one discrete secondary expansion chamber 26 and as many discrete secondary expansion chambers 26 as desired, including but not limited to two or more, three or more, four or more, or even greater numbers. Also, as noted herein there can be any number of discrete primary expansion chambers 24 and any combination of discrete primary expansion chambers 24 and secondary expansion chambers 26. An example of a package preform 110 with five separate secondary expansion chambers 26 is show in FIG. 31.

As shown in FIG. 29, one way to achieve redundancy in one or more secondary expansion chambers is to configure the package preform 110 and resulting package 10 (shown in FIG. 30) such that at least two of the expansion chambers are adjacent one another along a portion of the package 10. As used herein, "adjacent" does not require that the features be in contact, directly next to each other or in any way connected. Rather, adjacent features can be in close proximity and can be separated by other features so long as they can perform the desired function. For example, the first chamber 400 may be disposed generally in the center of the preform 110 resulting in the first chamber 400 being located generally in the center of the top panel 2 and the bottom panel 4 of the package 10. Second chamber 410 is disposed outward of the first chamber 400 along what will become a line separating the top panel 2 from one of the side edges 9, 11. Third chamber 420 is disposed outward of the second chamber 410 on the preform 110 and forms at least a portion of one of the side edges 9, 11 of the package 10. Third chamber 420 and second chamber 410 are adjacent one another along at least a portion of the package 10 such that if one of the chambers were to be deflated (e.g. accidentally during shipping or handling), the other chamber would not necessarily deflate and would thus be able to provide redundancy to the deflated chamber in the location where the two chambers are adjacent one another.

Figure 30B:
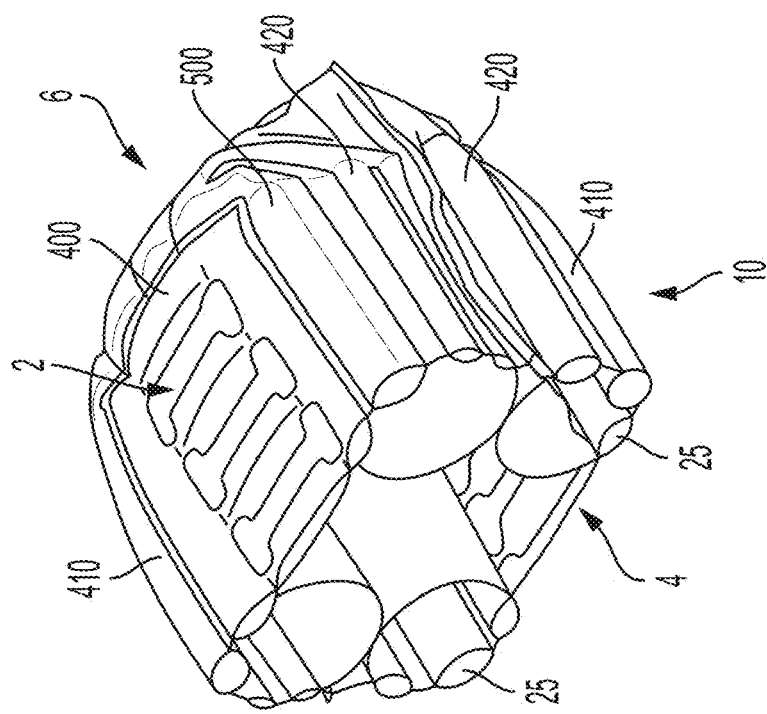
FIG. 30A is a perspective view of a package formed from a blank similar to that shown in FIG. 29.
FIG. 30 B is a cross-sectional view of the package shown in FIG. 30A through cross-section plane 30B-30B
Figure 30A:
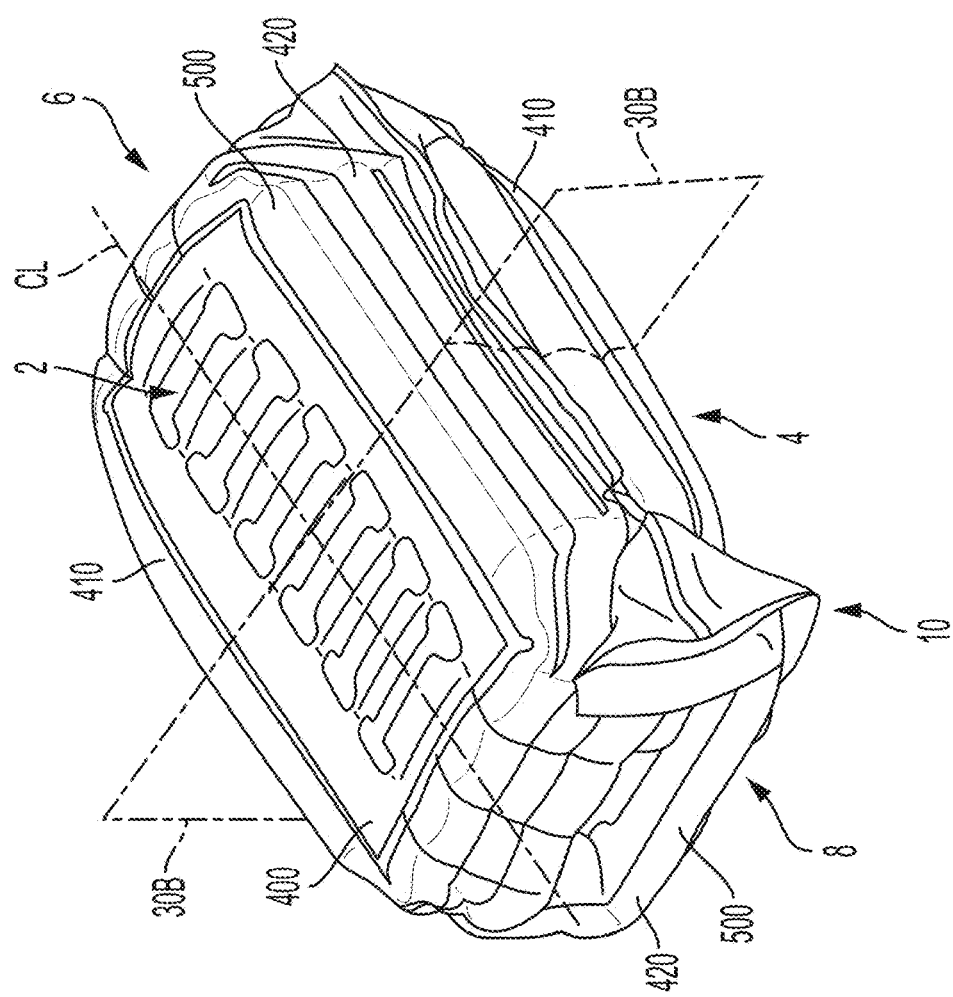

As shown in FIGS. 29, 30A and 30B, the first chamber 400, the second chamber 410 and the third chamber 420 may all extend through at least the top panel 2, the bottom panel 4 and the first end portion 6 of the package 10. This allows for a single expansion port 50 when a manifold 450 or other similar structure is used to direct the expansion material into the expansion chambers. It also provides for redundancy of the expansion chambers along at least the entirely of the top panel 2, the bottom panel 4 and the first end portion 6. However, it is contemplated that any one expansion chamber may be located anywhere on the package 10 and may extend through all or only a portion of any particular side, panel or portion of the package 10. Thus, it is contemplated, for example, a package 10 having a first chamber 400 disposed along one or more sides of the top panel 2 of the package 10 and a second chamber 410 disposed along all or a portion of the first chamber 400. Additional expansion chambers may be located in any portions, panels or sides of the package 10 and may be provided with redundant (e.g. discrete and adjacent) expansion chambers or may be discrete expansion chambers not adjacent to other expansion chambers or may be single or multiple expansion chambers that are in fluid communication with each other.

Figure 31:
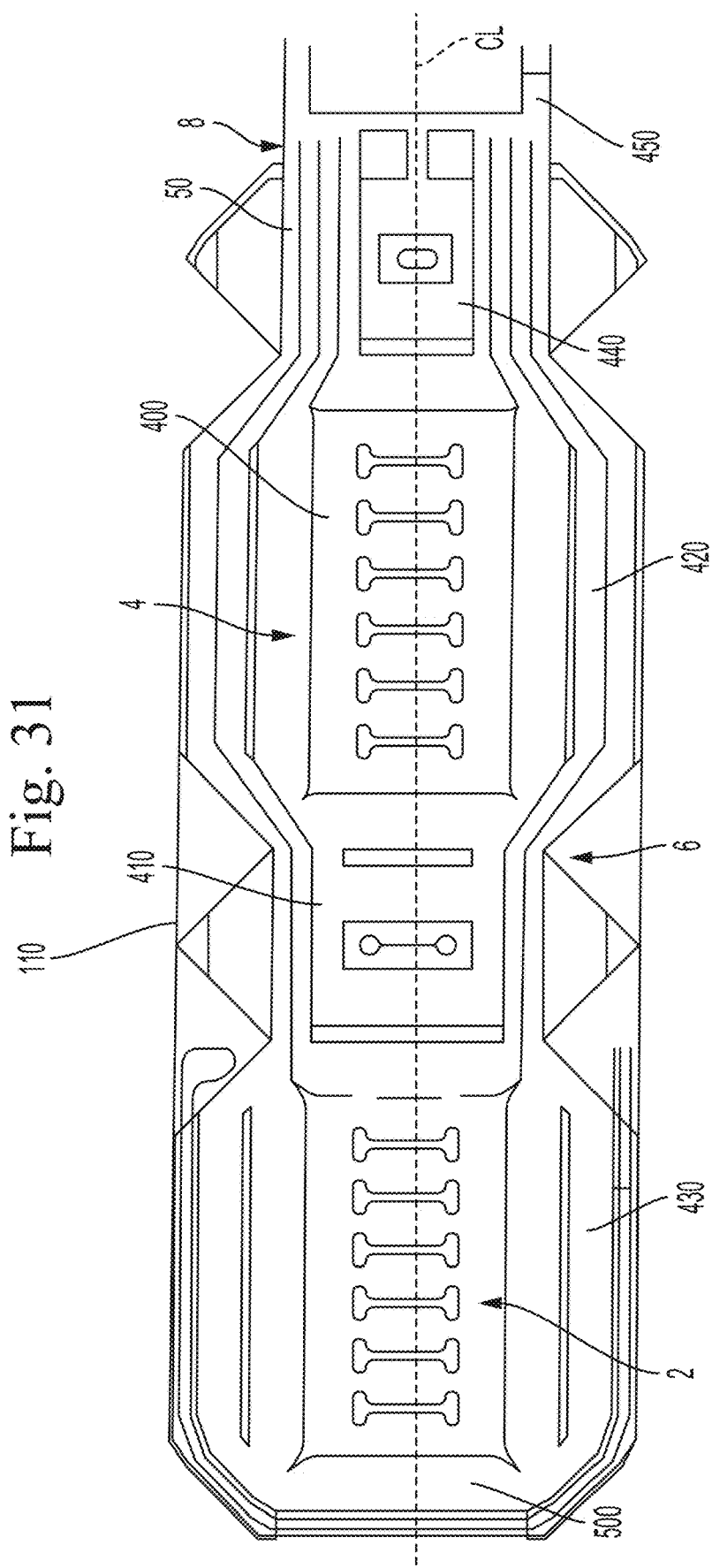
FIG. 31 is a plan view of an alternative embodiment of a blank for a package of the present invention shown in a flat state prior to being formed into a package.

FIG. 31 shows an alternative embodiment of the present invention where the package 10 includes five different discrete secondary expansion chambers, first chamber 400, second chamber 410, third chamber 420, fourth chamber 430 and fifth chamber 440. First chamber 400 is disposed generally in the center of the preform 110 in the bottom panel 4 resulting in the first chamber 400 being located generally in the center of the bottom panel 4 of the package 10. Second chamber 410 is disposed outward of the first chamber 400 in the bottom panel 4 of the package 10 and extends into the first end portion 6 and the second end portion 8. Third chamber 420 is disposed outward of the second chamber 410 and forms at least a portion of one of the side edges 9, 11 of the package 10 in the top panel 2 and the bottom panel 4. Third chamber 420 also extends through the first end edge 6 and the second end edge 8. The fourth chamber 430 is disposed outward of the third chamber 420 on the preform 110 and extends through the top panel 2, the bottom panel 4, the first end portion 6 and the second end portion 8. The fifth chamber 440 is disposed in the second end portion 8. As shown, all of the chambers are in fluid communication with a manifold 450, but any one or more of the chambers can be fully independent of the other chambers or may be in communication with one or more manifolds or other structures to aid in the expansion of the chambers.

As shown in FIGS. 29-31, the package 10 may be configured such that one or more of the expansion chambers (alone or in combination) provide a frame-like structure 500 that helps define the shape of the package 10 when the expansion chambers are in an expanded configuration. The chambers comprised in the frame-like structure 500 may be expanded to provide a rigid frame for the package 10. For example, in a package 10 having six sides (e.g. a parallelepiped), the frame-like structure 500 may include expansion chambers disposed along the periphery or perimeter of all or some of the sides of the package 10. The frame-like structure 500 can have redundancy throughout its entirety or any portion thereof by locating discrete expansion chambers adjacent to each other in preferred locations. For example, if redundancy is preferred for the entire frame-like structure 500, then two or more discrete expansion chambers can be located adjacent each other along the entirety of the frame-like structure 500. Alternatively, if redundancy for the frame-like structure is only desired in certain areas, then discrete expansion chambers can be located adjacent each other in only those regions.

It may be preferred that symmetry in the frame-like structure 500 or any portion thereof is maintained if one or more of the expansion chambers is deflated. This can help ensure the package 10 maintains a preferred shape in at least a portion of the package 10 if one of the discrete chambers is deflated. For example, it might be desirable for the package 10 to maintain a generally parallelepiped shape and/or a generally flat surface on one or more of the sides despite deflation of an expansion chamber. As such, the package 10 can be designed such that any one or more portions or sides has expansion chambers that are shaped to provide symmetry for that side or portion. The example embodiments shown in FIGS. 29-31 include expansion chambers that provide symmetry. For example, in FIG. 29, first chamber 400 has symmetry throughout a central region 510 of the package 10. Second chamber 410 has symmetry with respect to centerline CL of the top panel 2. The first chamber 400 is also symmetrical about the centerline CL and other chambers may also have symmetry about a centerline or other feature of the package 10. Third chamber 420 has symmetry along the sides of the top panel 2, the bottom panel 4, the first end portion 6 and the second end portion 8. Thus, for example, if the second chamber 410 is deflated and the first chamber 400 and the third chamber 420 remain in an expanded configuration, the top panel 2 and the bottom panel 4 will remain generally the same shape as if the second chamber 410 were in an expanded configuration. Without such symmetry, it is possible the package 10 could take on a non-uniform shape in one or more areas (e.g. one side of top or bottom panel is expanded and the other side is not) and could make the package 10 more difficult to convey and/or handle, and could make the package 10 look less aesthetically pleasing to the user.

In any embodiment, some or all of the expansion chambers may be formed as discrete chambers or may be created as one or more continuous chambers that are separated by sealing or otherwise closing portions thereof to create distinct chambers that are not in fluid communication with each other. The separation of expansion chambers can take place when the package is formed. One or more expansion ports may be used to fill multiple distinct chambers. It may be desirable to divide the pack into distinct chambers in a way that enables the expansion ports to be located next to each other. The separation of expansion chambers can also take place after the expansion material 25 is provided in the expansion chambers. This can be done by closing off a portion of any expansion chamber by any suitable means, including, but not limited to adhesive, heat sealing, ultrasonic sealing, chemical sealing, mechanical sealing, cinching, folding, laser sealing, etc. Heat-sealing is preferred. Alternatively or additionally, any one or more chambers may include one or more one-way valves to prevent the expansion material 25 from moving from one chamber or portion thereof into another chamber or another portion of a chamber. The one-way valves are preferably also made from a polyethylene material such as the polyethylene laminate films comprising the package 10. When discrete expansion chambers are used, any number of such chambers is envisioned, and the discrete chambers may be disposed symmetrically or asymmetrically throughout the package.

Still further, it is possible to extend one smaller diameter expansion chamber (or expansion port) between two others to protect the smaller diameter chamber from damage during shipping and handling. In exemplary embodiments, at least a portion of a first secondary expansion 26 chamber extends from an expansion port 50 between at least two other secondary expansion chambers 26 and has a diameter that is smaller than the other two secondary expansion chambers such that when expanded the other two secondary expansion chambers extend outwardly beyond the first secondary expansion chamber and can provide protection for the first secondary expansion chamber when the expansion chambers are expanded.

Packages 10 according to the present disclosure may be manufactured according to a variety of methods. For example, the package 10 may be assembled according to the method described below. A first film (the inner sheet 12) and a second film (the outer sheet 14) are placed onto one another. One or more primary expansion chamber seams 20 are formed by heat sealing. The primary expansion chamber seam(s) 20 formed by the heat-sealing operation define the expansion chamber(s) 24. To further define the expansion chambers 24, the heat seal die may include features that form seals of any desired thickness for example, about 0.325 inch wide. Prior to heat sealing, a one-way film valve may be placed between the inner sheet 12 and the outer sheet 14 the film valve spans across a location where the sheets 12 and 14 will have a seam 20. One-way film valves are conventionally known and are described, for example, at U.S. Pat. Pub. No. 2006/0096068. The one-way film valve may include an ink or polymer material on at least a part of the film valve that enables the film valve to be sealed into the seams created by the heat seal die, but without sealing the film valve shut.

A heat seal die may be used to form the seam(s) 20. If so, the die is heated to the desired temperature and pressed against the first and second films 12 and 14 to create the seam(s) 20. An unattached sheet layer of material (such as Teflon) may be used temporarily in between heat seal die and sheet of film being sealed, to control heat transfer between die and film being heated and prevent the film from burning/sticking to the heat seal die. The inner and outer sheets 12 and 14 may be positioned relative to the heat seal die a second time to create additional seam(s) and primary expansion chambers 24. If the package 10 includes three or more sheets creating any portion thereof, a further heat seal die can similarly be used to form secondary expansion chambers 26 by placing the third sheet (e.g. secondary outer sheet 16) onto the first two sheets (e.g. inner sheet 12 and outer sheet 14) and applying the heat seal die in a similar manner. If additional sheets are used, they may be joined in a similar way.

If the package 10 includes four or more sheets the sheets may be joined in a different sequence. For example, where four sheets are used, a first sheet and the second sheet, corresponding to the inner sheet 12 and the secondary inner sheet 23, may be joined; and a third sheet and a fourth sheet corresponding to the outer sheet 14 and the secondary outer sheet 16 may be joined; and the two joined pairs of sheets may then be joined. The joining of the first sheet and second sheet then forms the primary expansion chambers 24 and the joining of the third sheet and the fourth sheet then forms the secondary expansion chambers 26.

After the expansion chamber(s) are formed, the ends and/or sides of the sheets may be joined to form the article reservoir 28 and the general shape of the package 10. Air, or another expansion material, may be introduced through the expansion port 50 to expand the expansion chamber(s). Air may be introduced at any suitable pressure. For example, air may be introduced at a pressure from about 1 psig to about 20 psig to expand the chamber(s) 24 without risk of rupture of the first and second films by overpressure. Further, as noted, other expansion material may be used and the primary expansion chambers 24 and secondary expansion chambers 26, if any, may be expanded to different pressures.

A plurality of packages 10 may be formed from larger continuous sheets of material. The packages 10 may be formed simultaneously or in series. The packages 10 as disclosed herein are constructed from a multi-layer PE-laminate film and can further use any and all materials, structures, and/or features for the packages 10, as well as any and all methods of making and/or using such packages 10, disclosed in the following US patents and applications: (1) U.S. Pat. No. 9,815,258 filed May 7, 2012, entitled "Film Based Packages"; (2) U.S Publication No. 2013/0292395 A1 filed May 7, 2012, entitled "Film Based Packages"; (3) U.S Publication No. 2013/0292287 A1 filed Jul. 26, 2012, entitled "Film Based Package Having a Decoration Panel"; (4) U.S. Patent application 61/727,961 filed Nov. 19, 2012, entitled "Packages Made from Flexible Material"; (5) U.S. Pat. No. 10,040,581 filed Aug. 6, 2012, entitled "Methods of Making Film Based Packages"; (6) U.S Publication No. 2013/0292413 A1 filed Mar. 13, 2013, entitled "Flexible Packages with Multiple Product Volumes"; and (7) U.S. Pat. No. 9,469,088 filed Mar. 15, 2013, entitled "Flexible Materials for Flexible Containers" 61/789,135; each of which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flexible package for one or more articles, comprising:
   a. an inner sheet having a first surface and a second surface, an inner sheet first portion and an inner sheet second portion;
   b. an outer sheet having an outer sheet first portion and an outer sheet second portion, at least a part of the outer sheet first portion being connected to the first surface of the inner sheet to form one or more primary expansion chambers therebetween, the inner sheet second portion extending from the inner sheet first portion and being folded back onto the second surface of the inner sheet first portion to form an article reservoir between the inner sheet second portion and the inner sheet first portion;
   c. an expansion port in fluid connection with the one or more primary expansion chambers through which an expansion material can be introduced into the one or more expansion chambers
   d. a closeable opening into which the one or more articles may be inserted
   wherein the inner sheet and outer sheet consist of a multi-layered polypropylene film having two or more polypropylene layers.

2. The flexible package of claim 1, wherein the multi-layered polypropylene film comprises an inner layer and at least one of a first outer layer or second outer layer.

3. The flexible package of claim 2, wherein the inner sheet or outer sheet further comprise one or more intermediate layers.

4. The flexible package of claim 3, wherein the inner sheet or outer sheet comprises between 1 to about 20 intermediate layers.

5. The flexible package of claim 1, wherein the average thickness of the multi-layered polypropylene film ranges from about 50 microns to about 250 microns.

6. The flexible package of claim 5, wherein the multi-layered polypropylene film comprises an inner layer and at least one of a first outer layer or second outer layer, wherein at least one of the outer layers has an average thickness of about 5% to about 10% of the multi-layered polypropylene film.

7. The flexible package of claim 6, wherein the inner layer has an average thickness of about 2% to about 60% of the multi-layered polypropylene film.

8. The flexible package of claim 6, wherein the multi-layered polypropylene film further comprises one or more intermediate layers having an average total thickness of about 20% to about 60% of the multi-layered polypropylene film.

9. The flexible package of claim 1 further including a vent disposed in fluid communication with the article reservoir.

10. The flexible package of claim 1 wherein the outer sheet has an inner surface facing the inner sheet and an outer surface opposite of the inner surface and wherein the flexible package further includes a secondary outer sheet disposed adjacent the outer surface of the outer sheet and is at least partially joined thereto, the secondary outer sheet and the outer sheet forming one or more secondary expansion chambers.

11. The flexible package of claim 10 wherein the one or more secondary expansion chambers provides structural rigidity and/or shape to the flexible package when in an expanded configuration.

12. The flexible package of claim 10, wherein the one or more secondary expansion chambers comprise two or more secondary expansion chambers, wherein at least some of the secondary expansion chambers are independent from each other.

13. The flexible package of claim 10 wherein at least one of the inner sheet, the outer and/or the secondary outer sheet is made of a material different than at least one other of the inner sheet, the outer and/or the secondary outer sheet.

14. The flexible package of claim 1 wherein the inner sheet is in contact with the one or more articles when the one or more articles are disposed in the article reservoir.

15. The flexible package of claim 1 wherein the inner sheet at least partially immobilizes the one or more articles within the article reservoir when the one or more primary expansion chambers are in an expanded configuration.

16. The flexible package of claim 1 having no structural support feature other than the primary and/or secondary expansion chambers.

17. The flexible package of claim 1, wherein the one or more primary expansion chambers comprise two or more primary expansion chambers, wherein at least some of the two or more primary expansion chambers are independent from each other.

18. The flexible package of claim 1, comprising an external wrap surrounding at least a portion of the package and providing at least one relatively planar outwardly-facing surface for the package.

19. The flexible package of claim 10, further including an article retrieval feature that allows a user to open the flexible package and retrieve the one or more articles from the article reservoir.

20. The flexible package of claim 19, wherein the article retrieval feature, when activated, both opens the flexible package and deflates the one or more primary expansion chambers and the one or more secondary expansion chambers.

21. A flexible package for one or more articles, comprising an article reservoir, a top surface and a bottom surface;
- an inner sheet and a flexible secondary inner sheet, the inner sheet and secondary inner sheet joined together at an outer seam and forming one or more primary expansion chambers adapted to receive a primary expansion material; and
- a flexible secondary outer sheet and an outer sheet, the secondary outer sheet and the outer sheet joined together at an outer seam and forming one or more secondary expansion chambers adapted to receive a secondary expansion material and;
- wherein one or more non-expansion chambers are provided on the top surface over the one or more primary expansion chambers;
- wherein the inner sheet and outer sheet consist of a multi-layered polypropylene film having three or more polypropylene layers.

22. The flexible package of claim 21, wherein the one or more non-expansion chambers is a label surface.

23. The flexible package of claim 21, wherein the flexible package has one or more expansion ports and the one or more primary expansion chambers and one or more secondary expansion chambers are in fluid communication with the one or more expansion ports.

* * * * *